United States Patent
Humer et al.

(10) Patent No.: US 12,448,639 B2
(45) Date of Patent: Oct. 21, 2025

(54) METHODS FOR PRODUCING HEME PEROXIDASES

(71) Applicant: TECHNISCHE UNIVERSITÄT WIEN, Vienna (AT)

(72) Inventors: Diana Humer, Vienna (AT); Oliver Spadiut, Vienna (AT); Julian Ebner, Vienna (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 460 days.

(21) Appl. No.: 17/914,054

(22) PCT Filed: Mar. 24, 2021

(86) PCT No.: PCT/EP2021/057532
§ 371 (c)(1),
(2) Date: Sep. 23, 2022

(87) PCT Pub. No.: WO2021/191253
PCT Pub. Date: Sep. 30, 2021

(65) Prior Publication Data
US 2023/0122727 A1    Apr. 20, 2023

(30) Foreign Application Priority Data

Mar. 24, 2020 (EP) .................... 20165131
Apr. 2, 2020 (EP) .................... 20167716
May 29, 2020 (EP) .................... 20177549

(51) Int. Cl.
*C12N 9/08* (2006.01)
*C12N 1/20* (2006.01)
*C12N 11/02* (2006.01)
*C12P 21/02* (2006.01)

(52) U.S. Cl.
CPC .............. *C12P 21/02* (2013.01); *C12N 1/205* (2021.05); *C12N 9/0065* (2013.01); *C12N 11/02* (2013.01); *C12Y 111/01007* (2013.01)

(58) Field of Classification Search
CPC ....... C12P 21/02; C12N 1/205; C12N 9/0065; C12N 11/02; C12Y 111/01007
See application file for complete search history.

(56) References Cited

U.S. PATENT DOCUMENTS 6,902,918 B1 * 6/2005 Arnold et al. ................ 435/189
2009/0155829 A1   6/2009 Treynor et al.

FOREIGN PATENT DOCUMENTS

WO         200172999 A1   10/2001
WO    WO2014128726 A2    8/2014

OTHER PUBLICATIONS

Hnasko R.M.—ELISA—Methods and Protocols; Methods in Molecular Biology, series Editor John M. Walker (DOI 10.1007/978-1-4939-2742-5); Chapter 4 on "Bioconjugation of Antibodies to Horseradish Peroxidase (HRP)", pp. 43-50 (total pages 220). (Year: 2015).*
Humer et al., "Scalable High-Performance Production of Recombinant Horseradish Peroxidase from E. coli Inclusion Bodies", International Journal of Molecular Sciences, Jun. 29, 2020, vol. 21, No. 13, p. 4625, DOI: 10.3390/ijms21134625.
Smith et al, "Expression of a Synthetic Gene for Horseradish Peroxidase C in *Escherichia coli* and Folding and Activation of the Recombinat Enzyme With CA2+ and Heme", Journal of Biological Chemistry, American Soceity for Biochemistry and Molecular Biology, US, vol. 265, No. 22, Aug. 5, 1990.
Lin Meng-I et al: "High yield production of fungal manganese peroxidases by *E. coli* through soluble expression, and examination of the activities", Protein Expression and Purification, Academic Press, San Diego, CA, vol. 145, Jan. 2, 2018.
Whitwam R Tien M Ed—Valpuesta Jose M et al: "Heterologous expression and reconstruction of fungal Mn peroxidase", Archives of Biochemistry and Biophysics, Academic Press, US, vol. 333, No. 2, Sep. 15, 1996, Abstract only.
Ferre H et al: "A Novel System for Continuous Protein Refolding and On-Line Capture by Expanded Bed Adsorption", Protein Science, Wiley, US, vol. 14, No. 8, Aug. 1, 2005.
Le Thanh Mai Pham et al; "Optimized refolding and characterization of S-peroxidase (CWPO C of) expressed in", Protein Expression and Purification, vol. 80, No. 2, Jan. 1, 2011.
Cabrita L D et al: "Protein Expressino and Refolding—A Practical Guide to Getting the Most out of Inclusion Bodies", Biotechnology Annual Review, Elsevier, NL, vol. 10, No. Spec. Issue, Jan. 1, 2004.
Eggenreich B et al "Production strategies for active heme-containing peroxidases from *E. coli* inclusion bodies—a review", Biotechnology Reports 10 (2016) 75-83.
Gundinger T et al "A comparative approach to recombinantly produce the plant enzyme horseradish peroxidase in *Escherichia coli*", Journal of Biotechnology 248 (2017) 15-24.
Linde D et al "Heterologous expression and physicochemical characterization of a fungal dye-decolorizing peroxidase from Auricularia auricula-judae", Protein Expression and Purification 103 (2014) 28-37.
Yamaguchi H et al "Refolding Techniques for Recovering Biologically Active Recombinant Proteins from Inclusion Bodies", Biomolecules 2014, 4, 235-251; doi:10.3390/biom4010235.
Zakharova GS et al "High-yield reactivation of anionic tobacco peroxidase overexpressed in *Escherichia coli* ", Protein Expression and Purification 113 (2015) 85-93.

(Continued)

*Primary Examiner* — Satyendra K Singh
(74) *Attorney, Agent, or Firm* — Daniel S. Kim

(57) ABSTRACT

The present invention provides methods for producing a heme pe-roxidase from inclusion bodies (IBs) comprising the steps of: providing the heme peroxidase in the form of IBs, solubilizing said IBs, transferring said solubilized IBs into a refolding buffer to obtain a refolding mix, adding a heme cofactor to said refolding mix, wherein the addition of the heme cofactor to the refolding mix is distributed over a time period of at least 1 hour. The invention further provides methods for producing heme peroxidase products.

20 Claims, 9 Drawing Sheets

Figure 1A:
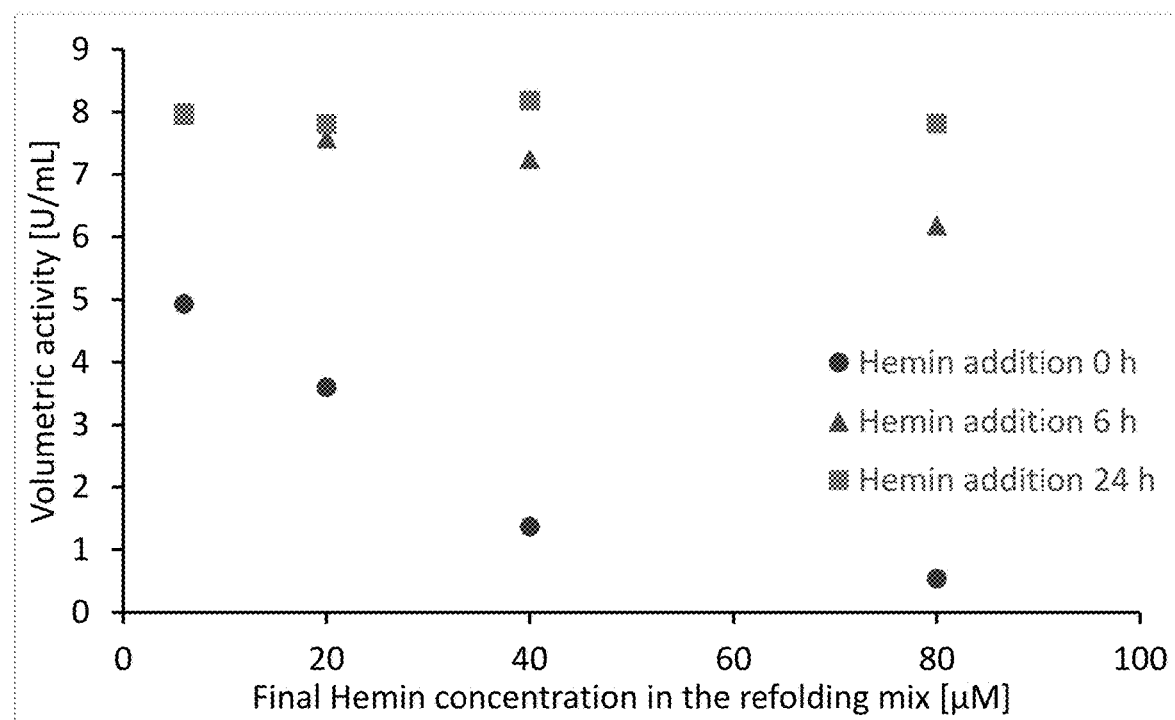

Specification includes a Sequence Listing.

(56) References Cited

OTHER PUBLICATIONS

Aumiller W et al "Coupled Enzyme Reactions Performed in Heterogeneous Reaction Media: Experiments and Modeling for Glucose Oxidase and Horseradish Peroxidase in a PEG/Citrate Aqueous Two-Phase System", dx.doi.org/10.1021/jp501126v | J. Phys. Chem. B 2014, 118, 2506-2517.

Bagshawe KD "Antibody-directed enzyme prodrug therapy (ADEPT) for cancer", Expert Rev. Anticancer Ther. 6 (10), 1421-1431 (2006).

Bradford M "A Rapid and Sensitive Method for the Quantitation of Microgram Quantities of Protein Utilizing the Principle of Protein-Dye Binding", Analytical Biochemistry 72, 248-254 (1976).

Morawski B et al "Functional Expression and Stabilization of Horseradish Peroxidase by Directed Evolution in *Saccharomyces cerevisiae*", Biotechnology and Bioengineering, vol. 76, No. 2, Sep. 2001.

Capone S et al "Glyco-variant library of the versatile enzyme horseradish peroxidase", Glycobiology vol. 24 No. 9 pp. 852-863, 2014.

Rengarajan et al "Quantifying DNA concentrations using fluorometry: A comparison of fluorophores", Molecular Vision 2002; 8:416-21.

Gajhede M et al "Crystal structure of horseradish peroxidase C at 2.15 A resolution", nature structural biology, vol. 4 No. 12, Dec. 1997.

Gebauer et al "Engineered protein scaffolds as next-generation antibody therapeutics", Current Opinion in Chemical Biology, vol. 13, Issue 3, Jun. 2009, pp. 245-255, Abstract only.

Humer D, Spadiut O "Improving the Performance of Horseradish Peroxidase by Site-Directed Mutagenesis", Int. J. Mol. Sci. 2019, 20, 916.

Jin R et al "Enzymatically Crosslinked Dextran-Tyramine Hydrogels as Injectable Scaffolds for Cartilage Tissue Engineering", Tissue Engineering: Part A vol. 16, No. 8, 2010, 2429-2440.

Josephy PD et al "The Horseradish Peroxidase-catalyzed Oxidation of 3,5,3',5'-Tetramethylbenzidine", The Journal of Biological Chemistry, vol. 257, No. 7, Issue of Apr. 10, pp. 3669-3675, 1982.

Pham LTM et al "Optimized refolding and characterization of S-peroxidase (CWPO_C of Populus alba) expressed in *E. coli*", Protein Expression and Purification 80 (2011) 268-273.

Rice P et al "EMBOSS: The European Molecular Biology Open Software Suite", TIG Jun. 2000, vol. 16, No. 6.

Ryan B et al "Effects of single mutations on the stability of horseradish peroxidase to hydrogen peroxide", Biochimie 89 (2007) 1029-1032.

Simpson R "Estimation of Free Thiols and Disulfide Bonds Using Ellman's Reagent", CSH Protocols; 2008; doi:10.1101/pdb.prot4699.

Tatsumi K et al "Removal of Chlorophenols from Wastewater by Immobilized Horseradish Peroxidase", Biotechnology and Bioengineering, vol. 51, pp. 126-130 (1996).

Tupper J et al "Use of horseradish peroxidase for gene-directed enzyme prodrug therapy with paracetamol", British Journal of Cancer (2004) 90, 1858-1862.

Tupper J et al "In vivo characterization of horseradish peroxidase with indole-3-acetic acid and 5-bromoindole-3-acetic acid for gene therapy of cancer", Cancer Gene Therapy (2010) 17, 420-428.

Vasileva N et al "Application of immobilized horseradish peroxidase onto modified acrylonitrile copolymer membrane in removing of phenol from water", International Journal of Biological Macromolecules 44 (2009) 190-194.

Welinder K "Superfamily of plant, fungal and bacterial peroxidases", Current Opinion in Structural Biology 1992, 2:388-393.

\* cited by examiner

SEQUENCE LISTING

```
<160> NUMBER OF SEQ ID NOS: 8

<210> SEQ ID NO 1
<211> LENGTH: 306
<212> TYPE: PRT
<213> ORGANISM: Armoracia rusticana

<400> SEQUENCE: 1

Gln Leu Thr Pro Thr Phe Tyr Asp Asn Ser Cys Pro Asn Val Ser Asn
1               5                   10                  15

Ile Val Arg Asp Thr Ile Val Asn Glu Leu Arg Ser Asp Pro Arg Ile
            20                  25                  30

Ala Ala Ser Ile Leu Arg Leu His Phe His Asp Cys Phe Val Asn Gly
        35                  40                  45

Cys Asp Ala Ser Ile Leu Leu Asp Asn Thr Thr Ser Phe Arg Thr Glu
    50                  55                  60

Lys Asp Ala Phe Gly Asn Ala Asn Ser Ala Arg Gly Phe Pro Val Ile
65                  70                  75                  80

Asp Arg Met Lys Ala Ala Val Glu Ser Ala Cys Pro Arg Thr Val Ser
                85                  90                  95

Cys Ala Asp Leu Leu Thr Ile Ala Ala Gln Gln Ser Val Thr Leu Ala
            100                 105                 110

Gly Gly Pro Ser Trp Arg Val Pro Leu Gly Arg Arg Asp Ser Leu Gln
        115                 120                 125

Ala Phe Leu Asp Leu Ala Asn Ala Asn Leu Pro Ala Pro Phe Phe Thr
    130                 135                 140

Leu Pro Gln Leu Lys Asp Ser Phe Arg Asn Val Gly Leu Asn Arg Ser
145                 150                 155                 160

Ser Asp Leu Val Ala Leu Ser Gly Gly His Thr Phe Gly Lys Asn Gln
                165                 170                 175

Cys Arg Phe Ile Met Asp Arg Leu Tyr Asn Phe Ser Asn Thr Gly Leu
            180                 185                 190

Pro Asp Pro Thr Leu Asn Thr Thr Tyr Leu Gln Thr Leu Arg Gly Leu
        195                 200                 205

Cys Pro Leu Asn Gly Asn Leu Ser Ala Leu Val Asp Phe Asp Leu Arg
    210                 215                 220

Thr Pro Thr Ile Phe Asp Asn Lys Tyr Tyr Val Asn Leu Glu Glu Gln
225                 230                 235                 240

Lys Gly Leu Ile Gln Ser Asp Gln Glu Leu Phe Ser Ser Pro Asn Ala
                245                 250                 255

Thr Asp Thr Ile Pro Leu Val Arg Ser Phe Ala Asn Ser Thr Gln Thr
            260                 265                 270

Phe Phe Asn Ala Phe Val Glu Ala Met Asp Arg Met Gly Asn Ile Thr
        275                 280                 285
```

Pro Leu Thr Gly Thr Gln Gly Gln Ile Arg Leu Asn Cys Arg Val Val
    290                 295                 300

Asn Ser
305

<210> SEQ ID NO 2
<211> LENGTH: 307
<212> TYPE: PRT
<213> ORGANISM: Artificial Sequence
<220> FEATURE:
<223> OTHER INFORMATION: recombinant wt HRP

<400> SEQUENCE: 2

Met Gln Leu Thr Pro Thr Phe Tyr Asp Asn Ser Cys Pro Asn Val Ser
1               5                   10                  15

Asn Ile Val Arg Asp Thr Ile Val Asn Glu Leu Arg Ser Asp Pro Arg
            20                  25                  30

Ile Ala Ala Ser Ile Leu Arg Leu His Phe His Asp Cys Phe Val Asn
        35                  40                  45

Gly Cys Asp Ala Ser Ile Leu Leu Asp Asn Thr Thr Ser Phe Arg Thr
    50                  55                  60

Glu Lys Asp Ala Phe Gly Asn Ala Asn Ser Ala Arg Gly Phe Pro Val
65                  70                  75                  80

Ile Asp Arg Met Lys Ala Ala Val Glu Ser Ala Cys Pro Arg Thr Val
                85                  90                  95

Ser Cys Ala Asp Leu Leu Thr Ile Ala Ala Gln Gln Ser Val Thr Leu
            100                 105                 110

Ala Gly Gly Pro Ser Trp Arg Val Pro Leu Gly Arg Arg Asp Ser Leu
        115                 120                 125

Gln Ala Phe Leu Asp Leu Ala Asn Ala Asn Leu Pro Ala Pro Phe Phe
    130                 135                 140

Thr Leu Pro Gln Leu Lys Asp Ser Phe Arg Asn Val Gly Leu Asn Arg
145                 150                 155                 160

Ser Ser Asp Leu Val Ala Leu Ser Gly Gly His Thr Phe Gly Lys Asn
                165                 170                 175

Gln Cys Arg Phe Ile Met Asp Arg Leu Tyr Asn Phe Ser Asn Thr Gly
            180                 185                 190

Leu Pro Asp Pro Thr Leu Asn Thr Thr Tyr Leu Gln Thr Leu Arg Gly
        195                 200                 205

Leu Cys Pro Leu Asn Gly Asn Leu Ser Ala Leu Val Asp Phe Asp Leu
    210                 215                 220

Arg Thr Pro Thr Ile Phe Asp Asn Lys Tyr Tyr Val Asn Leu Glu Glu
225                 230                 235                 240

Gln Lys Gly Leu Ile Gln Ser Asp Gln Glu Leu Phe Ser Ser Pro Asn
                245                 250                 255

Ala Thr Asp Thr Ile Pro Leu Val Arg Ser Phe Ala Asn Ser Thr Gln
            260                 265                 270

Thr Phe Phe Asn Ala Phe Val Glu Ala Met Asp Arg Met Gly Asn Ile
        275                 280                 285

Thr Pro Leu Thr Gly Thr Gln Gly Gln Ile Arg Leu Asn Cys Arg Val
    290                 295                 300

Val Asn Ser
305

<210> SEQ ID NO 3

<211> LENGTH: 306
<212> TYPE: PRT
<213> ORGANISM: Artificial Sequence
<220> FEATURE:
<223> OTHER INFORMATION: HRP N13D/N57S/P146Q/N175S/N255D/N268D/N275K

<400> SEQUENCE: 3

```
Gln Leu Thr Pro Thr Phe Tyr Asp Asn Ser Cys Pro Asp Val Ser Asn
1               5                   10                  15

Ile Val Arg Asp Thr Ile Val Asn Glu Leu Arg Ser Asp Pro Arg Ile
            20                  25                  30

Ala Ala Ser Ile Leu Arg Leu His Phe His Asp Cys Phe Val Asn Gly
        35                  40                  45

Cys Asp Ala Ser Ile Leu Leu Asp Ser Thr Thr Ser Phe Arg Thr Glu
    50                  55                  60

Lys Asp Ala Phe Gly Asn Ala Asn Ser Ala Arg Gly Phe Pro Val Ile
65                  70                  75                  80

Asp Arg Met Lys Ala Ala Val Glu Ser Ala Cys Pro Arg Thr Val Ser
                85                  90                  95

Cys Ala Asp Leu Leu Thr Ile Ala Ala Gln Gln Ser Val Thr Leu Ala
            100                 105                 110

Gly Gly Pro Ser Trp Arg Val Pro Leu Gly Arg Arg Asp Ser Leu Gln
        115                 120                 125

Ala Phe Leu Asp Leu Ala Asn Ala Asn Leu Pro Ala Pro Phe Phe Thr
    130                 135                 140

Leu Gln Gln Leu Lys Asp Ser Phe Arg Asn Val Gly Leu Asn Arg Ser
145                 150                 155                 160

Ser Asp Leu Val Ala Leu Ser Gly Gly His Thr Phe Gly Lys Ser Gln
                165                 170                 175

Cys Arg Phe Ile Met Asp Arg Leu Tyr Asn Phe Ser Asn Thr Gly Leu
            180                 185                 190

Pro Asp Pro Thr Leu Asn Thr Thr Tyr Leu Gln Thr Leu Arg Gly Leu
        195                 200                 205

Cys Pro Leu Asn Gly Asn Leu Ser Ala Leu Val Asp Phe Asp Leu Arg
    210                 215                 220

Thr Pro Thr Ile Phe Asp Asn Lys Tyr Tyr Val Asn Leu Glu Glu Gln
225                 230                 235                 240

Lys Gly Leu Ile Gln Ser Asp Gln Glu Leu Phe Ser Ser Pro Asp Ala
                245                 250                 255

Thr Asp Thr Ile Pro Leu Val Arg Ser Phe Ala Asp Ser Thr Gln Thr
            260                 265                 270

Phe Phe Lys Ala Phe Val Glu Ala Met Asp Arg Met Gly Asn Ile Thr
        275                 280                 285

Pro Leu Thr Gly Thr Gln Gly Gln Ile Arg Leu Asn Cys Arg Val Val
    290                 295                 300

Asn Ser
305
```

<210> SEQ ID NO 4
<211> LENGTH: 307
<212> TYPE: PRT
<213> ORGANISM: Artificial Sequence
<220> FEATURE:
<223> OTHER INFORMATION: recombinant HRP
      N13D/N57S/P146Q/N175S/N255D/N268D/N275K

<400> SEQUENCE: 4

```
Met Gln Leu Thr Pro Thr Phe Tyr Asp Asn Ser Cys Pro Asp Val Ser
1               5                   10                  15

Asn Ile Val Arg Asp Thr Ile Val Asn Glu Leu Arg Ser Asp Pro Arg
            20                  25                  30

Ile Ala Ala Ser Ile Leu Arg Leu His Phe His Asp Cys Phe Val Asn
                35                  40                  45

Gly Cys Asp Ala Ser Ile Leu Leu Asp Ser Thr Thr Ser Phe Arg Thr
    50                  55                  60

Glu Lys Asp Ala Phe Gly Asn Ala Asn Ser Ala Arg Gly Phe Pro Val
65                  70                  75                  80

Ile Asp Arg Met Lys Ala Ala Val Glu Ser Ala Cys Pro Arg Thr Val
                85                  90                  95

Ser Cys Ala Asp Leu Leu Thr Ile Ala Ala Gln Gln Ser Val Thr Leu
                100                 105                 110

Ala Gly Gly Pro Ser Trp Arg Val Pro Leu Gly Arg Arg Asp Ser Leu
            115                 120                 125

Gln Ala Phe Leu Asp Leu Ala Asn Ala Asn Leu Pro Ala Pro Phe Phe
    130                 135                 140

Thr Leu Gln Gln Leu Lys Asp Ser Phe Arg Asn Val Gly Leu Asn Arg
145                 150                 155                 160

Ser Ser Asp Leu Val Ala Leu Ser Gly Gly His Thr Phe Gly Lys Ser
                165                 170                 175

Gln Cys Arg Phe Ile Met Asp Arg Leu Tyr Asn Phe Ser Asn Thr Gly
            180                 185                 190

Leu Pro Asp Pro Thr Leu Asn Thr Thr Tyr Leu Gln Thr Leu Arg Gly
            195                 200                 205

Leu Cys Pro Leu Asn Gly Asn Leu Ser Ala Leu Val Asp Phe Asp Leu
    210                 215                 220

Arg Thr Pro Thr Ile Phe Asp Asn Lys Tyr Tyr Val Asn Leu Glu Glu
225                 230                 235                 240

Gln Lys Gly Leu Ile Gln Ser Asp Gln Glu Leu Phe Ser Ser Pro Asp
            245                 250                 255

Ala Thr Asp Thr Ile Pro Leu Val Arg Ser Phe Ala Asp Ser Thr Gln
            260                 265                 270

Thr Phe Phe Lys Ala Phe Val Glu Ala Met Asp Arg Met Gly Asn Ile
            275                 280                 285

Thr Pro Leu Thr Gly Thr Gln Gly Gln Ile Arg Leu Asn Cys Arg Val
290                 295                 300

Val Asn Ser
305
```

<210> SEQ ID NO 5
<211> LENGTH: 28
<212> TYPE: DNA
<213> ORGANISM: Artificial Sequence
<220> FEATURE:
<223> OTHER INFORMATION: DHU_P146deg3_fwd
<220> FEATURE:
<221> NAME/KEY: misc_difference
<222> LOCATION: 11
<223> OTHER INFORMATION: /note="a or g or c or t"
<220> FEATURE:
<221> NAME/KEY: misc_difference
<222> LOCATION: 12
<223> OTHER INFORMATION: /note="a or g or c or t"

<400> SEQUENCE: 5
tttcacgctg nnkcaactga aagatagc                                      28

```
<210> SEQ ID NO 6
<211> LENGTH: 24
<212> TYPE: DNA
<213> ORGANISM: Artificial Sequence
<220> FEATURE:
<223> OTHER INFORMATION: DHU_P146deg3_rev

<400> SEQUENCE: 6
aacggagccg gcagattagc gttt                                          24

<210> SEQ ID NO 7
<211> LENGTH: 27
<212> TYPE: DNA
<213> ORGANISM: Artificial Sequence
<220> FEATURE:
<223> OTHER INFORMATION: DHU_N275deg3_fwd
<220> FEATURE:
<221> NAME/KEY: misc_difference
<222> LOCATION: 11
<223> OTHER INFORMATION: /note="a or g or c or t"
<220> FEATURE:
<221> NAME/KEY: misc_difference
<222> LOCATION: 12
<223> OTHER INFORMATION: /note="a or g or c or t"

<400> SEQUENCE: 7 gacgttttc nnkgcattcg tcgaagc                                        27

<210> SEQ ID NO 8
<211> LENGTH: 23
<212> TYPE: DNA
<213> ORGANISM: Artificial Sequence
<220> FEATURE:
<223> OTHER INFORMATION: DHU_N275deg3_rev

<400> SEQUENCE: 8
tgggtcgaat cggcaaatga acg                                           23
```

METHODS FOR PRODUCING HEME PEROXIDASES

The content of ASCII text file of the sequence listing named 128912-00001_SEQ.txt, which is 11900 bytes in size was created on and electronically submitted via EFS-Web Sep. 23, 2022, is incorporated herein by reference in its entirety.

This is the national stage of International Application PCT/EP2021/057532, filed Mar. 24, 2021.

The present invention relates to methods for producing heme peroxidases.

Heme peroxidases are an industrially important class of enzymes with a wide range of applications including immunoassays, diagnostic kits, probe-based assay techniques such as ELISA, EMSA, Western blotting and Southern blotting, waste water treatment, as a reagent in organic synthesis, and potential therapeutic applications. A well known member of the class of heme peroxidases is horseradish peroxidase (HRP) which is commonly used in research and industry.

To date, heme peroxidases are frequently produced from plants; e.g. HRP is mainly produced by extraction from hairy root cultures of *Armoracia rusticana*. This, however, is an inefficient and time-consuming process. Disadvantages include low yields, long cultivation times, only seasonal availability, heterogeneous isoenzyme composition (preparations differ in biochemical properties), dependence on conditions during root growth, and plant glycosylation patterns which are immunogenic for humans and may result in non-eligibility for medical uses.

Recombinant production of heme peroxidases is a desirable alternative as it is a more promising way of manufacturing that guarantees a steady supply of defined enzyme preparations at high quality. In particular, recombinant production in *E. coli* may make it possible to obtain a defined preparation of one isoform with stable biochemical properties while lacking glycosylation and therefore immunogenic potential.

However, the recombinant production of native heme peroxidases is challenging. For instance, HRP contains glycosylations on eight asparagine residues making recombinant production difficult. Wild-type HRP produced from *E. coli* shows lower stability compared to the plant-derived enzyme.

Numerous attempts have been made to produce heme peroxidases recombinantly in different hosts: mammalian cells, insect cells, yeasts (*P. pastoris* and *S. cerevisiae*), other plants (*Nicotiana tabacum, Nicotiana benthamiana, Armoracia lapathifolia*) and *E. coli*. However, these production strategies resulted in very low yields and/or decreased enzyme activity and stability. For production in *E. coli* this occurs due to intracellular production of the protein which leads to inclusion body formation due to reducing conditions in the *E. coli* cytoplasm. Therefore, the downstream process is more elaborate than, for example, in yeasts. The enzyme can also be translocated to the periplasm by adding a signal sequence but then the yields are even lower and the activity and stability of the enzyme might be compromised by addition of the translocation-tag. Moreover, *E. coli* is not able to perform post-translational modifications, therefore the enzyme is unglycosylated which results in reduced stability of the protein.

Several studies have been performed in the past with the goal of improving the properties of recombinantly produced HRP. A summary of attempts to improve HRP properties by mutation is provided by Humer and Spadiut ("Improving the performance of horseradish peroxidase by site-directed mutagenesis." International Journal of Molecular Sciences 20.4 (2019): 916), wherein the effect of a number of mutations on stability and/or enzymatic activity are disclosed.

However, despite all of these efforts, new and improved methods of producing heme peroxidases are still lacking. In particular, methods to recombinantly produce and purify heme peroxidases in suitable hosts, especially *E. coli*, are needed. It is an object of the present invention to provide such methods.

Therefore, the present invention provides a method for producing a heme peroxidase from inclusion bodies (IBs) comprising the steps of:
  providing the heme peroxidase in the form of IBs;
  solubilizing said IBs;
  transferring said solubilized IBs into a refolding buffer to obtain a refolding mix;
  adding a heme cofactor to said refolding mix,
wherein the addition of the heme cofactor to the refolding mix is distributed over a time period of at least 1 hour, preferably at least 2 hours, more preferably at least 3 hours, even more preferably at least 6 hours, especially at least 10 hours.

In addition, the present invention provides a method for producing a heme peroxidase product comprising producing a heme peroxidase according to the invention.

In the context of the present invention it was surprisingly found that the refolding process for heme peroxidases can be strongly improved when the addition of the heme cofactor to the refolding mix is distributed over a certain time period (see Example 3, in particular the comparison between Tables 5 and 6). Without being bound to a particular theory, the inventors speculate that this beneficial effect is due to the hydrophobic nature of the heme cofactor. Since this cofactor is needed to form the holoenzyme, refolding yields are dependent on the free heme cofactor available for incorporation into the correctly folded heme peroxidase after refolding. Due to the hydrophobic nature of the cofactor, it may form aggregates that are not available for incorporation if added in a single step.

As described in more detail herein below, further advantageous effects were observed when the refolding mix is incubated for a certain period of time before adding the heme cofactor (see in particular FIG. 1), when solubilization and refolding buffers with certain Redox-properties and pH-values are used (see Examples 2-5), when a precipitation step with certain salt concentrations is included after refolding (see Example 4, Table 9) and when the protein is further purified by hydrophobic interaction chromatography (HIC; see Example 4). Importantly, all of these individual features can have advantageous effects independently of each other. Moreover, when some of them, or especially all of them, are combined, a highly optimized and efficient process is obtained (see especially Example 5).

In addition to this new and improved production process, new mutants of HRP are disclosed herein that not only provide improved thermostability and kinetic parameters over wild-type HRP and known HRP mutants, but that are particularly well suited for recombinant production in bacteria; in particular with the method according to the invention. The combination of a strongly improved heme peroxidase and a highly efficient production process is thus enabled.

Techniques for protein expression and refolding from IBs are well established and commonly used in the art. An overview of such techniques is e.g. given by Cabrita and Bottomley ("Protein expression and refolding—A practical guide to getting the most out of inclusion bodies." Biotechnology Annual Review 10 (2004): 31-50) as well as Yamaguchi and Miyazaki ("Refolding techniques for recovering biologically active recombinant proteins from inclusion bodies." Biomolecules 4.1 (2014): 235-251). Overexpression of recombinant proteins in bacteria, such as *E. coli* often results in the formation of IBs, which are protein aggregates with non-native conformation. The term "inclusion bodies" (IBs) refers to insoluble aggregates containing heterologous polypeptides (e.g. the heme peroxidase) present in the cytoplasm of transformed host cells. These typically appear as bright spots under the microscope and can be recovered by separation of the cytoplasm. Such inclusion bodies usually contain relatively pure and intact proteins; however, the inclusion bodies need to be solubilized and the proteins need to be refolded into their native structure.

Typically, IBs are solubilized in a solubilization buffer containing denaturants, such as urea, guanidinium chloride (GdnHCl), or ionic detergents, such as N-lauroylsarcosine. Often reducing agents such as 2-mercaptoethanol (β-ME), dithiothreitol (DTT) or 1-monothioglycerol (MTG) are added to reduce non-native inter- and intramolecular disulfide bonds and keep the cysteines in a reduced state. The term "solubilization" or "solubilizing" refers to the process necessary to dissolve the IBs, aiming to result in a monomolecular dispersion of the polypeptides with minimal intra- and inter-molecular interactions. A "solubilization buffer" is a buffer that is suitable for purpose of solubilizing the IBs, i.e. typically a buffer with conditions that are sufficiently denaturing for the IBs to be solubilized.

Refolding from denatured proteins (solubilized IBs) to active proteins (folded form) typically occurs by removal of denaturant, and is the key step in the efficient recovery of the proteins. The term "refolding" refers to the mechanism during which the denatured protein gains its native or active conformation. Several approaches for refolding are known in the art. Due to its simplicity, refolding by dilution is one preferred method, especially in production scale. Protein concentration, as well as denaturant concentration are diminished in a single step preventing aggregation by inter-molecular interactions. A "refolding buffer" as used herein, refers to a buffer that is suitable for the purpose of refolding, i.e. a buffer that provides conditions allowing the denatured protein to gain its native or active conformation. Refolding efficiency (yield) of refolded protein can be estimated by biological activity, such as enzymatic activity.

A number of methods for producing and purifying heme peroxidases from inclusion bodies have been described in the art. An overview of such techniques is given by Eggenreich et al. ("Production strategies for active heme-containing peroxidases from *E. coli* inclusion bodies—a review." Biotechnology Reports 10 (2016): 75-83). Such processes have been described for the production of a wide variety of heme peroxidases, for all of which the same basic process can be used as outlined above (IB production, solubilization, refolding). Examples include horseradish peroxidase (Smith et al. "Expression of a synthetic gene for horseradish peroxidase C in *Escherichia coli* and folding and activation of the recombinant enzyme with $Ca^{2+}$ and heme.!" Journal of Biological Chemistry 265.22 (1990): 13335-13343), fungal dye-decolorizing peroxidase (Linde et al. "Heterologous expression and physicochemical characterization of a fungal dye-decolorizing peroxidase from *Auricularia auricula-judae*." Protein Expression and Purification 103 (2014): 28-37), Cationic cell wall peroxidase (Kim et al. "Optimized refolding and characterization of S-peroxidase (CWPO_C of *Populus alba*) expressed in *E. coli*." Protein Expression and Purification 80.2 (2011): 268-273), *Arabidopsis* peroxidases (Shigeto et al. "Catalytic profile of *Arabidopsis* peroxidases, AtPrx-2, 25 and 71, contributing to stem lignification." PLoS One 9.8 (2014)), anionic tobacco peroxidase (Zakharova et al. "High-yield reactivation of anionic tobacco peroxidase overexpressed in *Escherichia coli*." Protein Expression and Purification 113 (2015): 85-93) and others.

WO 2014/128726 A2 describes processes of refolding recombinant protein from IBs; however, it is unrelated to peroxidases or heme cofactors.

Lin et al. ("High yield production of fungal manganese peroxidases by *E. coli* through soluble expression, and examination of the activities." Protein expression and purification 145 (2018): 45-52) describe the expression of fungal manganese peroxidases in soluble form in *E. coli*. Entirely unrelated to refolding from IBs, a method is described, in which hemin is added to the bacterial cell culture continuously, in order to increase intake of hemin into the cells and to avoid disrupting proper cell activities during protein expression.

Heme peroxidases are heme-containing enzymes that can use hydrogen peroxide as the electron acceptor to catalyse oxidative reactions. In the context of the present invention, the heme peroxidase is preferably an enzyme of EC 1.11.1.7 (Enzyme Commission number). A major superfamily of heme peroxidases, which is also preferred in the context of the invention, is the superfamily of plant, fungal and bacterial peroxidases (see Welinder "Superfamily of plant, fungal and bacterial peroxidases." Current Opinion in Structural Biology 2.3 (1992): 388-393). This superfamily is often viewed as consisting of three major classes: class I are intracellular peroxidases, class II consists of secretory fungal peroxidases, and class III consists of the secretory plant peroxidases. Class II and III are similar in that their members typically have a heme group, 4 disulfide bridges, and bind two $Ca^{2+}$ ions. Moreover, members of both classes are usually glycosylated in the native state and challenging to express in *E. coli*. Since in the context of the inventive method, the advantageous effect of distributing the addition of the heme cofactor over a certain period of time i.a. is a result of the nature of this cofactor, the inventive method can advantageously be used for the refolding of all heme peroxidases. However, since class II and class III heme peroxidases are particularly challenging to recombinantly express, these classes are particularly preferred. In a preferred embodiment the heme peroxidase is therefore a Class II or a Class III heme peroxidase, especially a Class III heme peroxidase.

The heme cofactor used in the context of the invention can be heme itself, or any heme precursor or derivative that is incorporated into the apo-peroxidase. For instance, hemin (the ferric chloride species of heme; CAS [16009-13-5]) is frequently used as heme cofactor (see publications related to methods for producing and purifying heme peroxidases from inclusion bodies cited herein above). In a preferred embodiment of the invention, the heme cofactor is therefore hemin.

In the context of the present invention it is especially preferred if the heme peroxidase is horseradish peroxidase (HRP). It is in particular preferred if the HRP is a mutant HRP that is optimized for recombinant expression in *E. coli* and/or has improved properties such as improved thermal stability and/or improved catalytic properties.

It was surprisingly found that the properties of HRP could be improved by introducing mutations at the positions proline-146 (P146) and/or asparagine-275 (N275) of wild-type HRP. In particular, it was found that such HRP mutants can be recombinantly produced in *E. coli* in high yields (in particular using the method according to the invention) and good purity, display surprisingly good thermostability (see Example 7) and surprisingly high enzymatic activity (see Example 8). Even though a number of mutations of HRP have been investigated (see Humer and Spadiut, "Improving the performance of horseradish peroxidase by site-directed mutagenesis." International Journal of Molecular Sciences 20.4 (2019): 916), substitution of the amino acids P146 and/or N275 has not been described in the prior art.

The sequence of wild-type HRP is known in the art, e.g. from Gajhede et al ("Crystal structure of horseradish peroxidase C at 2.15 Å resolution." Nature Structural Biology 4.12 (1997): 1032-1038, Protein Data Bank PDB ID 1ATJ) or from UniProt entry P00433. Unless specified otherwise, the residue numbering as used herein refers to the sequence of wild-type HRP as set forth in SEQ ID NO: 1 (the positions P146 and N275 are indicated below in bold).

lead to an unexpectedly higher thermostability than the exchange of only one position (HRP N13D/N57S/P146Q/N175S/N255D/N268D or HRP N13D/N57S/N175S/N255D/N268D/N275K).

In the context of the present invention, it is especially preferred if the heme peroxidase comprises an amino acid sequence, which comprises at least one amino acid exchange compared to SEQ ID NO: 1, wherein said at least one amino acid exchange is selected from the group consisting of P146Q, P146A, P146R, P146V, P146E, N275K, N275R, N275D, N275S, N275Q, N275A and N275E. P146Q and N275K are in particular preferred.

It is further preferred if the amino acid sequence comprises an amino acid exchange selected from the group consisting of P146Q, P146A, P146R, P146V and P146E, especially P146Q, compared to SEQ ID NO: 1. It is further preferred if the amino acid sequence comprises an amino

```
Wild-type HRP (SEQ ID NO: 1):
  0 QLTPTFYDNS CPNVSNIVRD TIVNELRSDP RIAASILRLH FHDCFVNGCD ASILLDNTTS
 60 FRTEKDAFGN ANSARGFPVI DRMKAAVESA CPRTVSCADL LTIAAQQSVT LAGGPSWRVP
120 LGRRDSLQAF LDLANANLPA PFFTLPQLKD SFRNVGLNRS SDLVALSGGH TFGKNQCRFI
180 MDRLYNFSNT GLPDPTLNTT YLQTLRGLCP LNGNLSALVD FDLRTPTIFD NKYYVNLEEQ
240 KGLIQSDQEL FSSPNATDTI PLVRSFANST QTFFNAFVEA MDRMGNITPL TGTQGQIRLN
300 CRVVNS
```

The plant-derived enzyme undergoes post-translational modifications, resulting inter alia in a free N-terminus without an appended methionine. However, when recombinantly produced, e.g. in *E. coli*, it will typically be produced with an N-terminal methionine residue resulting from the start codon. Recombinantly produced wild-type HRP therefore typically has the following sequence:

acid exchange selected from the group consisting of N275K, N275R, N275D, N275S, N275Q, N275A and N275E, preferably N275K, compared to SEQ ID NO: 1. It is most preferred, if one of the preferred amino acid exchanges for P146 (especially P146Q) and one of the preferred amino acid exchanges for N275 (especially N275K) are combined. As can be seen from the experimental results provided in

```
Recombinantly produced wild-type HRP (SEQ ID NO: 2):
  0 MQLTPTFYDN SCPNVSNIVR DTIVNELRSD PRIAASILRL HFHDCFVNGC DASILLDNTT
 60 SFRTEKDAFG NANSARGFPV IDRMKAAVES ACPRTVSCAD LLTIAAQQSV TLAGGPSWRV
120 PLGRRDSLQA FLDLANANLP APFFTLPQLK DSFRNVGLNR SSDLVALSGG HTFGKNQCRF
180 IMDRLYNFSN TGLPDPTLNT TYLQTLRGLC PLNGNLSALV DFDLRTPTIF DNKYYVNLEE
240 QKGLIQSDQE LFSSPNATDT IPLVRSFANS TQTFFNAFVE AMDRMGNITP LTGTQGQIRL
300 NCRVVNS
```

In an embodiment of the present invention, the heme peroxidase comprises a polypeptide comprising the amino acid sequence as set forth in SEQ ID NO: 1. Even more preferably, the heme peroxidase is the polypeptide consisting of the amino acid sequence as set forth in SEQ ID NO: 2. Particularly good results were obtained when the heme peroxidase is a polypeptide comprising an amino acid sequence comprising at least two amino acid exchanges compared to SEQ ID NO: 1, wherein said at least two amino acid exchanges are exchanges of the amino acids P146 and N275 of SEQ ID NO: 1. As can be seen from the experimental results provided in Example 7, the combination of amino acid exchanges of both P146 and N275 (in HRP N13D/N57S/P146Q/N175S/N255D/N268D/N275K) can Examples 7 and 8, such combination can lead to both high thermostability (in HRP N13D/N57S/P146Q/N175S/N255D/N268D/N275 when compared to HRP N13D/N57S/P146Q/N175S/N255D/N268D or HRP N13D/N57S/N175S/N255D/N268D/N275K) and high enzymatic activity (in HRP N13D/N57S/P146Q/N175S/N255D/N268D/N275 when compared to HRP N13D/N57S/N175S/N255D/N268D). In the context of the present invention, particularly favorable results were observed when the polypeptide comprises an amino acid sequence as set forth in SEQ ID NO: 3. Said sequence comprises the amino acid exchanges P146Q and N275K, as well as the amino acid exchanges N13D, N57S, N175S, N255D and N268D with respect to SEQ ID NO: 1 (all marked in bold below).

```
HRP N13D/N57S/P146Q/N175S/N255D/N268D/N275K (SEQ ID NO: 3):
  0 QLTPTFYDNS CPDVSNIVRD TIVNELRSDP RIAASILRLH FHDCFVNGCD ASILLDSTTS

60 FRTEKDAFGN ANSARGFPVI DRMKAAVESA CPRTVSCADL LTIAAQQSVT LAGGPSWRVP

120 LGRRDSLQAF LDLANANLPA PFFTLQQLKD SFRNVGLNRS SDLVALSGGH TFGKSQCRFI
```

```
-continued
180 MDRLYNFSNT GLPDPTLNTT YLQTLRGLCP LNGNLSALVD FDLRTPTIFD NKYYVNLEEQ

240 KGLIQSDQEL FSSPDATDTI PLVRSFADST QTFFKAFVEA MDRMGNITPL TGTQGQIRLN

300 CRVVNS
```

As noted above for wild-type HRP, when recombinantly produced, e.g. in *E. coli*, mutant HRP will typically be produced with an N-terminal methionine residue resulting from the start codon. The HRP mutant described above will therefore typically be recombinantly produced as a protein with the following sequence:

```
Recombinantly produced HRP N13D/N57S/P146Q/N175S/N255D/N268D/N275K
(SEQ ID NO: 4):
  0 MQLTPTFYDN SCPDVSNIVR DTIVNELRSD PRIAASILRL HFHDCFVNGC DASILLDSTT

60 SFRTEKDAFG NANSARGFPV IDRMKAAVES ACPRTVSCAD LLTIAAQQSV TLAGGPSWRV

120 PLGRRDSLQA FLDLANANLP APFFTLQQLK DSFRNVGLNR SSDLVALSGG HTFGKSQCRF

180 IMDRLYNFSN TGLPDPTLNT TYLQTLRGLC PLNGNLSALV DFDLRTPTIF DNKYYVNLEE

240 QKGLIQSDQE LFSSPDATDT IPLVRSFADS TQTFFKAFVE AMDRMGNITP LTGTQGQIRL

300 NCRVVNS
```

As mentioned above, typically the mutants used in the context of the present invention comprise the N-terminal methionine. However, in all cases, the amino acid numbering used according to the present invention is applied according to the wild-type sequence lacking the N-terminal methionine (SEQ ID NO: 1); i.e. this numbering is applied to mutants comprising an N-terminal methionine correspondingly, meaning that e.g. in SEQ ID NO: 4 mutation N13D is at (absolute) position no. 14, etc. This is applicable also to further mutant embodiments which carry deletions or insertions.

In the context of the present invention, the heme peroxidase preferably is a polypeptide having peroxidase activity and comprising an amino acid sequence having at least 70% sequence identity to SEQ ID NO: 3, wherein said amino acid sequence comprises at least one amino acid exchange compared to SEQ ID NO: 1, wherein said at least one amino acid exchange is an exchange of the amino acid P146 or of the amino acid N275 of SEQ ID NO: 1.

In a preferred embodiment, the heme peroxidase comprises an amino acid sequence having at least 70%, preferably at least 75%, preferably at least 80%, more preferably at least 85%, even more preferably at least 90%, yet even more preferably at least 95%, especially at least 98%, most preferably at least 99% sequence identity to SEQ ID NO: 3. In order of increasing preference, the amino acid sequence has at least 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100% sequence identity with SEQ ID NO: 3. It is especially preferred, if said amino acid sequence is the sequence as set forth in SEQ ID NO: 3. It is most preferred if the heme peroxidase consists of the amino acid sequence as set forth in SEQ ID NO: 4.

It is further preferred, if the amino acid sequence further comprises at least one, preferably at least two, more preferably at least three, even more preferably at least four, especially 5 amino acid exchanges compared to SEQ ID No: 1 selected from the group consisting of N13D, N57S, N175S, N255D, and N268D.

The mutations N13D, N57S, N255D and N268D have been disclosed in Capone et al. ("Glyco-variant library of the versatile enzyme horseradish peroxidase." Glycobiology 24.9 (2014): 852-863) as well as in Humer and Spadiut ("Improving the performance of horseradish peroxidase by site-directed mutagenesis." International Journal of Molecular Sciences 20.4 (2019): 916). Unrelated thereto, and only in the context of expression in yeast, the mutation N175S has been disclosed in Morawski et al. ("Functional expression and stabilization of horseradish peroxidase by directed evolution in *Saccharomyces cerevisiae*." Biotechnology and Bioengineering 76.2 (2001): 99-107).

All the above mutations N13D, N57S, P146Q, N175S, N255D, N268D and N275K with respect to SEQ ID NO: 1 are preferred in the context of the invention; both individually and in combination with each other. It was surprisingly found that the combination of the five mutations N13D, N57S, N175S, N255D and N268D leads to a particularly high thermostability (see Example 6). Moreover, further combination with the hitherto completely unknown mutations P146Q and N275K led to a significant enhancement of enzymatic activity (see Example 3; SEQ ID NO: 4).

Several further mutations of native HRP are known in the art, which are also preferred in the context of the present invention. For instance, Ryan et al. ("Effects of single mutations on the stability of horseradish peroxidase to hydrogen peroxide." Biochimie 89.8 (2007): 1029-1032) describe beneficial effects of the mutations K232N and T110V. In a preferred embodiment, the amino acid sequence therefore further comprises the amino acid exchange T110V or K 232N compared to SEQ ID NO: 1.

In the context of the present invention, "peroxidase activity" preferably means activity for at least one of the substrates 3,3',5,5'-tetramethylbenzidine (TMB), 2,2'-azino-bis (3-ethylbenzothiazoline-6-sulfonic acid) (ABTS), or hydrogen peroxide ($H_2O_2$). Preferably, the heme peroxidase has a peroxidase activity corresponding to a kcat/Km value for the substrate TMB of at least 0.01 $mM^{-1}s^{-1}$, preferably at least 0.1 $mM^{-1}s^{-1}$, more preferably at least 1 $mM^{-1}s^{-1}$, even more preferably at least 10 $mM^{-1}s^{-1}$, even more preferably at least 20 $mM^{-1}s^{-1}$, even more preferably at least 100 $mM^{-1}s^{-1}$, yet even more preferably at least 1000 $mM^{-1}s^{-1}$, yet even more preferably at least 10000 $mM^{-1}s^{-1}$, especially at least 20000 $mM^{-1}s^{-1}$, when measured in 50 mM phosphate-citrate buffer containing 1 mM $H_2O_2$ at pH 5 and 30° C. In another preferred embodiment, the heme peroxidase has a peroxidase activity corresponding to a kcat/Km value for the substrate ABTS of at least 0.1 $mM^{-1}s^{-1}$, preferably at least 1 $mM^{-1}s^{-1}$, more preferably at least 10 $mM^{-1}s^{-1}$, even more preferably at least 100 $mM^{-1}s^{-1}$, most preferably at least 250 $mM^{-1}s^{-1}$ when measured in 50 mM phosphate-citrate buffer containing 1 mM $H_2O_2$ at pH 5 and 30° C. In yet another preferred embodiment, the heme peroxidase has a peroxidase activity corresponding to a kcat/Km value for the substrate $H_2O_2$ of at least 1 $mM^{-1}s^{-1}$, preferably at least 10 $mM^{-1}s^{-1}$, more preferably at least 100 $mM^{-1}s^{-1}$, even more preferably at least 1000 $mM^{-1}s^{-1}$, most preferably at least 2500 $mM^{-1}s^{-1}$ when measured in 50 mM phosphate-citrate buffer containing 10 mM ABTS at pH 5 and 30° C. Preferably, the peroxidase activity is measured as described in Example 6. 50 mM phosphate-citrate buffer can be obtained by adding 25.7 ml of 0.2 M dibasic sodium phosphate and 24.3 ml of 0.1 M citric acid to 50 mL of deionized water.

It is further preferred that the peroxidase activity of the heme peroxidase is at least 10%, preferably at least 20%, more preferably at least 50% of the peroxidase activity of wild-type HRP, in particular of a polypeptide consisting of the amino acid sequence as set forth in SEQ ID NO: 1 or SEQ ID NO: 2, preferably SEQ ID NO: 2, especially when the polypeptides are produced and measured under the same conditions.

It is further preferred if the heme peroxidase has an increased thermostability with respect to wild-type HRP. With respect to the amino acid sequence with a certain % sequence identity to SEQ ID NO: 3 as defined above, it is preferred if a polypeptide consisting of said amino acid sequence has an increased thermostability with respect to a polypeptide consisting of the amino acid sequence as set forth in SEQ ID NO: 1 or SEQ ID NO: 2, preferably SEQ ID NO: 2. A methionine residue can be appended to the N-terminus of said amino acid sequence with a certain % sequence identity to SEQ ID NO: 3 so that it can be recombinantly produced in *E. coli*; i.e. it is preferred if a polypeptide consisting of an N-terminal methionine residue followed by said amino acid sequence has an increased thermostability with respect to a polypeptide consisting of the amino acid sequence as set forth in SEQ ID NO: 2). In order to compare the thermostability of such two polypeptides, the polypeptides can be produced and measured under the same conditions. "Increased thermostability" preferably means a longer half-life when incubated at 60° C. in a buffer consisting of 20 mM BisTris/HCl pH 7, 7% glycerol and 500 mM NaCl. It is preferred that said half-life of a polypeptide consisting of said amino acid sequence (and/or of the heme peroxidase comprising said amino acid sequence) is at least 1.5-fold, preferably at least 3-fold, more preferably at least 6-fold, even more preferably at least 12-fold higher with respect to the polypeptide consisting of the amino acid sequence as set forth in SEQ ID NO: 1 or SEQ ID NO: 2, preferably SEQ ID NO: 2. Preferably, the half-life is determined by measuring the residual peroxidase activity with 7 mM ABTS in 50 mM phosphate-citrate buffer containing 1 mM $H_2O_2$ at pH 5 and 30° C. at different time points. For measurements of half-lives, it is preferred that the concentration of the polypeptides is 2.86 µM. Preferably, the half-life is determined as described in Example 6.

In a preferred embodiment, the heme peroxidase and/or a polypeptide consisting of the amino acid sequence with a certain % sequence identity to SEQ ID NO: 3 as defined above has a half-life at 60° C. of at least 0.5 hours, preferably at least 1 hour, more preferably at least 2 hours, even more preferably at least 4 hours, most preferably at least 6 hours in a buffer consisting of 20 mM BisTris/HCl pH 7, 7% glycerol and 500 mM NaCl, as measured by the residual peroxidase activity with 7 mM ABTS in 50 mM phosphate-citrate buffer containing 1 mM $H_2O_2$ at pH 5 and 30° C.

In the context of the inventive method for producing the heme peroxidase, it was surprisingly found that spreading out the addition of the heme cofactor to the refolding mix over a certain period of time leads to superior results compared to adding the cofactor all at once in one batch (see Example 3; comparison of Tables 5 and 6). Slower additions of the heme cofactor are generally preferred. The addition of the heme cofactor to the refolding mix is preferably distributed over a time period of at least 1 hour, but even longer time periods are even more preferred. In increasing order of preference, the time period is at least 2 hours, 3 hours, 4 hours, 5 hours, 6 hours, 7 hours, 8 hours, 9 hours, especially at least 10 hours. In this context, "distributed over a time period of at least 1 hour" can mean that a constant feed of the heme cofactor is applied for a period of at least 1 hour or that the total amount of heme cofactor is divided up into several smaller doses, e.g. one dose every 10 minutes or every hour for a time period of several hours. The same applies correspondingly to other time periods (e.g. in the preferred embodiment wherein the addition is distributed over a time period of at least 10 hours, a part of the cofactor could be added once per hour over a period of at least 10 hours or as a constant feed over at least 10 hours). It is preferred that the heme cofactor addition involves at least 2 (but preferably at least 3, more preferably at least 4, even more preferably at least 6, most preferably at least 10) increases of heme cofactor concentration, wherein the first and the last increase are separated at least by the time period specified above (e.g. at least 2 heme cofactor concentration increases separated by at least 1 hour, preferably by at least 4 hours, especially at least 10 hours). This can be achieved both by multiple discrete steps of heme cofactor concentration increases (the total amount of heme cofactor addition is divided into multiple smaller doses) or by a continuous supply of heme cofactor, or by a combination of the two. It is especially advantageous if the total amount of heme cofactor added to the refolding mix is distributed evenly. It is therefore preferred if not more than 80%, preferably not more than 70%, more preferably nor more than 60%, even more preferably not more than 50%, even more preferably not more than 40%, even more preferably not more than 30%, yet even more preferably not more than 20%, most preferably not more than 10% of total amount of heme cofactor added to the refolding mix is added over a time period of less than 1 hour.

It is especially preferred if the heme cofactor is added to the refolding mix as a continuous feed, since this allows a particularly slow and well distributed addition of the heme cofactor. It is particularly advantageous if the concentration of the heme cofactor supplied with the heme cofactor feed is constant over time.

In a preferred embodiment of the inventive method, the heme cofactor is added to the refolding mix at a rate between 0.1 and 10 µmol/L per hour, preferably between 0.2 and 5 µmol/L per hour, even more preferably between 0.5 and 3 µmol/L per hour, yet even more preferably between 1 and 2.5 µmol/L per hour, especially between 1.4 and 1.8 µmol/L per hour. With respect to the heme peroxidase present in the refolding mix, it is preferred if the heme cofactor is added at a rate between 0.01 and 1 molar equivalents per hour, preferably between 0.02 and 0.5 molar equivalents per hour, more preferably between 0.05 and 0.2 molar equivalents per hour. Said rates are preferably average rates, i.e. if the heme cofactor is applied in discrete steps over a certain time period, the average rate can be calculated by dividing the total amount of heme cofactor by the time period between the first and the last step.

In the context of the present invention it was found that results can be even further improved, when the heme cofactor is not immediately added to the refolding mix, especially when it is not already present in the refolding buffer. Instead, it was found to be advantageous if the heme cofactor is only added after incubating the refolding mix for a certain period of time (see in particular Example 2, DoE4 and FIG. 1). It was thus found to be advantageous if the refolding could proceed at least for a certain period of time in the absence of the heme cofactor. In a preferred embodiment of the invention, the refolding mix therefore is incubated for at least 1 hour, preferably at least 2 hours, even more preferably at least 4 hours, especially at least 8 hours prior to the addition of the heme cofactor. This, however, does not mean that no heme cofactor can be present at all during this incubation time; in the context of this embodiment it is merely required that heme cofactor is added to the refolding mix after the specified time period. Preferably, during said time period there is, however, less than 10 µM, preferably less than 2 µM, even more preferably less than 0.5 µM, most preferably less than 0.1 µM of the heme cofactor present in the refolding mix.

In a preferred embodiment, at least 1 µmol/L, preferably at least 4 µmol/L, even more preferably at least 10 µmol/L, especially at least 20 µmol/L of the heme cofactor is added to the refolding mix. Preferably between 1 µmol/L and 200 µmol/L, more preferably between 4 µmol/L and 100 µmol/L, even more preferably between 10 µmol/L and 50 µmol/L, especially between 15 µmol/L and 25 µmol/L of the heme cofactor is added to the refolding mix. It is especially preferred if at least 0.25, preferably at least 0.5, even more preferably at least 1, especially at least 2 molar equivalents of the heme cofactor with respect to the heme peroxidase are added to the refolding mix. In particular, between 0.25 and 10, preferably between 0.5 and 5, even more preferably between 1 and 4, especially between 1 and 2 molar equivalents of the heme cofactor with respect to the heme peroxidase may be added to the refolding mix.

In order to obtain the IBs for use in the method according to the invention, standard techniques known in the art can be used. The skilled person is familiar with methods to recombinantly express a certain heme peroxidase in suitable host cells, e.g. *E. coli*, and obtain IBs containing said heme peroxidase. Preferably, the heme peroxidase in the form of IBs is provided by the steps of: culturing host cells expressing a gene encoding the heme peroxidase; and obtaining IBs from said host cells. It is preferred that the host cells are prokaryotic cells, preferably *E. coli* cells.

Because of its advantageous properties the method according to the invention is well suited to produce heme peroxidases in large quantities. As demonstrated by the Examples described herein, the inventive method is scalable to larger culturing volumes and thus larger amounts of produced heme peroxidase. In a preferred embodiment, the cells are therefore cultured in a volume of at least 2 L, preferably at least 5 L, more preferably at least 20 L, even more preferably at least 50 L, especially at least 100 L.

In the course of the present invention it turned out that the method for producing the heme peroxidase can be even further improved by using specific compositions of the solubilization and the refolding buffers (see Examples 2-5). Preferably, solubilizing the IBs comprises incubating the IBs in a solubilization buffer. As described in the Examples, it was found that a certain pH of said solubilization buffer leads to particularly advantageous results (see especially Example 2, Table 3 as well as FIGS. 2 and 3). In particular it is preferred if the solubilization buffer has a pH of at least 8, preferably at least 8.5, more preferably at least 9.0, even more preferably at least 9.5. It is further preferred if the solubilization buffer has a pH between 8 and 12.5, preferably between 8.5 and 11.5, more preferably between 9 and 11, even more preferably between 9.5 and 10.5.

Preferably the solubilization buffer used for solubilizing the IBs contains a reducing agent. In the context of the present invention, it was found that certain concentrations of reducing agents lead to particularly advantageous results (see in particular Example 2, DoE1-3; Example 3, Reactor runs 1-4). Preferably the reducing agent is DTT. However, other reducing agents can be used as well. The skilled person is familiar with other reducing agents commonly used for IB solubilization, e.g. β-ME, TCEP (tris(2-carboxyethyl)phosphine), cysteine, etc. All of these reducing agents are also preferred in the context of the inventive method. It is preferred that the redox conditions in the solubilization buffer correspond to a DTT concentration between 1 and 50 mmol/L DTT, preferably between 2 and 25 mmol/L, more preferably between 4 and 15 mmol/L, especially between 6 and 8 mmol/L. In this context, the term "redox conditions" refers to the reduction potential and "correspond to" means that either DTT is present in the amount indicated or that another reducing agent (such as e.g. β-ME, TCEP or cysteine) is present in a concentration which leads to the same reduction potential, as measured in a solution of 50 mM glycine, 6 M urea in water at pH 10, at 25° C.

Preferably, the reduction potential of the solubilization buffer is between −150 mV and −500 mV, preferably between −200 mV and −450 mV, more preferably between −250 mV and −400 mV, even more preferably between −280 mV and −370 mV, yet even more preferably between −300 mV and −340 mV, most preferably between −310 mV and −330 mV. The reduction potential is preferably measured at a temperature of 25° C. and a pressure of 101.300 Pa. The skilled person is familiar with methods to measure the reduction potential. Preferably, the measurement of the reduction potential is carried out with an EasyFerm Plus ORP Arc 425, connected to the Lucullus process system, preferably as described in Example 3. Alternatively, the measurement can be carried out as described in the standard ASTM D1498-14 ("Standard Test Method for Oxidation— Reduction Potential of Water", ASTM International, West Conshohocken, PA, 2014, www.astm.org).

In another preferred embodiment the reducing agent contains thiol groups. Preferably, the concentration of thiol groups in the solubilization buffer is between 2 and 100 mmol/L, preferably between 4 and 50 mmol/L, more preferably between 8 and 30 mmol/L, especially between 12 and 16 mmol/L. The concentration of thiol groups in the solubilization buffer preferably is determined based on the concentration of thiol-containing substances added to the solubilization buffer (e.g. DTT contains 2 thiol groups per molecule; a concentration of 1 mmol/L DTT therefore corresponds to a concentration of 2 mmol/L thiol groups). Alternatively, the concentration of thiol groups can also be determined experimentally. Preferably, the concentration of thiol groups in the solubilization buffer is measured using Ellman's reagent. Ellman's reagent (5,5'-dithiobis-(2-nitrobenzoic acid) or DTNB) is a chemical used to quantify the number or concentration of thiol groups in a sample. The skilled person is familiar with how to perform measurements using Ellman's reagent. Preferably the measurement is carried out as described in Simpson ("Estimation of Free Thiols and Disulfide Bonds Using Ellman's Reagent." CSH Protocols 2008 (2008): pdb-prot4699).

In addition to the reducing agent, the solubilization buffer typically contains a denaturing agent. The skilled person is familiar with suitable denaturing agents, e.g. urea or GdnHCl. Preferably, the solubilization buffer contains urea, preferably in a concentration of at least 4 mol/L, more preferably at least 5 mol/L, even more preferably at least 6 mol/L. Preferably the solubilization buffer contains between 4 mol/L and 8 mol/L urea, preferably between 5 mol/L and 7 mol/L, especially between 5.5 and 6.5 mol/L.

For solubilizing the IBs, it is preferred if the IBs are incubated in the solubilization buffer for at least 5 minutes, preferably at least 10 minutes, more preferably at least 15 minutes, especially at least 30 minutes. Preferably the IBs are incubated in said solubilization buffer at a temperature between 4° C. and 40° C., preferably between 10° C. and 35° C., even more preferably between 20° C. and 25° C.

Advantageous results can be obtained when the solubilized IBs are mixed with the refolding buffer in a ratio between 1:5 v/v and 1:250 (solubilized IBs: refolding buffer), preferably between 1:10 and 1:100, even more preferably between 1:20 and 1:80, especially between 1:30 and 1:60. As noted above, the inventive method is particularly well suited to produce the heme peroxidase in large amounts. Therefore, the refolding is preferably carried out in a volume of at least 5 L, preferably at least 10 L, more preferably at least 25 L, even more preferably at least 100 L. This means that the refolding mix preferably has a volume of at least 5 L, preferably at least 10 L, more preferably at least 25 L, even more preferably at least 100 L.

Figure 2:
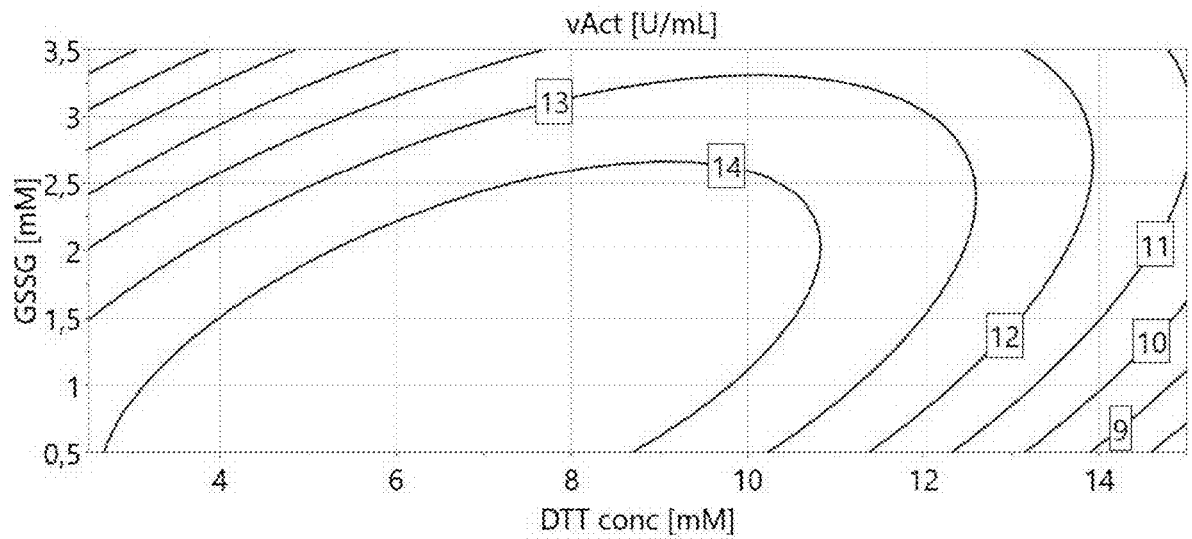
Figure 3:
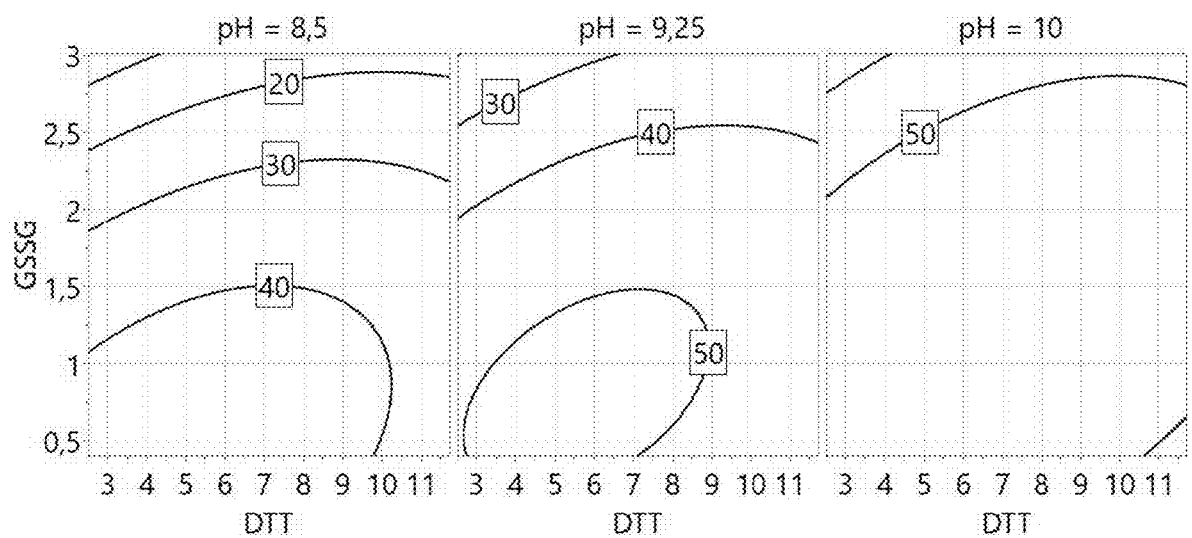

Similar as in the case of the solubilization buffer, advantageous effects were found for certain pH-ranges of the refolding buffer (see in particular Tables 3, 7 and 14 as well as FIGS. 2 and 3). Accordingly, it is preferred if the refolding buffer has a pH of at least 8, preferably at least 8.5, more preferably at least 9, even more preferably at least 9.5. In particular, it is preferred if the refolding buffer has a pH between 8 and 12.5, preferably between 8.5 and 11.5, more preferably between 9 and 11, even more preferably between 9.5 and 10.5. It is especially preferred if the difference in the pH between the solubilization buffer and the refolding buffer is less than 2 pH increments, preferably less than 1 pH increment, more preferably less than 0.5 pH increments, even more preferably less than 0.2 pH increments, especially less than 0.1 pH increments. This means that, for example, if the pH of the solubilization buffer is 10, the pH of the refolding buffer is preferably between 9 and 11 (i.e. the difference is less than 1 pH increment), more preferably between 9.5 and 10.5 (the difference is less than 0.5 pH increments), etc.

Preferably the refolding buffer used in the context of the inventive method contains an oxidizing agent. The skilled person is familiar with oxidizing agents that are commonly used in refolding buffers, e.g. glutathione disulfide (GSSG) or cystine, which are all preferred in the context of the inventive method. As is demonstrated herein in the Examples (see e.g. Tables 1, 3 and 7 as well as FIGS. 2 and 3) advantageous effects were observed with certain concentrations of oxidizing agents. Preferably, the refolding buffer has redox conditions corresponding to a GSSG concentration between 0.2 and 6 mM GSSG, preferably between 0.4 and 4 mM GSSG, more preferably between 0.8 and 2.5 mM GSSG, especially between 1.1 and 1.6 mM GSSG. In this context, the term "redox conditions" refers to the reduction potential and "correspond to" means that either GSSG is present in the amount indicated or that another oxidizing agent (such as cystine) is present in a concentration which leads to the same reduction potential, when measured in a solution of 20 mM glycine, 2 mM $CaCl_2$, 2 M Urea, 7% v/v glycerol at pH 10, at 25° C. Preferably, the refolding buffer has a reduction potential between 50 mV and 110 mV, preferably between 60 mV and 100 mV, more preferably between 65 mV and 95 mV, most preferably between 70 mV and 90 mV. Preferably, the reduction potential is measured as described herein above in the context of the solubilization buffer.

It is further preferred that the refolding buffer contains a denaturing agent. The same denaturing agents are preferred as for the solubilization buffer, albeit in lower concentrations. Preferably, the refolding buffer contains between 0.5 and 3 mol/L urea, preferably between 1 mol/L and 2.7 mol/L, even more preferably between 1.5 mol/L and 2.4 mol/L, especially between 1.8 and 2.2 mol/L.

It is particularly preferred if the refolding mix contains both DTT and GSSG. Preferably, the molar ratio between DTT and GSSG in the refolding mix is between 1:2 (DTT: GSSG) and 1:30, preferably between 1:3 and 1:20, even more preferably between 1:4 and 1:15, especially between 1:6 and 1:8. These ratios are to be understood as calculated based on the initial amounts of DTT and GSSG added to the solubilization buffer and to the refolding buffer; consumption of DTT and/or GSSG is not to be considered.

Preferably, the refolding mix has a reduction potential between −105 mV and 135 mV, preferably between −90 mV and 105 mV, even more preferably between −80 mV and 80 mV, yet even more preferably between −70 mV and 60 mV, most preferably between −60 mV and 50 mV. Preferably said reduction potential is measured as described above in the context of the solubilization buffer. Preferably, the reduction potential is measured immediately upon mixing the solubilization buffer and the refolding buffer, before the addition of the heme cofactor.

In the context of the present invention, it was found to be advantageous when a precipitation step involving high salt concentrations is included after refolding (see Example 4, Table 9). It was surprisingly found that impurities can be effectively removed in this way without precipitating significant amounts of the heme peroxidase. Therefore, the inventive method preferably further comprises the step of adding salt to the refolding mix. In a preferred embodiment, the concentration of the salt is between 2 mol/L and 12 mol/L, preferably between 4 mol/L and 10 mol/L, even more preferably between 4.5 mol/L and 8 mol/L. Particularly good results were obtained when the salt is sodium chloride, preferably in a concentration between 0.5 and 6 mol/L, more preferably between 1.5 and 5.5 mol/L, even more preferably between 2.5 and 5 mol/L, especially between 3.5 and 4.5 mol/L. In another preferred embodiment, for which good results were obtained, the salt is ammonium sulfate, preferably in a concentration between 0.25 and 1.5 mol/L, preferably between 0.5 and 1.4 mol/L, even more preferably between 0.8 and 1.2 mol/L. Any salts commonly used for salting out proteins can be used in the context of the inventive method. The skilled person is familiar with such salts, e.g. KCl, $K_2CO_3$, $CaCl_2$, $NH_4Cl$, $Na_2SO_4$, or NaOAc. The optimum concentration of such alternative salts can be based on the ionic strength of the resulting solution (defined as $I=0.5*\Sigma(c_i*z_i^2)$, wherein $c_i$ is the molar concentration of each ion and $z_i$ is the charge number of that ion; the sum is taken over all ions contained in the salt; e.g. for 1 mol/L $(NH_4)_2SO_4$ the ionic strength would be I=0.5*(2 mol/

L*1²+1 mol/L*2²)=3 mol/L). Preferably the salt is added to the refolding mix to an ionic strength between 0.5 and 6 mol/L, preferably between 1.5 and 5 mol/L, even more preferably between 2.5 and 4.5 mol/L, especially between 3.5 and 4.5 mol/L.

The salting-out strength of a particular salt can also be determined by its position in the so-called Hofmeister series (also called "lyotropic series"). The Hofmeister series is a classification of ions in order of their ability to salt out or salt in proteins (exemplary anions in order of decreasing salting out strength are $SO_4^{2-}$>$HPO_4^{2-}$>$OAc^-$>$Cl^-$>$NO_3^-$>$I^-$>$SCN^-$; equally for cations: $NH_4^+$>$K^+$>$Na^+$>$Li^+$>$Mg_2^+$>$Ca_2^+$>guanidinium). In the context of the invention it is preferred, if the salt has a salting-out strength between ammonium sulfate and sodium chloride as determined by its position in the Hofmeister series, preferably wherein the concentration of the salt is between 1.25 and 6 mol/L, more preferably between 0.5 and 5 mol/L, even more preferably between 1.0 and 4.5 mol/L, most preferably between 1.5 and 4 mol/L. In a further preferred embodiment, the salt has a weaker salting-out strength than sodium chloride as determined by its position in the Hofmeister series, preferably wherein the concentration of the salt is at least 2 mol/L, preferably at least 4 mol/L, more preferably at least 4.5 mol/L. As used herein, a first salt is considered to have a higher/lower salting out strength than a second salt, if both the first salt's cation and its anion have a higher/lower salting out strength than the cation and anion of the second salt as determined by the Hofmeister series.

Preferably, the inventive method further comprises a centrifugation step for removing impurities from the refolded heme peroxidase. Alternatively or in addition thereto, the inventive method may further comprise a filtration step for removing impurities from the refolded heme peroxidase. These embodiments are especially advantageous when salt was added to the refolding mix so that impurities are precipitated but (most of) the heme peroxidase remains in solution.

Preferably, the method according to the invention further comprises the step of purifying the refolded heme peroxidase. It has been found to be particularly advantageous if the heme peroxidase is in its holo-form during purification; preferably, the heme peroxidase is therefore purified after the heme cofactor has been added to the refolding mix.

For the purpose of purification, frequently purification tags, such as polyhistidine-tags (typically consisting of a number of histidine residues, e.g. 6-10, often appended to the N- or C-terminus of the protein) are used in the art. Such tags can also be used in the context of the present invention. However, it is preferred if the heme peroxidase does not comprise a purification tag. In particular it is preferred if the heme peroxidase does not comprise a polyhistidine-tag.

In the context of the inventive method it is preferred that the heme peroxidase is purified by chromatography, especially by hydrophobic interaction chromatography (HIC). As demonstrated by the Examples, this type of purification leads to surprisingly good results, in particular to high final concentrations, excellent purity and high activity (see Example 4). HIC is in particular well suited in combination with a salt precipitation step for removing impurities, as described herein above, because HIC typically involves binding conditions with high salt concentrations. The high salt concentration can therefore precipitate impurities as well as excess heme cofactor while the correctly folded heme peroxidase remains in solution and can directly be used as the load for HIC. The skilled person is familiar with how to perform HIC; preferably it is performed as described in Example 4. It is especially preferred if the stationary phase is a butyl sepharose resin.

As user herein, a "heme peroxidase product" can be any product obtained from a heme peroxidase produced by the method according to the invention, e.g. a conjugate of the heme peroxidase to another molecule, e.g. a protein or an otherwise modified or derivatized heme peroxidase, e.g. a heme peroxidase linked to a solid carrier etc. The "heme peroxidase product" can also be any type of commercial product containing a heme peroxidase (or modified/derivatized/conjugated heme peroxidase), e.g. a composition containing such a heme peroxidase (e.g. in solution or in lyophilized form), or a container containing such a composition or any type of packaged product, such as a kit, containing such a container.

In many applications, heme peroxidases such as HRP are used as a conjugate with other molecules. Such conjugates are e.g. useful in techniques such as western blots, ELISA and immunohistochemistry. One type of conjugate that is widely used, is a conjugate with an antibody or another binding protein. In this case, a detectable signal can be generated at the site where the binding protein is bound to its target by adding a substrate of HRP. Other HRP conjugates that are frequently used include HRP-streptavidin conjugates (e.g. for use in sandwich ELISA applications for detecting biotinylated antibodies) or HRP-protein A, G or L conjugates (proteins A, G and L bind to immunoglobulins and are thus useful for detecting primary antibodies, e.g. in ELISA, ELISPOT, IHC, or Western blotting).

Many commercial suppliers provide kits for conjugating heme peroxidases such as HRP to proteins of interest; e.g. HRP Conjugation Kit/HRP Labeling Kit ab102890 from the company Abcam, LYNX Rapid HRP Antibody Conjugation Kit from the company Bio-Rad (product code LNK001P), or EZ-Link Plus Activated Peroxidase Kit from the company Thermo Fisher Scientific (catalogue number 31489). The purpose of such kits is typically to enable the user to conjugate the peroxidase to any protein of interest, e.g. an antibody. Such kits may comprise the heme peroxidase in activated form (for direct reaction with another protein) or the kit may comprise the heme peroxidase and a suitable crosslinker for conjugation by the user.

Thus, in a preferred embodiment, the inventive method further comprises the step of activating the heme peroxidase for a conjugation reaction. Preferably, the heme peroxidase is reacted with a crosslinker suitable for conjugating the heme peroxides to another molecule, preferably another protein. Suitable techniques for conjugation and suitable crosslinkers are known to the skilled person and can e.g. be found in the book Hermanson, Greg T. Bioconjugate Techniques. Academic press, 2013. Preferably, the crosslinker forms a covalent bond with the heme peroxidase. Preferably, the crosslinker comprises one, especially two reactive groups selected from the group consisting of NHS ester, succinimidyl ester, imidoester, difluoro, haloacetyl, maleimide, pyridyldithiol and hydrazide. For instance, the crosslinker may be a bifunctional PEG linker having a maleimide group and an active ester group, e.g. Maleimide-$PEG_8$-succinimidyl ester (CAS Number 756525-93-6, e.g. commercially available from Sigma-Aldrich cat. no. 746207).

Preferably, when the heme peroxidase is "activated for conjugation", this means that the heme peroxidase comprises a reactive group that is capable of forming a covalent bond with another protein, preferably with a binding protein, especially with an antibody. It is in particular preferred that the heme peroxidase is covalently linked to a chemical crosslinker as described above, in particular wherein at least one reactive group of the crosslinker is available for reaction with another molecule, preferably another protein. This can e.g. be achieved by reacting a further reactive group of the crosslinker with the heme peroxidase in order to form the covalent link.

The heme peroxidase product may consist of the heme peroxidase activated for conjugation packaged in a suitable container, e.g. a vial, in lyophilized form or in solution. However, the heme peroxidase and the crosslinker may also be provided separately; the heme peroxidase product may therefore be a kit comprising the heme peroxidase and the crosslinker. The method for producing a heme peroxidase product may therefore further comprise packaging the heme peroxidase as well as the crosslinker referred to above in a kit. Preferably said crosslinker is suitable for conjugating the polypeptide to another protein, preferably a binding protein.

The heme peroxidase produced according to the inventive method may be a polypeptide consisting of the amino acid sequence as set forth in SEQ ID NO: 4. However, said heme peroxidase may also be a polypeptide having peroxidase activity, as defined herein above, and further comprising the amino acid sequence of a further protein. Fusion proteins can be obtained by known methods, e.g. by generating a genetic fusion (joining the nucleic acid sequence encoding the heme peroxidase to a nucleic acid sequence encoding the further protein protein, preferably with the inclusion of a linker sequence between the two proteins). Said further protein may be streptavidin. In another preferred embodiment, said further protein is an antibody-binding protein, preferably protein A, protein G or protein L. In an especially preferred embodiment, the heme peroxidase produced according to the inventive method comprises an amino acid sequence of a binding protein. Said binding protein may be any protein that can act as an agent to bind to a molecule of interest, e.g. to detect a specific protein or another molecule. Preferably said binding protein is an antibody. In a further preferred embodiment, said binding protein is an antibody fragment, preferably a single-chain variable fragment (scFv) or an antigen-binding fragment (Fab). In a further preferred embodiment said binding protein is an antibody mimetic, preferably selected from the group consisting of adnectins, affibodies, anticalins, DARPins, engineered Kunitz-type inhibitors, and monobodies. Many such suitable binding proteins are known from the art, e.g. from Gebauer and Skerra ("Engineered protein scaffolds as next-generation antibody therapeutics." Current opinion in chemical biology 13.3 (2009): 245-255).

In a preferred embodiment of the inventive method for producing a heme peroxidase product, said method further comprises a conjugation reaction to obtain a heme peroxidase conjugate. Preferably, the heme peroxidase is conjugated to a binding agent, preferably an antibody. In further preferred embodiments, the binding agent is a binding protein, preferably any binding protein listed above. It is especially preferred, if the heme peroxidase is conjugated to an antibody fragment, preferably a single-chain variable fragment (scFv) or an antigen-binding fragment (Fab). It is further preferred if the heme peroxidase is conjugated to an antibody mimetic, preferably selected from the group consisting of adnectins, affibodies, anticalins, DARPins, engineered Kunitz-type inhibitors, and monobodies. In another preferred embodiment, the heme peroxidase is conjugated to an antibody binding protein, preferably protein A, protein G, or protein L. In yet another preferred embodiment, the heme peroxidase is conjugated to a further protein, preferably streptavidin.

Conjugates between heme peroxidases and other proteins can be obtained by conjugation reactions, which are known to the skilled person, e.g. by chemical crosslinking. For this purpose, the heme peroxidase and the other protein can be linked together by a chemical crosslinker, forming a stable, preferably covalent, link between the two molecules. Such methods, often referred to as bioconjugation, are known in the art. A large number of suitable methods can e.g. be found in the book Hermanson, Greg T. Bioconjugate Techniques. Academic press, 2013.

The inventive method for producing the heme peroxidase product may comprise further purification, concentration, or other processing of the heme peroxidase. Preferably, the method further comprises the step of purifying the heme peroxidase or the heme peroxidase conjugate. The heme peroxidase, in this context, may already have been derivatized or otherwise modified. In a preferred embodiment, the method further comprises the step of freezing the heme peroxidase or the heme peroxidase conjugate. Alternatively to, or in combination with the above embodiments, the method preferably further comprises the step of lyophilizing the heme peroxidase or the heme peroxidase conjugate.

The heme peroxidase product may also be a composition comprising the heme peroxidase produced by the method according to the invention or a product (e.g. a container) containing said composition. Preferably, one or more excipients are added to said composition. Such excipients may, for instance, further increase the stability of the heme peroxidase in storage, ensure an even longer shelf-life and a stable level of biological activity. Preferred excipients include pH buffering agents, stabilizing agents, bulking agents, tonicity modifiers and the like. Especially preferred are excipients that are suitable for use in the context of lyophilization.

Suitable excipients are known to the person skilled in the art. For example, the composition preferably contains a pH buffering agent, preferably selected from the group consisting of glycine, histidine, glutamate, succinate, phosphate, acetate, and aspartate. It is further preferred that the composition comprises a bulking agent, preferably selected from the group consisting of mannitol, glycine, sucrose, dextran, polyvinylpyrrolidone, carboxymethylcellulose, lactose, sorbitol, trehalose, or xylitol. The composition preferably comprises a stabilizing agent selected from the group consisting of sucrose, trehalose, mannose, maltose, lactose, glucose, raffinose, cellobiose, gentiobiose, isomaltose, arabinose, glucosamine, fructose, mannitol, sorbitol, glycine, arginine HCL, poly-hydroxy compounds, including polysaccharides such as dextran, starch, hydroxyethyl starch, cyclodextrins, N-methyl pyrollidene, cellulose and hyaluronic acid, sodium chloride. The composition may further include a surfactant, preferably selected from the group consisting of sodium lauryl sulfate, dioctyl sodium sulfosuccinate, dioctyl sodium sulfonate, chenodeoxycholic acid, N-lauroylsarcosine sodium salt, lithium dodecyl sulfate, 1-octanesulfonic acid sodium salt, sodium cholate hydrate, sodium deoxycholate, glycodeoxycholic acid sodium salt, benzalkonium chloride or benzethonium chloride, cetylpyridinium chloride monohydrate, hexadecyltrimethylammonium bromide, CHAPS, CHAPSO, SB3-10, SB3-12, digitonin, Triton X-100, Triton X-114, lauromacrogol 400, polyoxyl 40 stearate, polyoxyethylene hydrogenated castor oil 10, 40, 50 and 60, glycerol monostearate, polysorbate 20, 40, 60, 65 and 80, soy lecithin, DOPC, DMPG, DMPC, and DOPG; sucrose fatty acid ester, methyl cellulose and carboxymethyl cellulose.

Advantageously, the composition comprises at least 0.01 mg, preferably at least 0.1 mg, more preferably at least 1 mg, even more preferably at least 5 mg, especially at least 10 mg of the heme peroxidase produced according to the invention. It is further preferred if the composition contains the heme peroxidase in a concentration of at least 0.0001% (weight per weight, w/w), preferably at least 0.001% w/w, more preferably at least 0.01% w/w, even more preferably at least 0.1% w/w, yet even more preferably at least 1% w/w, especially at least 10% w/w.

Advantageously the composition is a solid composition (at 25° C. and at atmospheric pressure), preferably a lyophilized composition. In another preferred embodiment, the composition is a liquid composition (at 25° C. and at atmospheric pressure). Advantageously the composition contains the heme peroxidase produced according to the invention in a concentration of at least 0.001 mg/mL, preferably at least 0.01 mg/mL, more preferably at least 0.1 mg/mL, yet even more preferably at least 0.5 mg/mL, most preferably at least 2 mg/mL.

It is further preferred that the composition is substantially free of DNA, especially dsDNA. Preferably, the composition contains less than 1 µg/g, preferably less than 100 ng/g, more preferably less than 10 ng/g, most preferably less than 1 ng/g DNA. The DNA concentration can be determined by fluorometry using the dye SYBR Green I (N',N'-dimethyl-N-[4-[(E)-(3-methyl-1,3-benzothiazol-2-ylidene)methyl]-1-phenylquinolin-1-ium-2-yl]-N-propylpropane-1,3-diamine). The skilled person is familiar with the measurement of DNA concentrations using fluorometry. The measurement can be performed as described in Rengarajan, Kalpana, et al. ("Technical Brief Quantifying DNA concentrations using fluorometry: A comparison of fluorophores." Molecular Vision 8 (2002): 416-421).

The heme peroxidase product may find use in a variety of therapeutic applications, for instance in targeted cancer treatment. In a preferred embodiment, the heme peroxidase product is therefore a pharmaceutical composition, preferably comprising one or more excipients, which are pharmaceutically acceptable for administration to an individual, especially a mammal, in particular a human. Suitable excipients are known to the person skilled in the art, for example water (especially water for injection), saline, Ringer's solution, dextrose solution, buffers, Hank solution, vesicle forming compounds (e.g. lipids), fixed oils, ethyl oleate, 5% dextrose in saline, substances that enhance isotonicity and chemical stability, buffers and preservatives. Other suitable excipients include any compound that does not induce the production of antibodies when administered to a patient that are harmful for the patient. Examples are well tolerable proteins, polysaccharides, polylactic acids, polyglycolic acid, polymeric amino acids and amino acid copolymers. This pharmaceutical composition is preferably suitable for parenteral administration, in particular intravenous administration. The pharmaceutical composition may be provided in injectable dosage unit form, e.g. as a solution, suspension or emulsion, formulated in conjunction with the above-defined pharmaceutically acceptable excipients. All preferred embodiments listed above for the composition in general (in particular related to concentrations and amounts of the heme peroxidase), are also preferred when the heme peroxidase product is a pharmaceutical composition.

In the context of therapeutic applications, the heme peroxidase may be part of an enzyme-prodrug system. Enzyme-prodrug systems comprising heme peroxidases such as HRP are known in the art, in particular for the treatment of cancer (see e.g. Tupper et al. "In vivo characterization of horseradish peroxidase with indole-3-acetic acid and 5-bromoindole-3-acetic acid for gene therapy of cancer." Cancer Gene Therapy 17.6 (2010): 420-428). For instance, targeted cancer treatment may involve an enzyme-prodrug system that comprises HRP together with Indole acetic acid (IAA), wherein HRP oxidizes Indole acetic acid (IAA), which then decreases the viability of carcinoma cells. Neither the prodrug IAA nor HRP alone are cytotoxic, showing the necessity of combining these two substances in a pure and for the human being reconcilable and non-immunogenic form to obtain the desired cytotoxic effect. In another study it was shown that HRP can convert paracetamol into a powerful cytotoxin (Tupper et al. "Use of horseradish peroxidase for gene-directed enzyme prodrug therapy with paracetamol." British Journal of Cancer 90.9 (2004): 1858-1862). However, the authors found that the commercially available HRP preparation from plant was not very effective in that conversion reaction and thus did not pursue this study further.

The heme peroxidase product produced according to the invention may in particular find use in antibody directed enzyme prodrug therapy (ADEPT; see e.g. Bagshawe "Antibody-directed enzyme prodrug therapy (ADEPT) for cancer." Expert Review of Anticancer Therapy 6.10 (2006): 1421-1431). The principle of ADEPT is typically to use an antibody directed at a tumor-associated antigen to localize an enzyme (such as e.g. HRP) to tumor sites. A prodrug can be given to the patient which is then converted into its activated species location-specifically. The nucleic acid molecule encoding the heme peroxidase may also find use in therapy, in particular in gene therapy such as gene-directed enzyme prodrug therapy (GDEPT).

For many applications, in particular industrial applications such as waste-water treatment (e.g. removal of chlorophenols), it can be advantageous if the heme peroxidase is immobilized on a solid carrier. It is therefore preferred if the heme peroxidase product comprises a heme peroxidase immobilized on a solid carrier. Therefore, the inventive method preferably further comprises the step of immobilizing the heme peroxidase or heme peroxidase conjugate on a solid carrier.

Among other advantages, enzyme immobilization allows a particularly high storage stability, enhanced reusability, reduction of the operational process cost, etc. Heme peroxidases immobilized on solid carriers and their industrial applications are known in the art, see e.g. Tatsumi, et al. ("Removal of chlorophenols from wastewater by immobilized horseradish peroxidase." Biotechnology and Bioengineering 51.1 (1996): 126-130) and Sarno and Iuliano ("Immobilization of Horseradish Peroxidase on $Fe_3O_4$/Au_GO Nanoparticles to Remove 4-chlorophenols from Waste Water." Chemical Engineering Transactions 73 (2019): 217-222). The skilled person is familiar with methods for immobilizing enzymes on solid carriers, e.g. as described in Andreescu, et al. ("Chapter 7—Nanostructured materials for enzyme immobilization and biosensors." The New Frontiers of Organic and Composite Nanotechnology. Elsevier, 2008, 355-394).

Nanomaterials are particularly suitable as solid carriers because of their specific surface area and effective enzyme loading. In the context of this embodiment, it is therefore preferred if the solid carrier is a nanoparticle. A "nanoparticle" as used herein preferably is a particle of any shape with all three dimensions in the $1 \times 10^{-2}$ to $1 \times 10^{-6}$ m range, even more preferably in the $1 \times 10^{-9}$ to $1 \times 10^{-7}$ m range. The nanoparticle may e.g. be a magnetite ($Fe_3O_4$) nanoparticle or a gold nanoparticle. Especially preferred are magnetic nanoparticles, since they offer the additional advantage of easy separation by applying a magnetic field. Further preferred examples of solid carriers are nanofibers, carbon/polyvinyl materials, carbon nanotubes, nanowires, nanorods, nanocrystals, mesoporous silica and composite materials.

In a further preferred embodiment the solid carrier is a membrane, in particular a synthetic membrane such as polymeric membrane. Membranes comprising immobilized heme peroxidases, methods of producing such membranes as well as applications of such membranes (e.g. in waste water treatment) are known in the art, e.g. from Vasileva et al. ("Application of immobilized horseradish peroxidase onto modified acrylonitrile copolymer membrane in removing of phenol from water." International journal of biological macromolecules 44.2 (2009): 190-194).

In a further preferred embodiment, the heme peroxidase product is a kit. The inventive method therefore preferably further comprises the step of packaging the heme peroxidase or the heme peroxidase conjugate in a kit. It is preferred if further components selected from buffers, reagents, instructions manuals are added to the kit. The heme peroxidase or the heme peroxidase conjugate may be provided in the kit in lyophilized form. In an alternative preferred embodiment, the heme peroxidase or the heme peroxidase conjugate is provided in solution.

The heme peroxidase produced according to the inventive method may further find use as a reactant for coupled enzyme assays. In such assays, an enzyme of interest (e.g. glucose oxidase) produces $H_2O_2$ which then can be utilized by the heme peroxidase (see e.g. Aumiller et al. "Coupled enzyme reactions performed in heterogeneous reaction media: experiments and modeling for glucose oxidase and horseradish peroxidase in a PEG/citrate aqueous two-phase system." The Journal of Physical Chemistry B 118.9 (2014): 2506-2517). In a preferred embodiment, an enzyme that produces $H_2O_2$ is therefore added to the kit.

The heme peroxidase produced according to the invention may be further used as a reactant for polymer crosslinking. For instance, HRP has successfully been used in the art for the enzymatic crosslinking of dextran-tyramine conjugates for the preparation of hydrogels, e.g. as 3D scaffolds for cartilage tissue engineering applications (Jin et al. "Enzymatically crosslinked dextran-tyramine hydrogels as injectable scaffolds for cartilage tissue engineering." Tissue Engineering Part A 16.8 (2010): 2429-2440).

To facilitate the understanding of the invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

"Percent (%) amino acid sequence identity", "X % sequence identity" or "X % identical" (such as "70% sequence identity" or "70% identical") with respect to a reference polypeptide or protein sequence is defined as the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN, ALIGN-2, Megalign (DNASTAR) or the "needle" pairwise sequence alignment application of the EMBOSS software package. Those skilled in the art can determine appropriate parameters for aligning sequences, including any algorithms needed to achieve maximal alignment over the full length of the sequences being compared. For purposes herein, however, % amino acid sequence identity values are calculated using the sequence alignment of the computer programme "needle" of the EMBOSS software package (publicly available from European Molecular Biology Laboratory; Rice et al., EMBOSS: the European Molecular Biology Open Software Suite, Trends Genet. 2000 June; 16(6):276-7, PMID: 10827456).

The needle programme runs on many widely-used UNIX operating systems, such as Linux.

To align two protein sequences, the needle programme is preferably run with the following parameters: Command-line: needle -auto -stdout -asequence SEQUENCE_FILE_A -bsequence SEQUENCE_FILE_B -datafile EBLOSUM62 -gapopen 10.0 -gapextend 0.5 -endopen 10.0 -endextend 0.5 -aformat3 pair -sprotein1 -sprotein2 (Align_format: pair Report_file: stdout)

The % amino acid sequence identity of a given amino acid sequence A to, with, or against a given amino acid sequence B (which can alternatively be phrased as a given amino acid sequence A that has or comprises a certain % amino acid sequence identity to, with, or against a given amino acid sequence B) is calculated as follows:

$$100 \text{ times the fraction } X/Y,$$

where X is the number of amino acid residues scored as identical matches by the sequence alignment program needle in that program's alignment of A and B, and where Y is the total number of amino acid residues in B. It will be appreciated that where the length of amino acid sequence A is not equal to the length of amino acid sequence B, the % amino acid sequence identity of A to B will not equal the % amino acid sequence identity of B to A. In cases where "the sequence of A is more than N % identical to the entire sequence of B", Y is the entire sequence length of B (i.e. the entire number of amino acid residues in B). Unless specifically stated otherwise, all % amino acid sequence identity values used herein are obtained as described in the immediately preceding paragraph using the needle computer program.

Unless specified otherwise, all parameters as used herein correspond to parameters at IUPAC SATP-conditions ("Standard Ambient Temperature and Pressure"), in particular a temperature of 25° C. and a pressure of 101.300 Pa.

Percentages (%) as used herein correspond to weight per volume (w/v) unless specified as weight per weight (w/w) or otherwise.

The present invention relates to the following preferred embodiments:

Embodiment 1. Method for producing a heme peroxidase from inclusion bodies (IBs) comprising the steps of:
  providing the heme peroxidase in the form of IBs;
  solubilizing said IBs;
  transferring said solubilized IBs into a refolding buffer to obtain a refolding mix;
  adding a heme cofactor to said refolding mix,
wherein the addition of the heme cofactor to the refolding mix is distributed over a time period of at least 1 hour.

Embodiment 2. Method according to embodiment 1, wherein the addition of the heme cofactor to the refolding mix is distributed over a time period of at least 2 hours, preferably at least 3 hours, more preferably at least 6 hours, even more preferably at least 8 hours, especially at least 10 hours.

Embodiment 3. Method according to embodiment 1 or 2, wherein the heme cofactor is added to the refolding mix as a continuous feed.

Embodiment 4. Method according to any one of embodiments 1 to 3, wherein the heme cofactor is added to the refolding mix at a rate between 0.1 and 10 μmol/L per hour, preferably between 0.2 and 5 μmol/L per hour, even more preferably between 0.5 and 3 μmol/L per hour, yet even more preferably between 1 and 2.5 μmol/L per hour, especially between 1.4 and 1.8 μmol/L per hour.

Embodiment 5. Method according to any one of embodiments 1 to 4, wherein the refolding mix is incubated for at least 1 hour, preferably at least 2 hours, even more preferably at least 4 hours, especially at least 8 hours prior to the addition of the heme cofactor.

Embodiment 6. Method according to any one of embodiments 1 to 5, wherein at least 1 μmol/L, preferably at least 4 μmol/L, even more preferably at least 10 μmol/L, especially at least 20 μmol/L of the heme cofactor is added to the refolding mix.

Embodiment 7. Method according to any one of embodiments 1 to 6, wherein between 1 μmol/L and 200 μmol/L, preferably between 4 μmol/L and 100 μmol/L, even more preferably between 10 μmol/L and 50 μmol/L, especially between 15 μmol/L and 25 μmol/L of the heme cofactor is added to the refolding mix.

Embodiment 8. Method according to any one of embodiments 1 to 7, wherein at least 0.25, preferably at least 0.5, even more preferably at least 1, especially at least 2 molar equivalents of the heme cofactor with respect to the heme peroxidase are added to the refolding mix.

Embodiment 9. Method according to any one of embodiments 1 to 8, wherein between 0.25 and 10, preferably between 0.5 and 5, even more preferably between 1 and 4, especially between 1 and 2 molar equivalents of the heme cofactor with respect to the heme peroxidase are added to the refolding mix.

Embodiment 10. Method according to any one of embodiments 1 to 9, wherein the heme peroxidase is a Class II or a Class III heme peroxidase, preferably a Class III heme peroxidase.

Embodiment 11. Method according to any one of embodiments 1 to 10, wherein the heme peroxidase is horseradish peroxidase (HRP).

Embodiment 12. Method according to any one of embodiments 1 to 11, wherein the heme peroxidase does not comprise a purification tag, especially a polyhistidine-tag.

Embodiment 13. Method according to any one of embodiments 1 to 12, wherein the heme peroxidase comprises an amino acid sequence having at least 70%, preferably at least 80%, more preferably at least 85%, even more preferably at least 90%, even more preferably at least 95%, yet even more preferably at least 98%, especially at least 99% sequence identity to SEQ ID NO: 3.

Embodiment 14. Method according to any one of embodiments 1 to 13, wherein the heme peroxidase comprises the amino acid sequence as set forth in SEQ ID NO: 3.

Embodiment 15. Method according to any one of embodiments 1 to 14, wherein the heme peroxidase consists of the amino acid sequence as set forth in SEQ ID NO: 4.

Embodiment 16. Method according to any one of embodiments 1 to 15, wherein the heme cofactor is hemin.

Embodiment 17. Method according to any one of embodiments 1 to 16, wherein the heme peroxidase in the form of IBs is provided by the steps of:
  culturing host cells expressing a gene encoding the heme peroxidase; and
  obtaining IBs from said host cells.

Embodiment 18. Method according to embodiment 17, wherein the host cells are prokaryotic cells, preferably *Escherichia coli* cells.

Embodiment 19. Method according to embodiment 17 or 18, wherein the host cells are cultured in a volume of at least 2 L, preferably at least 5 L, more preferably at least 20 L, even 50 L, especially at least 100 L.

Embodiment 20. Method according to any one of embodiments 1 to 19, wherein said solubilizing comprises incubating the IBs in a solubilization buffer.

Embodiment 21. Method according to embodiment 20, wherein the solubilization buffer has a pH of at least 8, preferably at least 8.5, more preferably at least 9.0, even more preferably at least 9.5.

Embodiment 22. Method according to embodiment 20 or 21, wherein the solubilization buffer has a pH between 8 and 12.5, preferably between 8.5 and 11.5, more preferably between 9 and 11, even more preferably between 9.5 and 10.5.

Embodiment 23. Method according to any one of embodiments 20 to 22, wherein the solubilization buffer contains a reducing agent.

Embodiment 24. Method according to any one of embodiments 20 to 23, wherein the solubilization buffer has redox conditions corresponding to a dithiothreitol (DTT) concentration between 1 and 50 mmol/L, preferably between 2 and 25 mmol/L, more preferably between 4 and 15 mmol/L, especially between 6 and 8 mmol/L.

Embodiment 25. Method according to any one of embodiments 20 to 24, wherein the solubilization buffer contains urea, preferably in a concentration of at least 4 mol/L, more preferably at least 5 mol/L, even more preferably at least 6 mol/L.

Embodiment 26. Method according to any one of embodiments 20 to 25, wherein the solubilization buffer contains between 4 mol/L and 8 mol/L urea, preferably between 5 mol/L and 7 mol/L, especially between 5.5 and 6.5 mol/L.

Embodiment 27. Method according to any one of embodiments 20 to 26, wherein the IBs are incubated in said solubilization buffer for at least 5 minutes, preferably at least 10 minutes, more preferably at least 15 minutes, especially at least 30 minutes.

Embodiment 28. Method according to any one of embodiments 20 to 27, wherein the IBs are incubated in said solubilization buffer at a temperature between 4° C. and 40° C., preferably between 10° C. and 35° C., even more preferably between 20° C. and 25° C.

Embodiment 29. Method according to any one of embodiments 1 to 28, wherein the solubilized IBs are mixed with the refolding buffer in a ratio between 1:5 v/v and 1:250 (solubilized IBs: refolding buffer), preferably between 1:10 and 1:100, even more preferably between 1:20 and 1:80, especially between 1:25 and 1:60, most preferably between 1:30 and 1:50.

Embodiment 30. Method according to any one of embodiments 1 to 29, wherein the refolding is carried out in a volume of at least 5 L, preferably at least 10 L, more preferably at least 25 L, even more preferably at least 100 L.

Embodiment 31. Method according to any one of embodiments 1 to 30, wherein the refolding buffer has a pH of at least 8, preferably at least 8.5, more preferably at least 9, even more preferably at least 9.5.

Embodiment 32. Method according to any one of embodiments 1 to 31, wherein the refolding buffer has a pH between 8 and 12.5, preferably between 8.5 and 11.5, more preferably between 9 and 11, even more preferably between 9.5 and 10.5.

Embodiment 33. Method according to any one of embodiments 1 to 32, wherein the difference in the pH between the solubilization buffer and the refolding buffer is less than 2 pH increments, preferably less than 1 pH increment, more preferably less than 0.5 pH increments, even more preferably less than 0.2 pH increments, especially less than 0.1 pH increments.

Embodiment 34. Method according to any one of embodiments 1 to 33, wherein the refolding buffer contains an oxidizing agent.

Embodiment 35. Method according to any one of embodiments 1 to 34, wherein the refolding buffer has redox conditions corresponding to a glutathione disulfide (GSSG) concentration between 0.2 and 6 mM GSSG, preferably between 0.4 and 4 mM GSSG, more preferably between 0.8 and 2.5 mM GSSG, especially between 1.1 and 1.6 mM GSSG.

Embodiment 36. Method according to any one of embodiments 1 to 35, wherein the refolding buffer contains between 0.5 and 3 mol/L urea, preferably between 1 mol/L and 2.7 mol/L, even more preferably between 1.5 mol/L and 2.4 mol/L, especially between 1.8 and 2.2 mol/L.

Embodiment 37. Method according to any one of embodiments 1 to 36, wherein the molar ratio between DTT and GSSG in the refolding mix is between 1:2 (DTT:GSSG) and 1:30, preferably between 1:3 and 1:20, even more preferably between 1:4 and 1:15, especially between 1:6 and 1:8.

Embodiment 38. Method according to any one of embodiments 1 to 37, wherein the refolding mix has a reduction potential between −105 mV and 135 mV, preferably between −90 mV and 105 mV, even more preferably between −80 mV and 80 mV, yet even more preferably between −70 mV and 60 mV, most preferably between −60 mV and 50 mV.

Embodiment 39. Method according to any one of embodiments 1 to 38, further comprising the step of adding salt to the refolding mix.

Embodiment 40. Method according to embodiment 39, wherein salt is added to the refolding mix to an ionic strength between 0.5 and 6 mol/L, preferably between 1.5 and 5 mol/L, even more preferably between 2.5 and 4.5 mol/L, especially between 3.5 and 4.5 mol/L.

Embodiment 41. Method according to embodiment 39 or 40, wherein the salt is sodium chloride, preferably in a concentration between 0.5 and 6 mol/L, more preferably between 1.5 and 5.5 mol/L, even more preferably between 2.5 and 5 mol/L, especially between 3.5 and 4.5 mol/L.

Embodiment 42. Method according to any one of embodiments 39 to 41, wherein the salt is ammonium sulfate, preferably in a concentration between 0.25 and 1.5 mol/L, preferably between 0.5 and 1.4 mol/L, even more preferably between 0.8 and 1.2 mol/L.

Embodiment 43. Method according to any one of embodiments 39 to 42, wherein the salt has a salting-out strength between ammonium sulfate and sodium chloride as determined by its position in the Hofmeister series, preferably wherein the concentration of the salt is between 1.25 and 6 mol/L, more preferably between 0.5 and 5 mol/L, even more preferably between 1.0 and 4.5 mol/L, most preferably between 1.5 and 4 mol/L.

Embodiment 44. Method according to any one of embodiments 39 to 43, wherein the salt has a weaker salting-out strength than sodium chloride as determined by its position in the Hofmeister series, preferably wherein the concentration of the salt is at least 2 mol/L, preferably at least 4 mol/L, more preferably at least 4.5 mol/L.

Embodiment 45. Method according to embodiment 44, wherein the concentration of the salt is between 2 mol/L and 12 mol/L, preferably between 4 mol/L and 10 mol/L, even more preferably between 4.5 mol/L and 8 mol/L.

Embodiment 46. Method according to any one of embodiments 1 to 45, further comprising a centrifugation step for removing impurities from the refolded heme peroxidase.

Embodiment 47. Method according to any one of embodiments 1 to 46, further comprising a filtration step for removing impurities from the refolded heme peroxidase.

Embodiment 48. Method according to any one of embodiments 1 to 47, further comprising the step of purifying the refolded heme peroxidase.

Embodiment 49. Method according to embodiment 48, wherein the heme peroxidase is purified after the heme cofactor has been added to the refolding mix.

Embodiment 50. Method according to embodiment 48 or 49, wherein the heme peroxidase is purified by chromatography.

Embodiment 51. Method according to any one of embodiments 48 to 50, wherein the heme peroxidase is purified by hydrophobic interaction chromatography (HIC).

Embodiment 52. Method according to embodiment 51, wherein the stationary phase is a butyl sepharose resin.

Embodiment 53. Method for producing a heme peroxidase product comprising producing a heme peroxidase according to the method of any one of embodiments 1-52.

Embodiment 54. Method according to embodiment 53, further comprising the step of activating the heme peroxidase for a conjugation reaction.

Embodiment 55. Method according to embodiment 53 or 54, further comprising a conjugation reaction to obtain a heme peroxidase conjugate.

Embodiment 56. Method according to embodiment 55, wherein the heme peroxidase is conjugated to a binding agent, preferably an antibody.

Embodiment 57. Method according to embodiment 55, wherein the heme peroxidase is conjugated to an antibody fragment, preferably a single-chain variable fragment (scFv) or an antigen-binding fragment (Fab).

Embodiment 58. Method according to embodiment 55, wherein the heme peroxidase is conjugated to an antibody mimetic, preferably selected from the group consisting of adnectins, affibodies, anticalins, DARPins, engineered Kunitz-type inhibitors, and monobodies.

Embodiment 59. Method according to embodiment 55, wherein the heme peroxidase is conjugated to an antibody binding protein, preferably protein A, protein G, or protein L.

Embodiment 60. Method according to embodiment 55, wherein the heme peroxidase is conjugated to a further protein, preferably streptavidin.

Embodiment 61. Method according to any one of embodiments 53 to 60, further comprising the step of purifying the heme peroxidase or the heme peroxidase conjugate.

Embodiment 62. Method according to any one of embodiments 53 to 61, further comprising the step of freezing the heme peroxidase or the heme peroxidase conjugate.

Embodiment 63. Method according to any one of embodiments 53 to 62, further comprising the step of lyophilizing the heme peroxidase or the heme peroxidase conjugate.

Embodiment 64. Method according to any one of embodiments 53 to 63, further comprising the step of immobilizing the heme peroxidase or heme peroxidase conjugate on a solid carrier.

Embodiment 65. Method according to embodiment 64, wherein the solid carrier is a nanoparticle, preferably a magnetic nanoparticle or a nanofiber.

Embodiment 66. Method according to embodiment 64, wherein the solid carrier is a carbon/polyvinyl material.

Embodiment 67. Method according to embodiment 64, wherein the solid carrier is a membrane.

Embodiment 68. Method according to any one of embodiments 53 to 67, further comprising the step of packaging the heme peroxidase or the heme peroxidase conjugate in a kit.

Embodiment 69. Method according to embodiment 68, wherein further components selected from buffers, reagents, instructions manuals are added to the kit.

Embodiment 70. Method according to embodiment 69, wherein an enzyme that produces $H_2O_2$ is added to the kit.

The present invention is further illustrated by the following figures and examples, without being limited thereto.

Figure 1B:
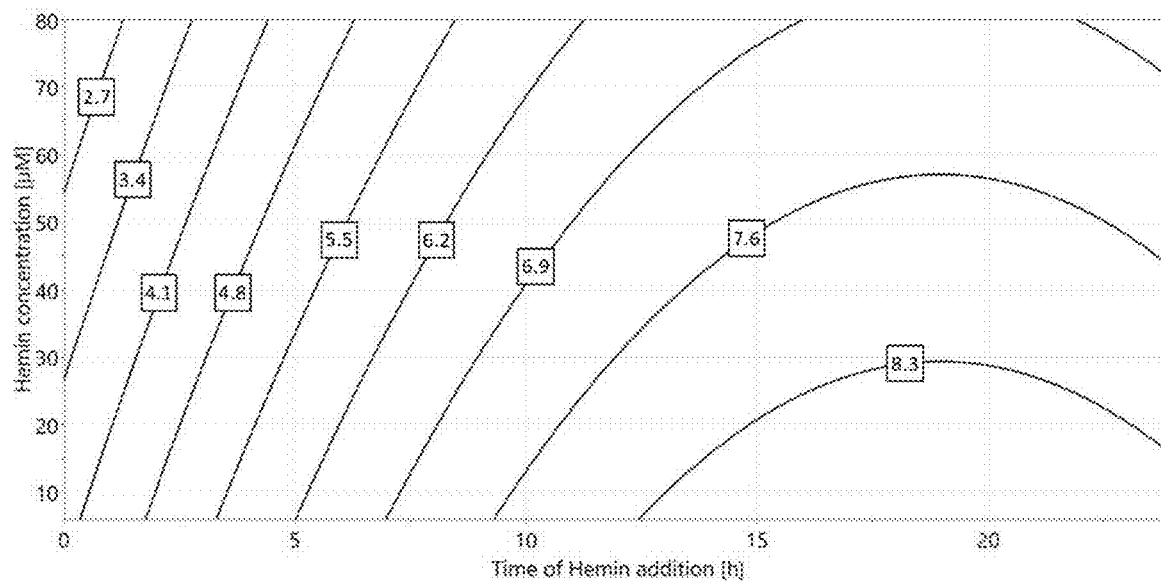

FIG. 1. (A) Influence of different heme cofactor concentrations and times of addition to the refolding mix on the volumetric activity, respectively the refolding yield. (B) Response contour plot for different times of heme cofactor addition and heme cofactor concentration as factors and volumetric activity [U/mL] as response (DoE 4).

FIG. 2. Response contour plot for the volumetric activity [U/mL] dependent on the DTT concentration in the solubilization mix and the GSSG concentration in the refolding buffer (DoE 1).

FIG. 3. Response contour plot for pH 8.5, pH 9.25 and pH 10 for different DTT and GSSG concentrations (both in mM) for DoE 3.

Figure 4:
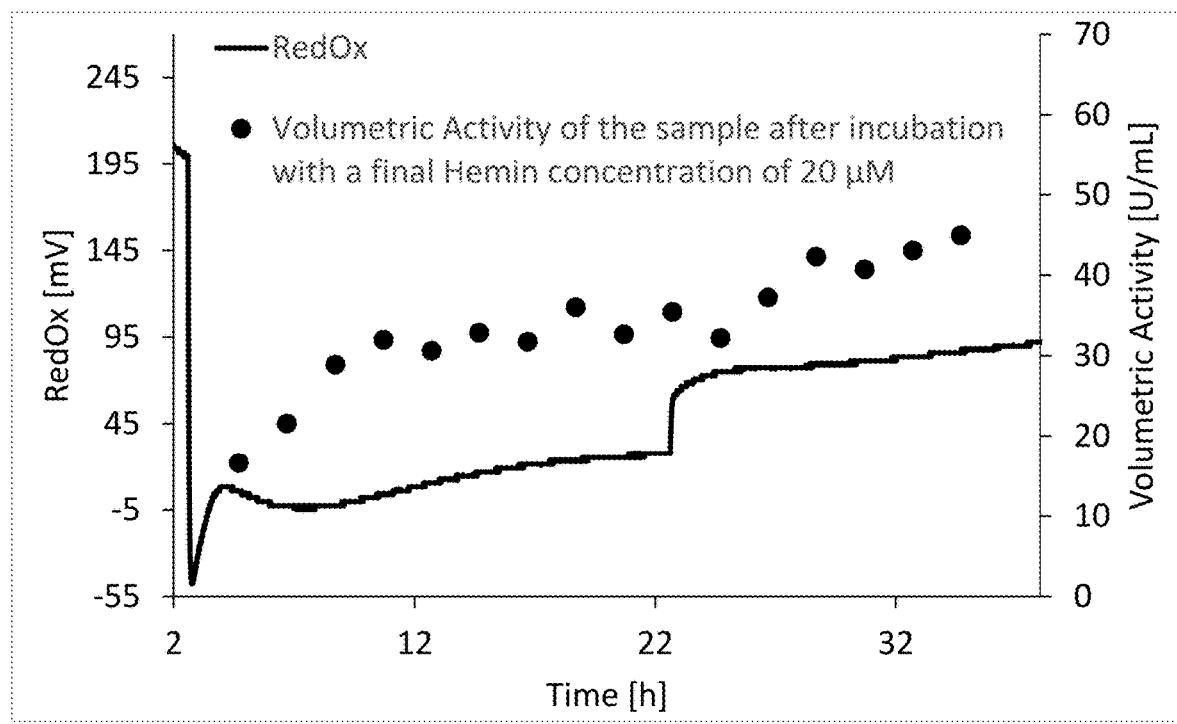

FIG. 4. Redox potential and volumetric activity (at-line sampling) for reactor experiment 2. 20 µM hemin was added 20 h after refolding start, at which point the redox signal shows a sharp rise.

Figure 5:
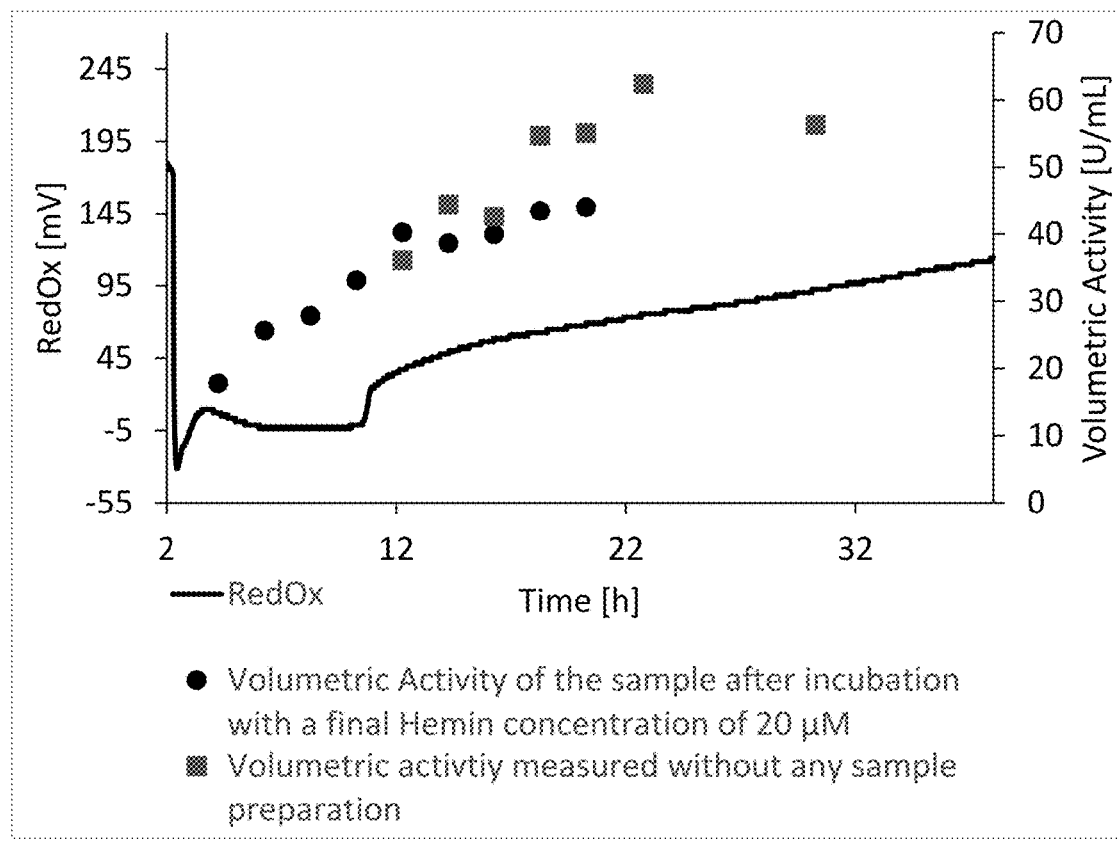

FIG. 5. Redox potential and volumetric activity for reactor experiment 5. Before the end of the hemin feed, samples were drawn every 2 h and incubated with a final hemin concentration of 20 PM before measurement (full circles). After the start of the hemin feed, samples were drawn every 2 h and volumetric activity was measured immediately (full squares).

Figure 6:
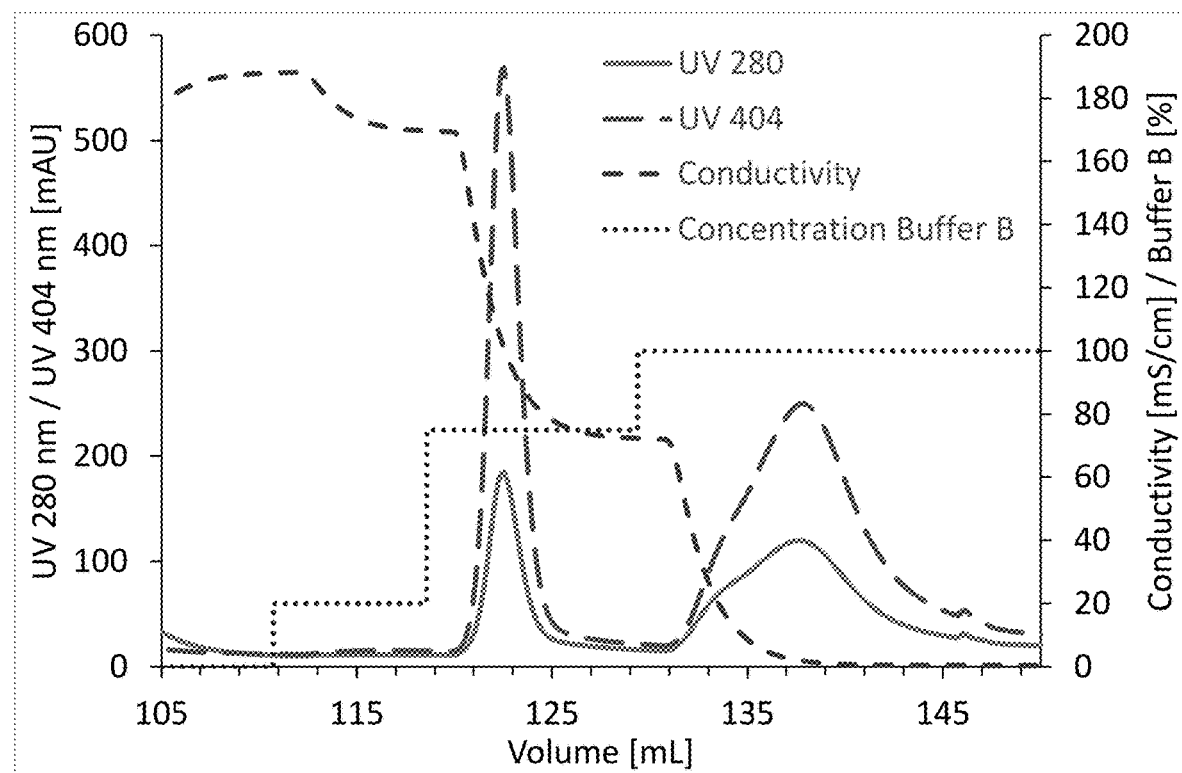

FIG. 6. Elution of active HRP and impurities for HIC 1 using a step gradient. Active HRP elutes between 120 and 125 mL (75% buffer B), while hydrophobic impurities elute starting from 131 mL (100% buffer B).

Figure 7:
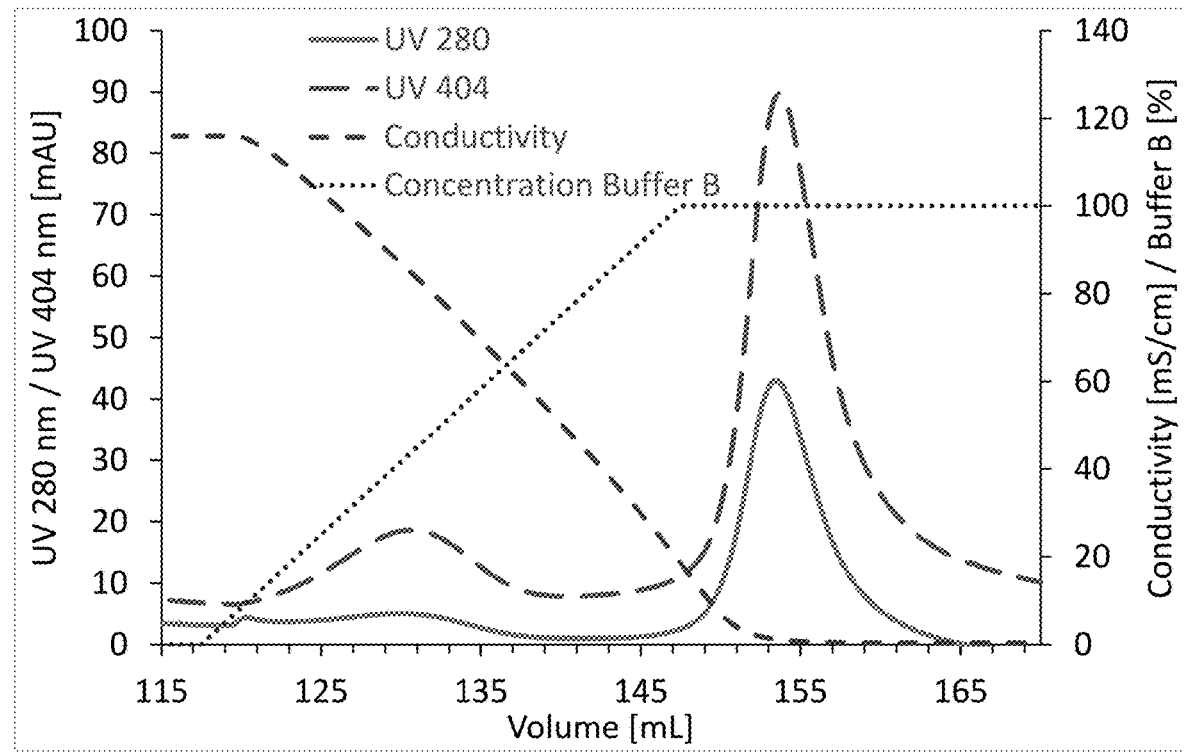

FIG. 7. Elution of active HRP and impurities for HIC 2 using a linear gradient. Active HRP elutes from 125 mL to 135 mL while hydrophobic impurities elute starting from 145 mL.

Figure 8:
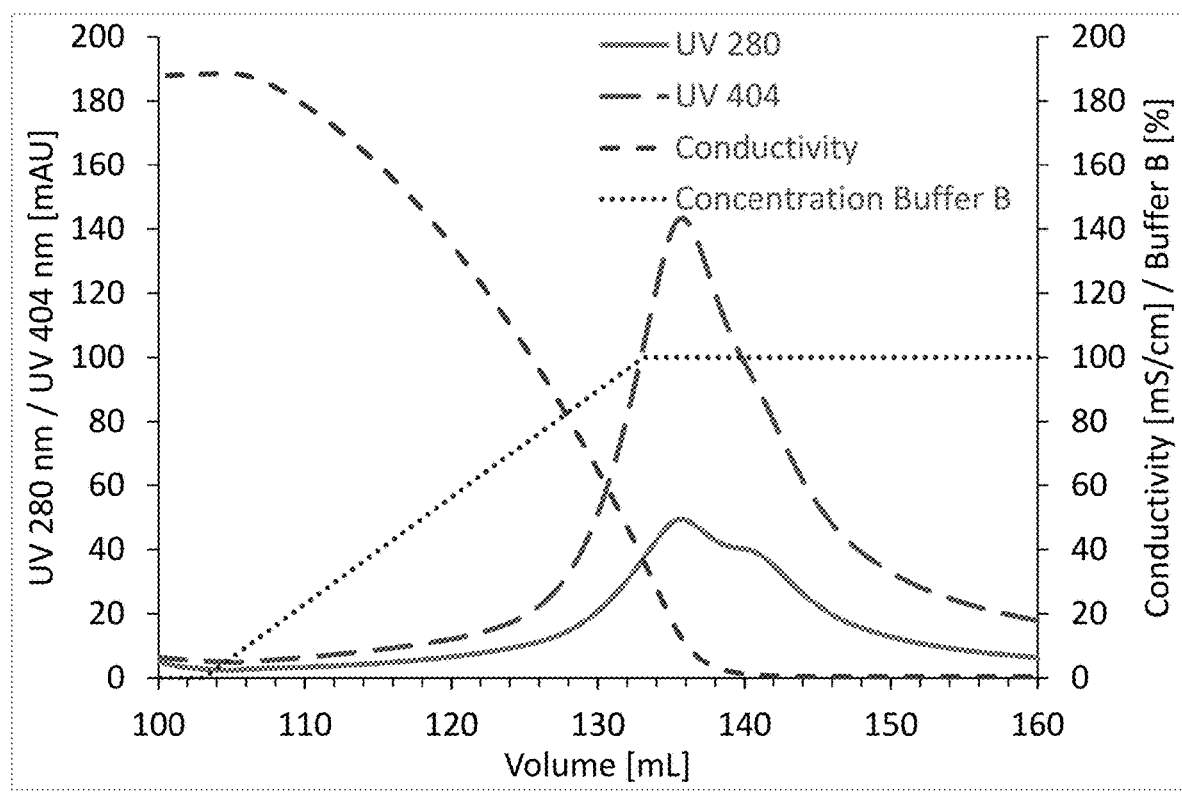

FIG. 8. Elution of active HRP and impurities for HIC 3 using a linear gradient. Active HRP elutes late in the gradient (around 90% buffer B), leading to an overlap with the elution of hydrophobic impurities, which elute at 100% buffer B.

Figure 9:
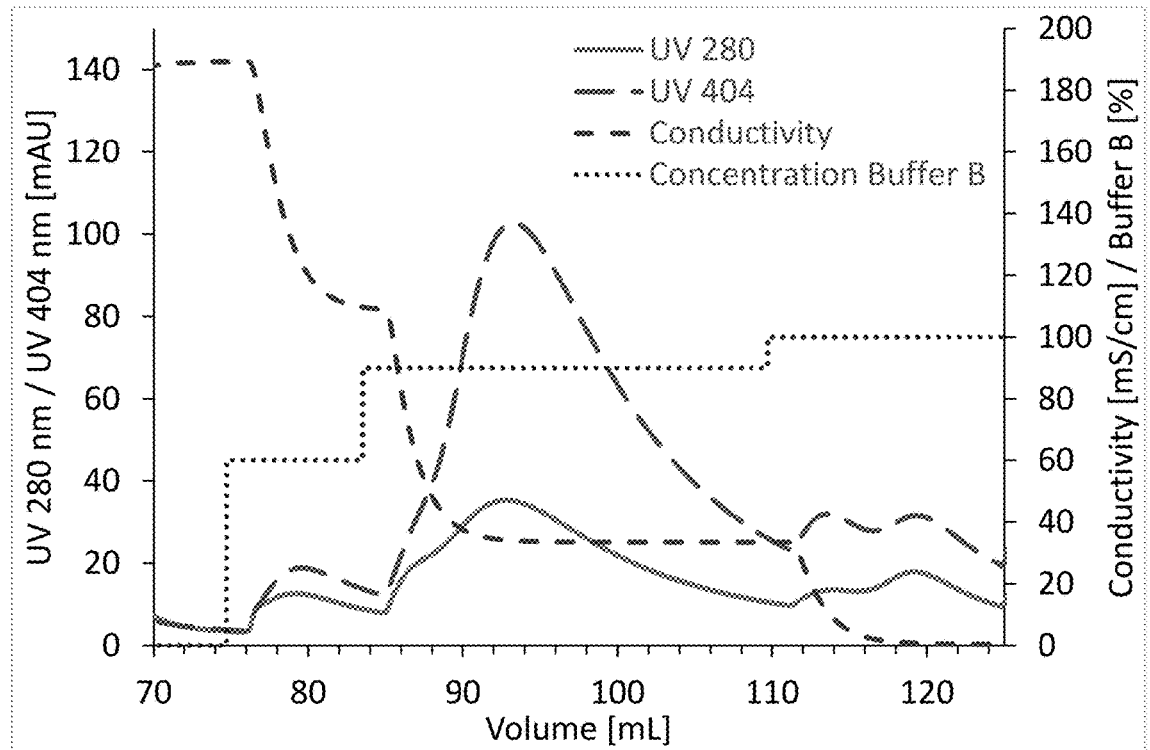

FIG. 9. Elution of active HRP and impurities for HIC 4 using a step gradient. While separation of active HRP from hydrophobic impurities is possible using 90% buffer B, this leads to a strong tailing of the active HRP peak, resulting in a decision between lower concentration and poorer recovery of active HRP.

Figure 10:
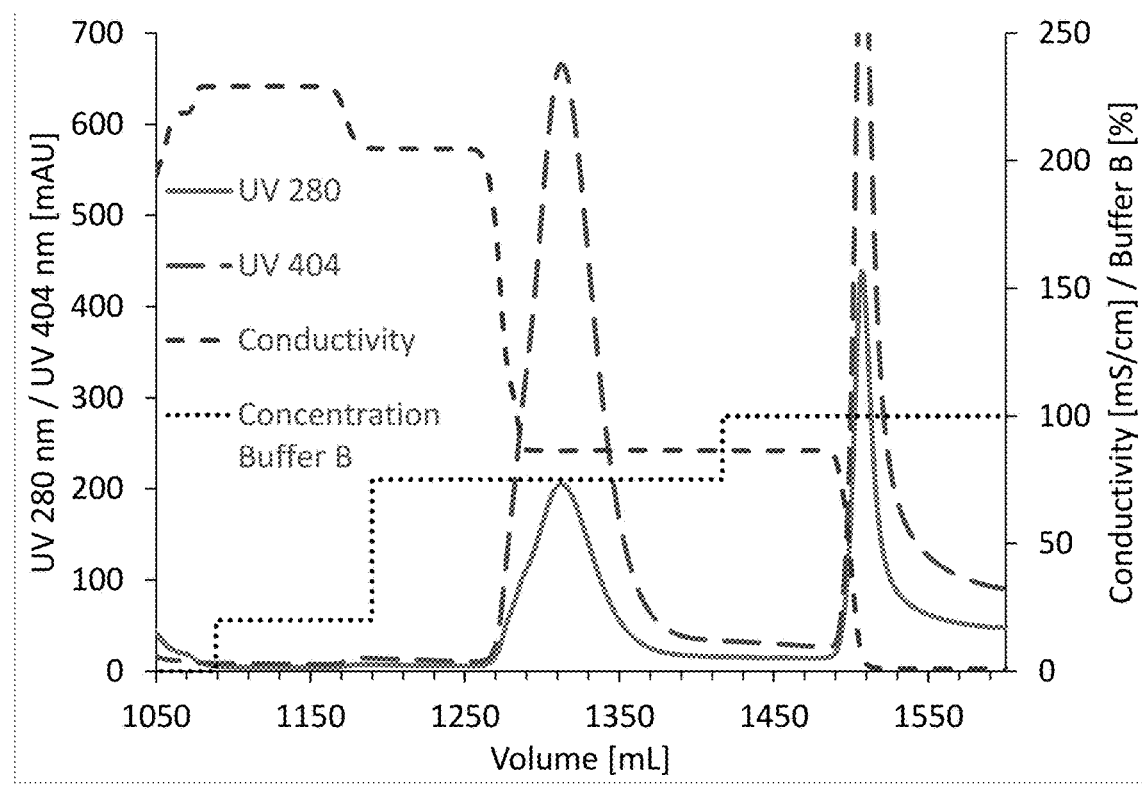

FIG. 10. Elution of active HRP and impurities for HIC 5 using a step gradient. Active HRP elutes between 1250 and 1400 mL (75% buffer B), while hydrophobic impurities elute starting from 1400 mL (100% buffer B).

Figure 11:
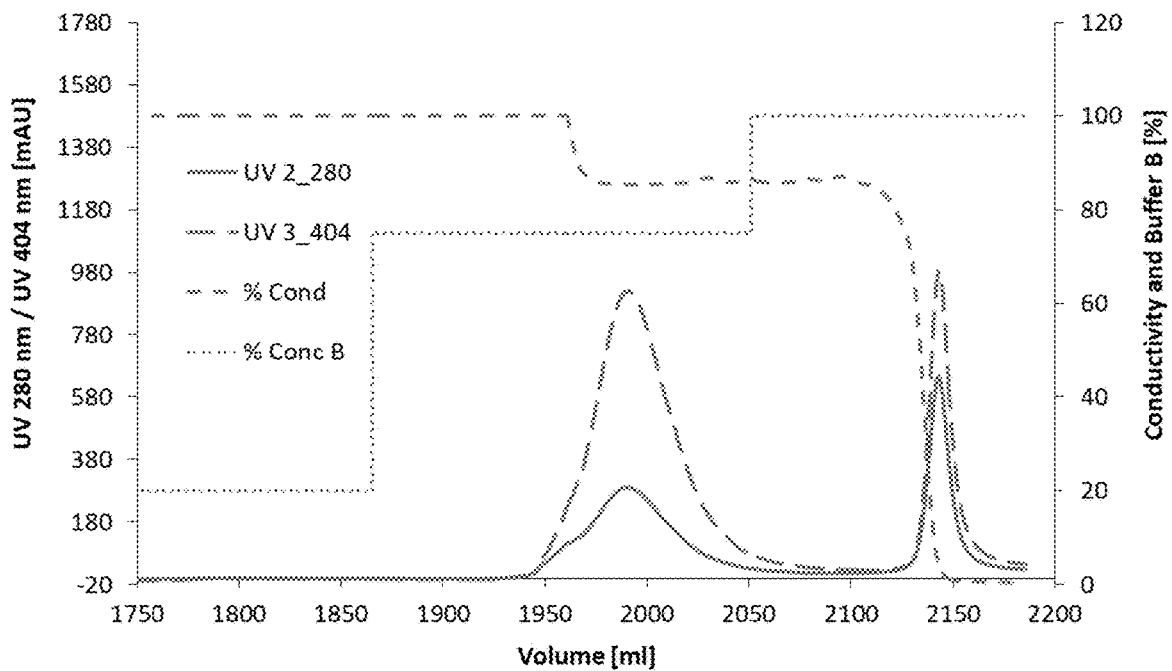

FIG. 11. Chromatogram of the HIC run with refolding at pH 8.5. Pure HRP elutes at 75% buffer B, whereas hydrophobic impurities elute at 100% buffer B.

Figure 12:
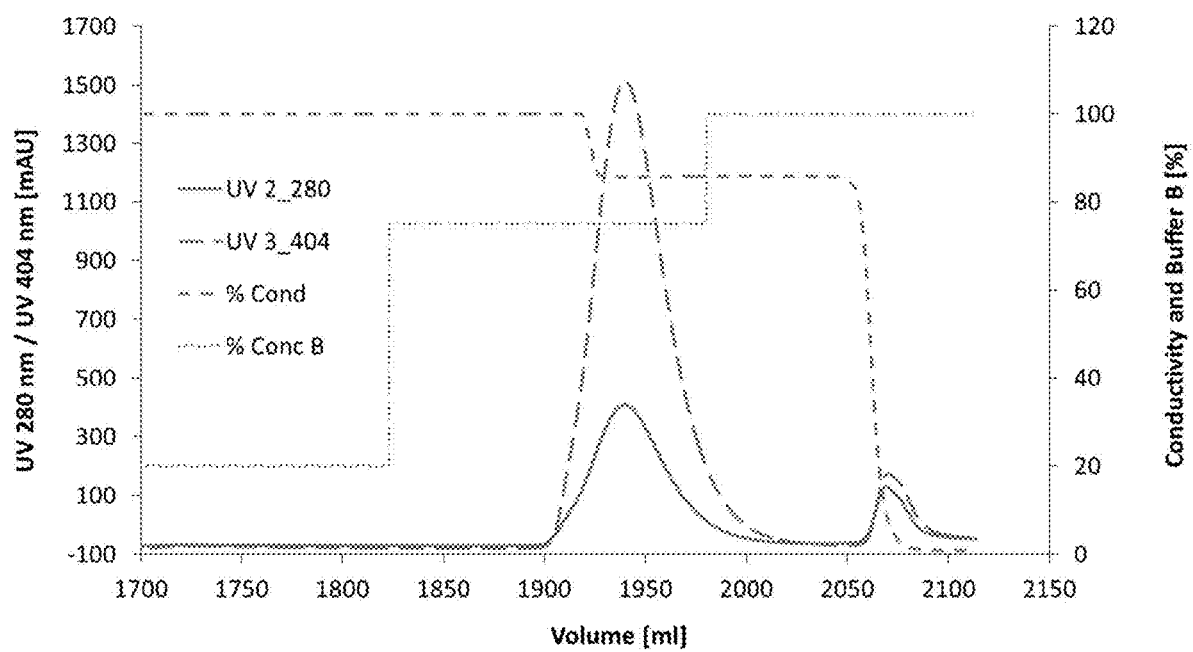

FIG. 12. Chromatogram of the HIC run with refolding at pH 10. Pure HRP elutes at 75% buffer B, whereas hydrophobic impurities elute at 100% buffer B.

Figure 13:
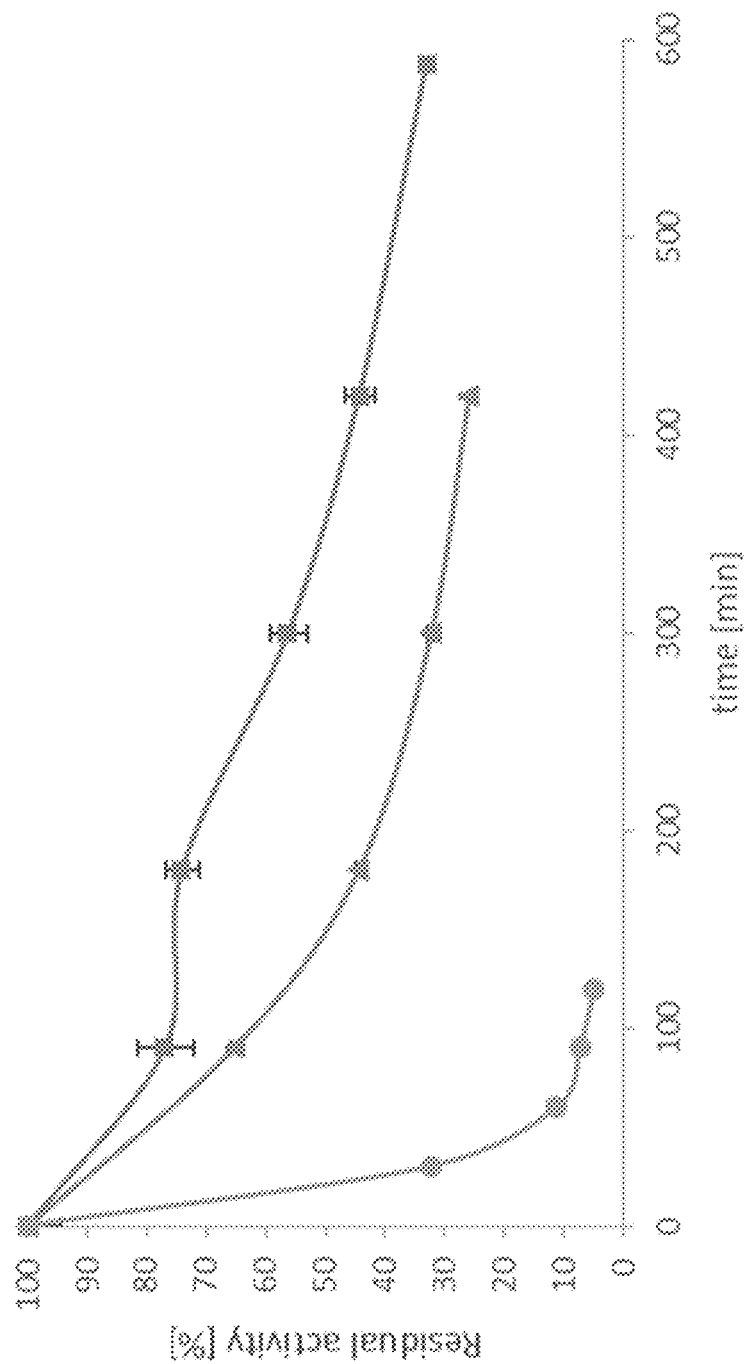

FIG. 13. Residual activities of HRP N13D/N57S/P146Q/N175S/N255D/N268D/N275K (mHRP, SEQ ID NO: 4) compared to recombinant wild-type HRP (rHRP, SEQ ID NO: 2) and plant-derived HRP (pHRP). 150 µl of pHRP (triangles), mHRP (squares) and rHRP (circles) with a concentration of 2.9 µM were incubated in 50 mM BisTris/HCl pH 7, 0.5 M NaCl, 7% glycerol for up to 10 h at 60° C. Initial and residual enzyme activities were measured with ABTS as described in Example 1 and are plotted in % against the incubation time. mHRP displayed a more than 13-fold enhanced thermostability over rHRP and a 1.7-fold enhanced thermostability even over the plant-derived (i.e. glycosylated) pHRP.

Figure 14:
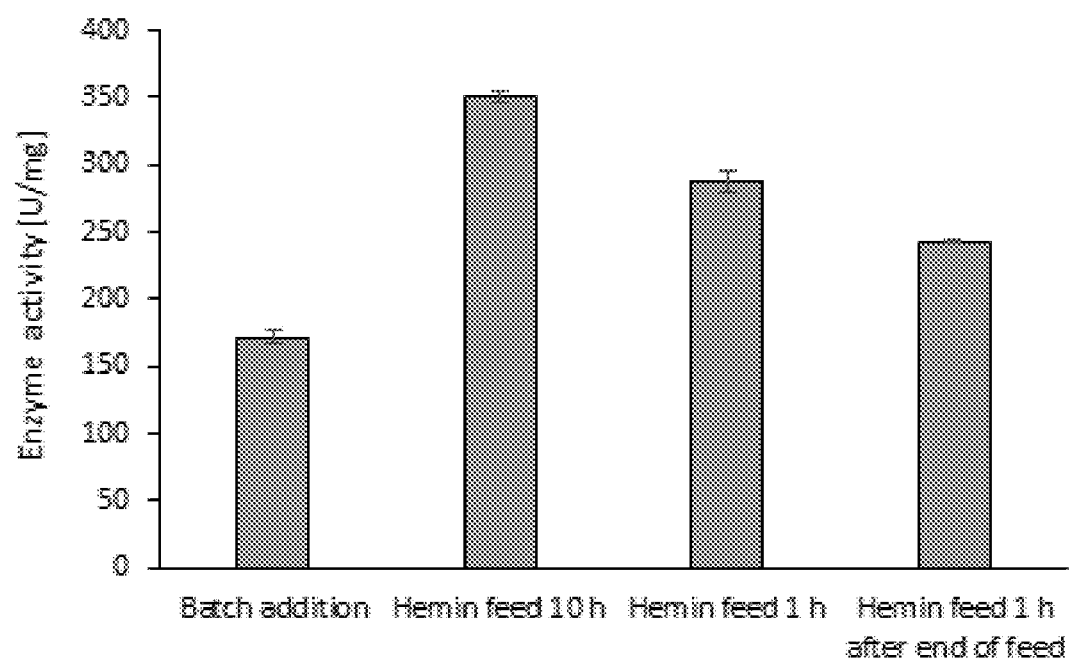

FIG. 14. Enzyme activities obtained from three different refolding experiments. "Batch addition": heme cofactor was added in batch after 20 h refolding time (first column). "Hemin feed 10 h": heme cofactor was added 8 h after refolding start as a 10-hour feed (second column). "Hemin feed 1 h": heme cofactor was added 8 h after refolding start as a 1-hour feed; measurements were taken directly after the end of the feed (last column) as well as after further incubation for 10 h (third column).

EXAMPLE 1. MATERIALS AND METHODS

Chemicals

L-Gluthathione oxidized (GSSG) and 2,2'-azino-bis(3-ethylbenzothiazoline-6-sulfonic acid) (ABTS) were from AppliChem. Hemin was purchased from Sigma (Hemin from bovine, ≥90%). Dithiothreitol (DTT) and all other chemicals were purchased from Roth.

Strain and Growth Conditions

The hrp gene coding for HRP variant C1A was codon-optimized for *E. coli* and obtained from GenScript USA Inc. (Piscataway, NJ, USA). The plasmid pET21d+ was used for HRP inclusion body production in the cytoplasm. A stop codon was introduced so that the protein is produced without any tags. HRP was produced in *E. coli* BL21(DE3) in a 10 L Biostat Cplus stainless steel bioreactor (Satorius, Germany). HRP production was induced with 0.5 mM isopropyl-β-D-thiogalactopyranoside (IPTG) in a fed-batch cultivation for 12 h using DeLisa medium. Biomass was harvested by centrifugation and the wet biomass was stored at −20° C. until further processing.

Homogenization and Wash

Biomass was resuspended using an IKA T10 basic ULTRA-TURRAX in 3-5 mL buffer A/g wet biomass (Buffer A: 50 mM TRIS/HCl; pH 8; 500 mM NaCl; 1.5 mM EDTA) and homogenized (using a GEA Niro Soavi Panda PLUS) (>1300 bar, 3 passages, cooled). The homogenized suspension was centrifuged (15650 g; 20 min, 4° C.), the supernatant discarded and the cell debris resuspended in 10 mL buffer B/g wet cell debris (Buffer B: 50 mM TRIS/HCl; pH 8; 500 mM NaCl; 2 M Urea) and centrifuged again (15650 g; 20 min, 4° C.). The washing step using buffer B was repeated once. Afterwards, IBs/cell debris were resuspended in water (5 mL water/g wet cell debris), the suspension aliquoted into pre-weighed 50 mL reaction tubes, centrifuged (15650 g; 20 min, 4° C.) and the pellets stored at −20° C. until further use.

Solubilization

For solubilization, an aliquot of the frozen IBs was thawed, weighed in order to calculate the wet Inclusion Body (wIB) weight and resuspended in the appropriate solubilization buffer (Solubilization buffer 1: 50 mM TRIS/HCl; pH 8; 6 M Urea/Solubilization buffer 2: 50 mM Glycine; pH 10; 6 M Urea) to reach a wIB concentration of 100 g/L. After resuspension, DTT was added (using a 1 M DTT stock) to reach a final concentration in the solubilization mix varying from 1 mM-28.44 mM DTT and the solubilization mix was incubated (RT; 0.5 h; slight agitation), followed by centrifugation (20379 g; 20 min; 4° C.). The supernatant was immediately used for refolding, the pellet discarded.

EXAMPLE 2. SMALL-SCALE REFOLDING EXPERIMENTS

Analytical Methods

Bradford: Protein concentrations were determined using the Bradford assay, measuring the absorption after 10 min of incubation at room temperature at 595 nm with a Genesys 20 Photometer (Thermo Scientific). Bovine serum albumin was used as a standard.

Enzyme activity measurement: HRP enzyme activity was measured with a Tecan Infinite M200 PRO using flat-bottom polystyrene 96 well plates. Depending on concentration of correctly folded HRP, samples were diluted 1:50-1:200 in dilution buffer (Dilution buffer: 20 mM Bis-Tris pH 7; 7% v/v Glycerol). 170 µL of ABTS solution (5 mM ABTS in 50 mM $KH_2PO_4$ pH 5) were mixed with 10 µL of diluted sample in the well, after which 20 µL of $H_2O_2$ (10 mM $H_2O_2$) were added to start the reaction. Immediately afterwards, the change of absorption at 420 nm over 2 minutes was recorded (at 30° C.). The volumetric enzyme activity was calculated using the following formula:

$$A[U/mL] = \frac{V_{total} * \Delta A/\min * \text{dilution}}{V_{sample} * d * \varepsilon},$$

$V_{total}$ . . . total volume in cuvette in [µl]
$\Delta A/\min$ . . . change in absorption [$\Delta$Abs 420 nm/min]
dilution . . . dilution of the sample
$V_{sample}$ . . . volume of sample [µl]
d . . . length of the beam path through the reaction (d=0.58 cm)
$\varepsilon$ . . . extinction coefficient ($\varepsilon_{420}$=36 $mM^{-1}cm^{-1}$).

SEC-HPLC: Purity of the active HRP fraction after the capture step with HIC was measured using a SEC-HPLC. For this, an XBridge Protein BEH SEC Column, 200Å, 3.5 µm, 7.8 mm×150 mm (Waters) was used. The method was run at 0.5 mL/min with 100% Buffer A (Buffer A: 80 mM Phosphate pH 6.8; 250 mM KCl) for 18 minutes. The column was kept at a constant temperature of 25° C. and 214 nm, 280 nm and 404 nm were measured.

Reinheitszahl (RZ): Reinheitszahl was measured as the ratio of absorbance at 404 nm to 280 nm. Absorbance measurement was done using a Hitachi Double Beam Spectrophotometer U-2900.

MODDE 10: Planning and analysis of Design of Experiments (DoE) were done using Umetrics MODDE 10.

Experimental Set-Up

General materials and methods were as described in Example 1. All small scale refolding experiments were done using 2 mL reaction tubes. The solubilizate was diluted 1:40 in the appropriate refolding buffer (Refolding buffer 1: 20 mM TRIS/HCl; pH 8.5; 2 M Urea; 2 mM $CaCl_2$; 7% v/v glycerol; varying GSSG concentrations/Refolding buffer 2: 20 mM glycine; pH 10; 2 M urea; 2 mM $CaCl_2$; 7% v/v glycerol; varying GSSG concentrations), followed by incubation at 4° C.; 48 h; with slight agitation. A 1 mM hemin stock solution, which was used for all experiments, was prepared in 100 mM KOH.

DoE1: For the first DoE (Design of experiments), the DTT concentration for solubilization (solubilization buffer 1; pH 8) and the GSSG concentration in the refolding buffer (refolding buffer 1; pH 8.5) were varied (see Table 1), while the hemin addition was kept constant at 20 µM after 20 h. A CCF (central composite face-centered design) with the volumetric activity after refolding as a response was used.

TABLE 1

DTT and GSSG concentrations used to optimize the redox conditions using a DoE CCF approach with the volumetric Activity as a response

| DTT conc. [mM in Solubilizate] | GSSG [mM in Refolding buffer] |
|---|---|
| 2.5 | 0.5 |
| 8.75 | 2 |
| 15 | 3.5 |

DoE2: For the second DoE, the DTT concentration for solubilization (solubilization buffer 1; pH 8), the GSSG concentration in the refolding buffer (refolding buffer 1; pH 8.5) and the protein concentration in the refolding mix were varied (see Table 2), while the hemin addition was kept constant at 20 µM after 20 h. A CCF (central composite face-centered design) with the volumetric and specific activity after refolding as a response was used.

TABLE 2

DTT and GSSG concentrations as well as the total protein concentrations used to investigate interactions between the redox system and the protein concentration in the refolding mix using a DoE CCF approach

| DTT conc. [mM in Solubilizate] | GSSG [mM in Refolding buffer] | Protein conc. in the refolding mix [g/L] |
|---|---|---|
| 7.11 | 1.27 | 0.5 |
| 14.22 | 2.54 | 1 |
| 28.44 | 5.08 | 2 |

DoE3: For the third DoE, the DTT concentration for solubilization, the GSSG concentration in the refolding buffer and the pH of the solubilization and refolding buffer were varied (see Table 3). For pH 8.5 solubilization and refolding buffer 1 was used, for pH 10 solubilization and refolding buffer 2 was used. The hemin addition was kept constant at 20 µM after 20 h. A CCF (central composite face-centered design) with the volumetric Activity after refolding as a response was used.

TABLE 3

DTT and GSSG concentrations as well as the pH value of the
solubilization and refolding buffer used to investigate
interactions between the redox system and the pH during
solubilization and refolding using a DoE CCF approach

| DTT conc. [mM in Solubilizate] | GSSG [mM in Refolding buffer] | pH of solubilization and refolding buffer |
|---|---|---|
| 2.5 | 0.4 | 7 |
| 7.11 | 1.27 | 8.5 |
| 11.72 | 3.01 | 10 |

DoE4: For this DoE, time and concentration of hemin addition were varied between 0 h-24 h after refolding start and 6 μM-80 μM Hemin, respectively. The exact factors used are shown in Table 4. Solubilization buffer 1 (pH 8) and refolding buffer 1 (pH 8.5) was used for all experiments. The volumetric activity was used as the response in order to optimize both factors.

TABLE 4

Times of addition and concentrations of hemin in
the refolding mix used as factors for DoE4 in order
to optimize hemin addition to the refolding mix

| Hemin addition (time after refolding start) [h] | Final Hemin concentration [μM] |
|---|---|
| 0 | 6 |
| 6 | 20 |
| 12 | 40 |
| 24 | 80 |

Results: Hemin Addition

In order to evaluate the optimal concentration of Hemin and the optimal time of addition after refolding start, several different conditions were screened in small scale experiments with the volumetric activity as a response. The results are presented in FIG. 1. For a hemin addition 0 h after refolding start, the refolding yield shows a strong dependency on the hemin concentration, with higher hemin concentrations leading to an over 10 fold reduction compared to optimized conditions. Furthermore, the refolding yield is reduced to 60% even for the lowest hemin concentration (6 μM). This effect is reduced for later hemin addition times, with addition after 24 h showing almost no effect of hemin concentration. 20 μM was chosen for further experiments.

Results: Redox System

In a first step, a Design of Experiment using DTT and GSSG concentration was performed (DoE1) in order to obtain the optimal redox system during solubilization and refolding. This approach has the advantage that it spans the two unit operations solubilization and refolding and uses the refolding yield (volumetric activity) as a response. Thereby, the final yield of the process is maximized instead of using a response as e.g. the solubilization yield to optimize the single unit operations. FIG. 2 shows the contour plot for the performed DoE1, with a maximum refolding yield at 7.11 mM DTT during solubilization (buffer 1; pH 8) and 1.27 mM GSSG (buffer 1; pH 8.5), calculated using the MODDE optimizer function. For the used dilution of 1:40 (solubilzation mix in refolding buffer) this is equivalent to a GSSG:DTT ratio of 7:1.

In order to cover the pH dependency of the redox pair DTT/GSSG, a DoE similar to DoE1 was performed, but with the pH (7; 8.5; 10) as an additional factor. Refolding at pH 7 yielded lower results for all combinations of DTT and GSSG, which heavily influences the model. This leads to bad predictions for DTT and GSSG for pH 8.5 and 10. Therefore, pH 7 was excluded from the model. FIG. 3 shows the 4D contour plot for the final model with the volumetric activity as a response. For pH 10, the maximal yield is achieved for 6.7 mM DTT and 1.26 mM GSSG.

EXAMPLE 3. REFOLDING REACTOR EXPERIMENTS

General materials and methods were as described in Example 1 unless specified otherwise. Analytical methods were used as described in Example 2.

Reactor Set-Up

For refolding in a larger scale an Infors Labfors 5 with a vessel volume of 3.6 L was used. All data collection and control of the process was done using Lucullus PIMS. Temperature was kept constant at 10° C. during refolding using a Lauda Alpha R8 thermostat connected to the double jacket of the glass vessel. Temperature was monitored using the temperature sensor connected to the Infors Labfors 5. In addition, pH, dO2 and redox potential were monitored. The pH and dO2 were measured with the respective probes connected to the Infors Labfors 5. The redox potential was monitored using a Hamilton EasyFerm Plus ORP Arc 425, connected to the Lucullus process system. The hemin feed was applied using a LAMBDA PRECIFLOW peristaltic liquid pump in combination with a Sartorius Entris scale, enabling a PID-Feed forward control using Lucullus.

Final refolding volumes for the vessel were kept constant at 1.2 L (resulting in the use of 30 mL solubilizate and a dilution of 1:40). The same buffer compositions as mentioned for the small scale experiments (Example 2; refolding buffer 1 or refolding buffer 2) were used.

Reactor Runs

Reactor experiment 1: For this experiment, the solubilization mix contained 1 mM DTT and the refolding buffer contained 0.35 mM GSSG. Solubilization buffer 1 (pH 8) and refolding buffer 1 (pH 8.5) was used. Hemin was added 20 h after refolding start to a final concentration of 20 μM.

Reactor experiment 2: For this experiment, the solubilization mix contained 7.11 mM DTT and the refolding buffer contained 1.27 mM GSSG. Solubilization buffer 1 (pH 8) and refolding buffer 1 (pH 8.5) was used. Hemin was added 20 h after refolding start to a final concentration of 20 μM. Samples (2 mL in reaction tubes) were taken every 2 h, hemin was added to reach a final concentration of 20 μM (only for samples taken before hemin addition; the samples taken after hemin addition already contained 20 μM), incubated (2 h; 4° C., slight agitation) and then enzyme activity was measured.

Reactor experiment 3: For this experiment, the solubilization mix contained 1 mM DTT and the refolding buffer contained 0.35 mM GSSG. Solubilization buffer 2 (pH 10) and refolding buffer 2 (pH 10) was used. Hemin was added 20 h after refolding start to a final concentration of 20 μM.

Reactor experiment 4: For this experiment, the solubilization mix contained 7.11 mM DTT and the refolding buffer contained 1.27 mM GSSG. Solubilization buffer 2 (pH 10) and refolding buffer 2 (pH 10) was used. Hemin was added 20 h after refolding start to a final concentration of 20 μM.

Reactor experiment 5: For this experiment, the solubilization mix contained 7.11 mM DTT and the refolding buffer contained 1.27 mM GSSG. Solubilization buffer 1 (pH 8) and refolding buffer 1 (pH 8.5) was used. A constant feed (2 mL 1 mM Hemin/h; final concentration 20 μM Hemin) was applied from 8 h after refolding start until 20 h (12 h feed time). As for reactor 2, samples were drawn every 2 h and activity was measured. After the start of the Hemin feed, samples were measured both directly (with a low hemin concentration at the start of the hemin feed), and additionally after the addition of hemin to a final concentration of 20 μM hemin and incubation for 2 h.

Results: Time of Hemin Addition

Based on small scale optimization (Example 2) a hemin addition 20 h after refolding start to a final concentration of 20 μM was used for reactor experiment 2. Before the addition of hemin (i.e. for the first 20 hours), samples were taken every 2 h to measure the activity at-line (FIG. 4). In order to measure the volumetric activity, which correlates to the refolding success, 20 μM hemin were added to each sample immediately after sampling and the activity was measured after incubation for two hours. After the addition of hemin to the reactor (i.e. after 20 hours), samples were still taken every 2 h but no further hemin was added. Still, the samples were incubated under the same conditions (2 hours before measurement) as before. As can be seen for the at-line activity measurement, refolding is completed after approximately 10 h, after which the activity stagnates until hemin is added. The rise of activity after hemin addition to the reactor is probably due to favourable conditions in the reactor, such as better surface to volume ratio and better mixing.

TABLE 5

Results from reactor experiment 2.

| Sample no. | Time from refolding start [h] | Volumetric activity [U/mL] |
|---|---|---|
| 1 | 2 | 16.63 ± 0.08 |
| 2 | 4 | 21.54 ± 1.36 |
| 3 | 6 | 28.87 ± 0.24 |
| 4 | 8 | 31.97 ± 0.52 |
| 5 | 10 | 30.63 ± 1.35 |
| 6 | 12 | 32.86 ± 0.87 |
| 7 | 14 | 31.74 ± 0.81 |
| 8 | 16 | 36.02 ± 3.70 |
| 9 | 18 | 32.67 ± 1.51 |
| 10 | 20 | 35.44 ± 0.86 |
| 11 | 22 | 32.18 ± 1.26 |
| 12 | 24 | 37.24 ± 1.78 |
| 13 | 26 | 42.31 ± 0.60 |
| 14 | 28 | 40.73 ± 1.52 |
| 15 | 30 | 43.05 ± 1.16 |
| 16 | 32 | 44.96 ± 0.93 |
| 17 | 44 | 46.45 ± 0.12 |

These experiments demonstrate that it is surprisingly advantageous to incubate the refolding mix for a period of time prior to the addition of the heme cofactor. It appears that the hydrophobic nature of hemin promoted aggregation during the refolding process. As shown using small scale experiments, higher concentrations of hemin reduce the refolding yield significantly if added early on, an effect that is not present for later additions. Adding a hydrophobic substance (in this case hemin) early on in the reaction may promote protein aggregation, leading to lower refolding yields. However, after the folding reaction is finished (around 10 h for HRP at the conditions used), addition of hemin no longer leads to aggregation (for all concentrations tested) as incorporation of hemin is the last step in holoenzyme formation.

Results: Linear Hemin Feed

For reactor experiment 5, a linear hemin feed was applied 8 h after the start of refolding for a total feed duration of 12 h. Samples were drawn according to the sampling procedure described for reactor experiment 2 (every two hours). After the start of the hemin feed, samples were measured both once without further addition of hemin (i.e. with a low hemin concentration at the start of the hemin feed; samples b1-b10 in Table 6), and once after the addition of hemin to reach a final concentration of 20 μM hemin and incubation for further 2 h (samples a1-a9 in Table 6).

TABLE 6

Results from reactor experiment 5.

| Sample no. | Time from refolding start [h] | Volumetric activity [U/mL] |
|---|---|---|
| Addition of hemin to a final concentration of 20 μM and 2 h incubation before measurement | | |
| a1 | 2 | 17.81 ± 0.67 |
| a2 | 4 | 25.64 ± 0.40 |
| a3 | 6 | 27.86 ± 1.04 |
| a4 | 8 | 33.10 ± 1.49 |
| a5 | 10 | 40.26 ± 0.93 |
| a6 | 12 | 38.64 ± 2.10 |
| a7 | 14 | 39.97 ± 0.21 |
| a8 | 16 | 43.50 ± 1.01 |
| a9 | 18 | 44.10 ± 0.67 |
| Samples measured immediately without further hemin addition | | |
| b1 | 10 | 36.11 ± 0.17 |
| b2 | 12 | 44.48 ± 1.02 |
| b3 | 14 | 42.65 ± 2.43 |
| b4 | 16 | 54.71 ± 1.61 |
| b5 | 18 | 55.13 ± 2.15 |
| b6 | 20.5 | 62.40 ± 2.10 |
| b7 | 28 | 56.34 ± 0.93 |
| b8 | 47.5 | 50.62 ± 1.93 |
| b9 | 52 | 50.56 ± 0.23 |

The beneficial effect of hemin addition being distributed over a certain time period vs. batch addition at once are apparent from the comparison of reactor experiments 2 and 5. Experiment 2, sample 4 and Experiment 5, sample a4 are both based on to the batch addition of 20 μM hemin 6 h after the start of refolding and measurement after a further 2 h. As a consequence, the observed volumetric activity is very similar (31.97±0.52 vs. 33.10±1.49). This demonstrates that the results of the samples can be compared between these experiments. The difference in batch addition vs. addition over an extended period of time is apparent from the comparison of Experiment 2, sample 10 (batch addition of 20 μM hemin after 18 h, measured after 20 h: 35.44±0.86) and Experiment 5, sample b6 (addition of 20 μM hemin as linear feed between 8 h and 20 h after refolding, measured after 20.5 h: 62.40±2.10). The only difference between these two samples is the duration of hemin addition (all at once as a batch or distributed over 12 h), clearly demonstrating that the distribution of hemin addition over a longer time period leads to superior results.

FIG. 5 shows the redox potential as well as the measured volumetric activities. Compared to reactor experiment 2 (FIG. 4), the beginning of the refolding is very similar for both experiments, with the volumetric activity achieved after 8 h being 32.0 for experiment 2 and 33.1 for experiment 5. However, the linear hemin feed applied for experiment 5 leads to a 25% increase in refolding yield compared to experiment 2 after the addition of hemin.

Results: Redox System

In order to confirm the results obtained using small scale experiments (Example 2), four reactor experiments were performed. The conditions as well as the final specific activity are listed in Table 7. In general, these are in good concordance with the results obtained using the small-scale experiments, with the optimized DTT/GSSG concentration at pH 10 showing the highest refolding yield.

TABLE 7

Used pH, DTT and GSSG concentration in bench scale refolding experiments (1.2 L) in a bioreactor and the obtained specific Activity [U/mg], which is in turn representative of the refolding yield.

| Reactor Nr | Buffer System | DTT [mM] | GSSG [mM] | sAct [U/mg] |
|---|---|---|---|---|
| 1 | Tris pH 8.5 | 1 | 0.35 | 52.1 |
| 2 | Tris pH 8.5 | 7.11 | 1.27 | 115.2 |
| 3 | Glycine pH 10 | 1 | 0.35 | 83.2 |
| 4 | Glycine pH 10 | 7.11 | 1.27 | 172.1 |

EXAMPLE 4. CAPTURE AFTER REFOLDING

General materials and methods were as described in Example 1. Analytic methods were used as described in Example 2.

In this example, hydrophobic interaction chromatography (HIC) was used as a capture step after the refolding. This has the advantage that binding conditions require high salt concentrations, which precipitate impurities such as excess hemin, aggregates and impurities, while correctly folded HRP is stable up to a high salt concentration. This has the advantage that these impurities are separated from the load used for the capture step, resulting in a higher binding capacity and easier cleaning and regeneration of the chromatographic resin.

Small Scale Precipitation Experiments

In order to find the best salt concentration for a capture step using a HIC (hydrophobic interaction chromatography), different concentrations of $(NH_4)_2SO_4$ and NaCl were tested in 2 mL reaction tubes. The appropriate amount of salt (see Table 8) was weighed in a 2 mL reaction tube and 1 mL of refolding mix (after refolding was finished) was added. The reaction tube was mixed in order to dissolve the salt and incubated for 30 min at room temperature and slight agitation. After centrifugation (20379 g; 20 min; 4° C.), the supernatant was used for Bradford and activity measurements. The best conditions were then used to prepare the loads of the various HIC experiments, using larger volumes. Therefore, the salt was slowly added under continuous stirring within 10 min, the solution was then incubated while stirring for 20 min at room temperature and then centrifuged (20379 g; 20 min; 22° C.).

TABLE 8

Different salt concentrations of $(NH_4)_2SO_4$ and NaCl used in small scale experiments to optimize salt precipitation after refolding

| $(NH_4)_2SO_4$ concentration [M] | NaCl concentration [M] |
|---|---|
| 0 | 0 |
| 0.25 | 0.5 |
| 0.5 | 1 |
| 0.75 | 1.5 |
| 1 | 2 |
| 1.5 | 2.5 |
| — | 3 |
| — | 3.5 |
| — | 4 |

An ÄKTA Pure system (GE Healthcare) was used for all described chromatography steps. Three wavelengths (214 nm, 280 nm and 404 nm) as well as the conductivity were monitored.

Two different salts were tested for the precipitation step, namely $(NH_4)_2SO_4$ and NaCl. In order to find the optimal salt concentration, several salt concentrations of both salts were tested in 2 mL reaction tubes, with the results listed in Table 9 and Table 10. Usually, the lowest salt concentration needed for the target protein to bind on the HIC resin is used for preparation of the load, because at this concentration the lowest amount of impurities are bound. In this case, however, the highest amount where active HRP is not precipitating was selected. On the one hand, this ensured that a large amount of impurities are precipitated (see purification factor in Table 9). On the other hand, almost all impurities bound to the resin at these conditions were more hydrophobic and would therefore also bind at lower salt concentrations. Additionally, the difference in binding strength made it easy to separate active HRP from these impurities. For this reason, 1 M $(NH_4)_2SO_4$ or 4 M NaCl were chosen for the preparation of the loads.

TABLE 9

Influence of different concentrations of $(NH_4)_2SO_4$ after the end of refolding on the protein concentration (measured using Bradford assay), the specific activity, calculated from total protein and the volumetric activity, and the purification factor

| $(NH_4)_2SO_4$ [M] | Protein concentration [g/L] | Specific Activity [U/mg] | Purification Factor |
|---|---|---|---|
| 0 | 0.32 | 126 | 1.0 |
| 0.25 | 0.40 | 108 | 0.9 |
| 0.5 | 0.25 | 166 | 1.3 |
| 0.75 | 0.18 | 269 | 2.1 |
| 1 | 0.15 | 424 | 3.4 |
| 1.5 | 0.12 | 286 | 2.3 |

TABLE 10

Influence of different concentrations of NaCl after the end of refolding on the volumetric activity

| NaCl [M] | volumetric Activity [U/mL] |
|---|---|
| 0 | 42.4 |
| 0.5 | 45.1 |
| 1 | 43.4 |
| 1.5 | 42.6 |
| 2 | 44.6 |
| 2.5 | 40.3 |
| 3 | 44.6 |
| 3.5 | 40.7 |
| 4 | 44.5 |

The results obtained for the small scale experiments were then validated using bench scale experiments with a volume of 150 mL, which are listed in Table 11. The recovery of the volumetric activity for the chosen salt concentration was 96 and 95 for $(NH_4)_2O_4$ and NaCl, respectively. Specific activity increased 2.5 for $(NH_4)_2SO_4$ and 4.5 fold for NaCl, resulting in advantageous conditions as a load for the following HIC step.

TABLE 11

Volumetric and specific activity as well as protein concentration and purification factor for bench scale (150 mL) salt precipitation using 1M $(NH_4)_2SO_4$ or 4M NaCl as sample preparation for a HIC capture step

| Reactor exp. | Salt | volumetric Activity [U/mL] | Protein conc. [g/L] | Specific Activity [U/mg] | Purification Factor |
|---|---|---|---|---|---|
| Same conditions as R2 | $(NH_4)_2SO_4$ 1M | 38.0 | 0.12 | 317 | 2.5 |
| R2 | NaCl 4M | 44.3 | 0.09 | 492 | 4.5 |

HIC Experiment 1 (HIC 1)

The load was prepared as described above by adding 267 g NaCl/1 L refolding mix. A HiTrap Butyl FF 1 mL (GE Healthcare) was used with a flow rate of 0.5 mL/min (75 cm/h; 0.5 CV/min; CV=column volumes). The column was equilibrated with Buffer A (Buffer A: 20 mM Bis-Tris pH 7; 7% Glycerol; 4 M NaCl) and 49 mL load were applied after all signals were constant during equilibration. After the load, a washing step with buffer A (8 mL; 8 CVs) was performed. Thereafter, a step elution was performed with 25% Buffer B (Buffer B: 20 mM Bis-Tris pH 7; 7% Glycerol/8 mL; 8 CVs), 75% Buffer B (10 mL; 10 CVs) and 100% (17 mL; 17 CVs) Buffer B, with active HRP eluting at 75% Buffer B. Volumetric enzyme activity [U/mL] and protein concentration were measured for all fractions. The purity of the active pool was determined using SEC-HPLC and the Reinheitszahl.

This capture step presents the optimized method for the purification and capture of HRP after refolding. FIG. 6 shows the step elution used for this experiment and Table 12 the corresponding analytics. Active HRP is concentrated around 9 fold for the chromatography step, resulting in 0.5 g/L, which is expected to further improve during scale up. More hydrophobic impurities elute at 100% buffer B, leading to a good resolution for this method. The ratio of the 404 nm signal to the 280 nm signal suggests a high purity for the active fraction. This was further confirmed by SEC-HPLC (purity≥98%). Therefore, this presents a way to obtain pure, correctly folded and fully active HRP produced from *E. coli* inclusion bodies.

TABLE 12

Volume, Protein concentration, specific activity and purification factor for a capture step using salt precipitation followed by hydrophobic interaction chromatography

| | Volume [mL] | Protein conc. [mg/mL] | Specific Activity [U/mg] | Purification factor |
|---|---|---|---|---|
| Refolding end | | 0.51 | 126 | 1 |
| Load (after salt precipitation) | 50 | 0.09 | 726 | 5.8 |
| Active HRP fraction | 4 | 0.50 | 1176 | 9.4 |

HIC Experiment 2 (HIC 2)

The load was prepared as described above by adding 132 g $(NH_4)_2SO_4$/1 L refolding mix. A HiTrap Octyl FF 1 mL (GE Healthcare) was used with a flow rate of 1 mL/min (150 cm/h; 1 CV/min). The column was equilibrated with Buffer A (Buffer A: 20 mM Tris pH 8.5; 7% Glycerol; 1 M $(NH_4)_2SO_4$) and 50 mL load were applied after all signals were constant during equilibration. After the load, a wash step with buffer A (16 mL; 16 CVs) was performed. Thereafter, a linear gradient elution was performed with 0-100% B (Buffer B: 20 mM Bis-Tris pH 7; 7% Glycerol) in 30 mL (30 min; 30 CVs). Volumetric enzyme activity [U/mL] was measured for all fractions. Since the by far largest percentage of active HRP was found in the flowthrough, no further analytics were applied.

For this capture step, a resin with a low hydrophobicity, HiTrap Octyl FF 1 mL (GE Healthcare), was used. At the chosen salt concentration (1 M $(NH_4)_2SO_4$), 75% of active HRP did not bind to the column and were found in the flowthrough (see FIG. 7 and Table 13). This might be improved using a higher salt concentration, however, small scale experiments showed that recovery declines for salt concentrations over 1 M $(NH_4)_2SO_4$. Therefore, it was concluded that the mentioned resin is less advantageous for the capture step of active HRP after refolding. This might be improved if an Octyl resin with a higher ligand density is used, since the hydrophobicity of the column depends on the density of bound ligand. The ligand density for Octyl Sepharose 4 Fast Flow (5 µmol/mL resin) is around 10-fold lower than that of Butyl Sepharose 4 Fast Flow (50 µmol/mL resin), which was used for HIC 1.

TABLE 13

Volumetric Activity and Recovery for a capture step using an Octyl Sepharose 4 Fast Flow resin

| | Volumetric Activity [U/mL] | Recovery [%] |
|---|---|---|
| Refolding end | 30.4 | 100 |
| Load (after salt precipitation) | 30.6 | 100 |
| Flowthrough | 22.7 | 75 |
| Active HRP fraction | 8.6 | 8 |

HIC Experiments 3 and 4 (HIC 3 and HIC 4)

For HIC experiment 3 the load was prepared as described above by adding 267 g NaCl/1 L refolding mix. A HiTrap Phenyl FF (High Sub) 1 mL (GE Healthcare) was used with a flow rate of 1 mL/min (150 cm/h; 1 CV/min). The column was equilibrated with Buffer A (Buffer A: 20 mM Tris pH 8.5; 7% Glycerol; 4 M NaCl) and 50 mL load were applied after all signals were constant during equilibration. After the load, a wash step with buffer A (9 mL; 9 CVs) was performed. Thereafter, a linear gradient elution was performed with 0-100% B (Buffer B: 20 mM Bis-Tris pH 7; 7% Glycerol) in 30 mL (30 min; 30 CVs). Volumetric enzyme activity [U/mL] was measured for all fractions. Since the fraction containing active HRP showed lower concentrations and a not as good separation from impurities, no further analytics were applied.

For HIC experiment 4 the load was prepared as described above by adding 267 g NaCl/1 L refolding mix. A HiTrap Phenyl FF (High Sub) 1 mL (GE Healthcare) was used with a flow rate of 0.5 mL/min (75 cm/h; 0.5 CV/min). The column was equilibrated with Buffer A (Buffer A: 20 mM Tris pH 8.5; 7% Glycerol; 4 M NaCl) and 50 mL load were applied after all signals were constant during equilibration. After the load, a wash step with buffer A (10 mL; 10 CVs) was performed. Thereafter, a step elution was performed with 60% buffer B (Buffer B: 20 mM Bis-Tris pH 7; 7% Glycerol/9 mL; 9 CVs), 90% buffer B (26 mL; 26 CVs) and 100% (32 mL; 32 CVs) buffer B, with active HRP eluting at 90% buffer B. Volumetric enzyme activity [U/mL] was measured for all fractions. Since the fraction containing active HRP showed lower concentrations and not as good separation from impurities, no further analytics were applied.

For HIC 3 and HIC 4, a resin with higher hydrophobicity than for HIC 1 was used (HiTrap Phenyl FF (High Sub)). For HIC 3, a gradient elution was used, which led to a poorer separation of the active HRP and more hydrophobic impurities, as shown in FIG. 8. Due to the high hydrophobicity of the resin, both fractions elute very close to each other, with active HRP eluting at around 90% buffer B and impurities at 100% buffer B. Therefore, a step elution was tested for HIC 4, which is shown in FIG. 9. While separation improved, elution volumes for the active HRP fraction eluting at 90% buffer B also increased, since it showed a strong tailing.

HIC Experiment 5 (HIC 5)

The finished refolding mix of reactor experiment 4 (Example 3) was used as material for this capture step. The pH was adjusted to 8.5 with 2 M HCl under stirring. Afterwards, the load was prepared as described above by adding 267 g NaCl/1 L refolding mix. A column packed with Butyl Sepharose 4 Fast Flow (GE Healthcare) and a volume of 80 ml was used with a flow rate of 8 mL/min (90 cm/h). The column was equilibrated with Buffer A (Buffer A: 20 mM Bis-Tris pH 7; 4 M NaCl) and 751 mL load were applied after all signals were constant during equilibration. After the load, a wash step with 20% buffer B (Buffer B: 20 mM Bis-Tris pH 7/1.5 CVs) was performed. Thereafter, a step elution was performed with 75% Buffer B (3 CVs) and 100% (3 CVs) Buffer B, with active HRP eluting at 75% Buffer B. Volumetric enzyme activity [U/mL] and protein concentration were measured for all fractions. The purity of the active pool was determined using Reinheitszahl.

To confirm the compatibility of refolding at pH 10 with the subsequent capture step, the refolding mix of reactor experiment 4 was used as load for the HIC. In order to prevent changes in the binding behavior, pH of the refolding mix was adjusted to 8.5 before salt precipitation. FIG. 10 shows the elution of the active HRP fraction as well as the impurities. Active HRP was concentrated to a final concentration of 0.95 g/L and a volumetric activity of 1500 U/mL with a Reinheitszahl comparable to that of plant HRP (2.72). These results confirmed the expectation that scale-up from 1 mL column volume leads to a higher concentration, as discussed for HIC 1. Furthermore, the capture step discussed for HIC 1 was shown to be scalable and applicable for a refolding process at pH 10, since the pH can be adjusted to 8.5 without the loss of active HRP. Therefore, a capture step using 4 M NaCl for salt precipitation followed by a hydrophobic interaction chromatography proved to be particularly advantageous.

EXAMPLE 5. FULL PROCESS

Analytical Methods

Analytical methods were used as described in Example 2, with the following differences/additions:

Protein concentration: Protein concentration was determined using the method according to Bradford (Bradford, M. M., A rapid and sensitive method for the quantitation of microgram quantities of protein utilizing the principle of protein-dye binding. Analytical biochemistry, 1976. 72(1-2): p. 248-254). 200 µl Bradford solution were mixed with 5 µl sample and the change in absorbance at 595 nm was measured with a Tecan Infinite M200 PRO instrument over the course of 10 min.

Reversed phase HPLC: HRP concentration in the samples was measured with RP HPLC using a Polyphenyl BioResolve-RP-mAb 2.7 µm 3.0×100 mm column. The method was run for 10 min with the following program: 25% B for 0.5 min, 55% B in a linear gradient for 8 min, 55% B for 0.5 min and then 25% B for 1 min (A=MilliQ water with 0.1% trifluoroacetic acid (TFA); B=Acetonitrile with 0.1% TFA) at a flow rate of 1.2 ml/min. The column was kept at a constant temperature of 75° C. and 214 nm, 280 nm and 404 nm were measured.

Size exclusion HPLC: Purity of the active HRP fraction after the capture step with HIC was measured using a SEC-HPLC. For this, a BEH 200A SEC 1.7 µm 4.6×300 mm, 3.5 µm (Waters) column was used. The method was run at 0.3 mL/min with 100% Buffer A (Buffer A: 80 mM Phosphate pH 6.8; 250 mM KCl) for 18 minutes. The column was kept at a constant temperature of 30° C. and 214 nm, 280 nm and 404 nm were measured.

Process Runs

Strains and growth conditions as well as homogenization and inclusion body wash were performed as described in Example 1. A refolding reactor was used as described in Example 3.

For solubilization, an aliquot of the frozen IBs was thawed, weighed in order to calculate the wet Inclusion Body (wIB) weight and resuspended in the appropriate solubilization buffer (Solubilization buffer 1: 50 mM TRIS/HCl; pH 8.5; 6 M Urea/Solubilization buffer 2: 50 mM glycine; pH 10; 6 M Urea) to reach a wIB concentration of 100 g/L (3.5 g IBs=35 ml solubilization mix which results in 30 ml solubilization mix after centrifugation). After resuspension, DTT was added (using a 1 M DTT stock) to reach a final concentration in the solubilization mix of 7.11 mM DTT and the solubilization mix was incubated (4° C.; 0.5 h; slight agitation), followed by centrifugation (20379 g; 20 min; 4° C.). The supernatant was immediately used for refolding, the pellet discarded.

Reactor runs were carried out at pH 8.5 and at pH 10, as follows.

For pH 8.5, final refolding volume for the vessel was 1.2 L (resulting in the use of 30 mL solubilizate and a dilution of 1:40). The refolding buffer contained 20 mM TRIS/HCl pH 8.5, 2 M urea, 7% glycerol, 2 mM CaCl$_2$, 1.27 mM GSSG. A constant feed (2.4 mL 1 mM Hemin/h; final concentration 20 µM Hemin) was applied from 8 h after refolding start until 18 h (10 h feed time) and the reactor run was terminated after 19 h. For salt precipitation, 0.27 g NaCl/ml refolding mix were added over the course of 30 min while stirring at room temperature. Afterwards the refolding mix was centrifuged at 17,568 g at 4° C. for 30 min in a Thermo Scientific LYNX Sorvall 6000 centrifuge. The supernatant was used as load for HIC (about 1250-1300 ml after salt addition) and the pellet was discarded.

For pH 10, final refolding volume for the vessel was 1.2 L (resulting in the use of 30 mL solubilizate and a dilution of 1:40). The refolding buffer contained 20 mM glycine pH 10 (adjusted with HCl), 2 M urea, 7% glycerol, 2 mM CaCl$_2$, 1.27 mM GSSG. A constant feed (2.4 mL 1 mM Hemin/h; final concentration 20 µM Hemin) was applied from 8 h after refolding start until 18 h (10 h feed time) and the reactor run was terminated after 19 h. Before salt precipitation the pH was lowered from pH 10 to pH 8.5 with HCl. Then 0.27 g NaCl/ml refolding mix were added over the course of 30 min while stirring at room temperature. Afterwards the refolding mix was centrifuged at 17568 g at 4° C. for 30 min in a Thermo Scientific LYNX Sorvall 6000 centrifuge. The supernatant was used as load for HIC (about 1250-1300 ml after salt addition) and the pellet was discarded.

For HIC, a column packed with Butyl Sepharose 4 Fast Flow (GE Healthcare) with a bed volume of 80 ml was used. The column was equilibrated with Buffer A (Buffer A: 20 mM BisTris pH 7; 4 M NaCl) at a flow rate of 113 cm/h until all signals were constant. Then 1250-1300 mL load were applied at a flow rate of 90 cm/h. After the load, a wash step with 20% buffer B (Buffer B: 20 mM Bis-Tris pH 7) was performed at a flow rate of 90 cm/h for 2 CVs. Thereafter, a step elution was performed with 75% buffer B (79 cm/h) and 100% (90 cm/h) buffer B, with active HRP eluting at 75% buffer B. Volumetric enzyme activity [U/mL] and protein concentration were measured for all fractions. The purity of the active pool was determined using Reinheitszahl.

Results

According to the method development experiments which were conducted in a small scale pH 10 was found to be more suitable for refolding than pH 8.5 (see Example 2). Therefore two reactor runs were performed with the same amount of HRP wet inclusion bodies, one with refolding at pH 8.5 and one with refolding at pH 10. An overview of the results can be seen in Table 14. Refolding at pH 10 leads to a highly increased refolding yield of 74% when compared to the yield at pH 8.5 (44%). Moreover, the Reinheitszahl is higher and the total yield of pure HRP is increased 1.7-fold at pH 10. This confirms the results from the small scale DoE (Example 2). FIGS. 11 and 12 show the chromatograms of the HIC runs. Here it can be seen that refolding at pH 10 leads to significantly reduced hydrophobic impurities and a large sharp HRP peak at 75% buffer B.

TABLE 14

Comparison of final parameters for refolding at pH 8.5 and pH 10.

|  | pH 8.5 | pH 10 |
| --- | --- | --- |
| Total yield pure HRP [mg] | 84 | 144 |
| Specific activity [U/mg] | 1507 ± 13 | 1468 ± 24 |
| Purity [SEC HPLC] | 99 | 99 |
| Pure HRP/g wet IB [mg] | 24 | 41 |
| Refolding yield [%] | 44 | 74 |
| Pure HRP/L fermentation broth [mg] | 562 | 959 |
| Reinheitszahl | 3.7 | 4.3 |
| Total Units/reactor (7 mM ABTS) | 146700 | 209500 |

EXAMPLE 6. MATERIALS AND METHODS OF HRP MUTATION STUDIES

Expression and Purification of HRP Mutants

Plant HRP Type VI-A (Cat. No.: P6782) was obtained from Sigma-Aldrich (St. Louis, MO, USA). All HRP variants produced in E. coli consisted of the sequence as set forth in SEQ ID NO: 2 with the indicated mutations unless specified otherwise.

Expression Host and Plasmids

Standard molecular cloning techniques were performed as described previously (Humer and Spadiut. "Improving the performance of horseradish peroxidase by site-directed mutagenesis." International Journal of Molecular Sciences 20.4 (2019): 916). The hrp gene coding for HRP variant C1A (wild-type HRP; SEQ ID NO: 2) was codon-optimized for E. coli and obtained from GenSript USA Inc. (Piscataway, NJ, USA). HRP was produced from pSF-T7-LacO-NH2-dsbA (OG4591) (Oxford Genetics Ltd., Oxford, UK) or pET21d+ (Novagen, San Diego, CA, USA) in the E. coli strain BL21 (DE3) (Lucigen, Middleton, WI, USA). The plasmid pSFT7 encodes a Dsb tag for export into the periplasm which is cleaved off after translocation. The plasmid pET21d+ was used for HRP inclusion body production in the cytoplasm. A stop codon was introduced so that the protein is produced without any tags.

Protein Expression and Purification from Inclusion Bodies (IBs)

SB medium (32 g $L^{-1}$ tryptone; 20 g $L^{-1}$ yeast extract; 5 g $L^{-1}$ NaCl; 5 mM NaOH) was used for cultivation of BL21 (DE3) cells that comprised vector pET21d+ with the hrp gene (or variants thereof) devoid of any N- or C-terminal tags. Ampicillin was added to a final concentration of 100 mg $L^{-1}$. Pre-cultures were grown overnight at 37° C. with shaking (250 rpm) in 50 mL $SB^{Amp}$ medium and 2.5 L Ultra Yield Flasks (UYF) were inoculated to reach an optical density ($OD_{600}$) of 0.3 in a final volume of 500 mL $SB^{Amp}$ medium. The cells were grown at 37° C. with shaking (250 rpm) until an $OD_{600}$ of 0.5, subsequently hrp expression was induced by adding 0.1 mM isopropyl β-D-1-thiogalactopyranoside (IPTG). After growth for 20 h at 25° C. and 250 rpm, the cells were harvested by centrifugation (5000 g, 20 min, 4° C.).

Biomass was resuspended using an IKA T10 basic ULTRA-TURRAX in 3-5 mL buffer A/g wet biomass (Buffer A: 50 mM TRIS/HCl; pH 8; 500 mM NaCl; 1.5 mM EDTA) and homogenized (using a GEA Niro Soavi Panda PLUS) (>1300 bar, 3 passages, cooled). The homogenized suspension was centrifuged (15650 g; 20 min, 4° C.), the supernatant discarded and the cell debris resuspended in 10 mL buffer B/g wet cell debris (Buffer B: 50 mM TRIS/HCl; pH 8; 500 mM NaCl; 2 M Urea) and centrifuged again (15650 g; 20 min, 4° C.). The washing step using buffer B was repeated once. Afterwards, IBs/cell debris were resuspended in water (5 mL water/g wet cell debris), the suspension aliquoted into pre-weighed 50 mL reaction tubes, centrifuged (15650 g; 20 min, 4° C.) and the pellets stored at −20° C. until further use.

For solubilization, an aliquot of the frozen IBs was thawed, weighed in order to calculate the wet Inclusion Body (wIB) weight and resuspended in the appropriate solubilization buffer (50 mM TRIS/HCl; pH 8.5; 6 M Urea) to reach a wIB concentration of 100 g/L. After resuspension, DTT was added (using a 1 M DTT stock) to reach a final concentration in the solubilization mix of 7.11 mM DTT and the solubilization mix was incubated (4° C.; 0.5 h; slight agitation), followed by centrifugation (20379 g; 20 min; 4° C.). The supernatant was immediately used for refolding, the pellet discarded.

The solubilizate was diluted 1:40 in the appropriate refolding buffer (e.g. 20 mM TRIS/HCl pH 8.5, 2 M urea, 7% glycerol, 2 mM $CaCl_2$, 1.27 mM GSSG), to which hemin was added in a final concentration of 20 μM and refolding was carried out at 10° C. for 19 hours.

The proteins were further purified by hydrophobic interaction chromatography (HIC). A column packed with Butyl Sepharose 4 Fast Flow (GE Healthcare) with a bed volume of 80 ml was used. 8 mL/min (90 cm/h). The column was equilibrated with Buffer A (Buffer A: 20 mM BisTris pH 7; 4 M NaCl) at a flow rate of 113 cm/h until all signals were constant. Then 1250-1300 mL load were applied at a flow rate of 90 cm/h. After the load, a wash step with 20% buffer B (Buffer B: 20 mM Bis-Tris pH 7) was performed at a flow rate of 90 cm/h for 2 CVs. Thereafter, a step elution was performed with 75% buffer B (79 cm/h) and 100% (90 cm/h) buffer B, with active HRP eluting at 75% buffer B.

For several mutants, protein production and purification was alternatively carried out using the most preferred method as described in Example 5 (pH 10).

Kinetic Parameters

Enzyme kinetic parameters were determined for the substrates ABTS, TMB and hydrogen peroxide in a 96-well plate assay using a Tecan Infinite M200 PRO instrument (Tecan, Männedorf, Switzerland).

For measurements with 3,3',5,5'-tetramethylbenzidine (TMB) as substrate, the reaction mixture in each well of the 96-well plate contained a saturating hydrogen peroxide concentration of 1 mM and varying TMB concentrations (20-550 µM) in 50 mM phosphate-citrate buffer pH 5 in a final volume of 200 µL. Protein sample (5 µL) was mixed with 175 µl TMB-buffer mixture and the reaction was started with 20 µl hydrogen peroxide solution (10 mM). The increase in absorption was followed at 652 nm for 60s at 30° C. in a Tecan Infinite M200 PRO instrument. The kinetic parameters were calculated using Sigma Plot software (Systat Software INC., San Jose, CA, USA) and an extinction coefficient of $\varepsilon_{652}$=39 mM$^{-1}$ cm$^{-1}$ (see Josephy, et al. "The horseradish peroxidase-catalyzed oxidation of 3, 5, 3', 5'-tetramethylbenzidine. Free radical and charge-transfer complex intermediates." Journal of Biological Chemistry 257.7 (1982): 3669-3675).

For measurements with ABTS as substrate, the reaction mixture in each well of the 96-well plate contained a saturating hydrogen peroxide concentration of 1 mM and varying ABTS concentrations (0.1-7 mM) in 50 mM phosphate-citrate buffer pH 5 in a final volume of 200 µL. Protein sample (5 µL) was mixed with 175 µl ABTS-buffer mixture and the reaction was started with 20 µl hydrogen peroxide solution (10 mM). The increase in absorption was followed at 420 nm for 120 s at 30° C. in a Tecan Infinite M200 PRO instrument. The kinetic parameters were calculated using Sigma Plot software (Systat Software INC., San Jose, CA, USA) and an extinction coefficient of $\varepsilon_{420}$=36 mM$^{-1}$ cm$^{-1}$ (see Childs and Bardsley. "The steady-state kinetics of peroxidase with 2, 2'-azino-di-(3-ethyl-benzthiazoline-6-sulphonic acid) as chromogen." Biochemical Journal 145.1 (1975): 93-103).

For measurements with hydrogen peroxide as substrate, the reaction mixture in each well of the 96-well plate contained a saturating ABTS of 10 mM and varying hydrogen peroxide concentrations (0.001-1 mM) in 50 mM phosphate-citrate buffer pH 5 in a final volume of 200 µL. Protein sample (5 µL) was mixed with 145 µl hydrogen peroxide-buffer mixture and the reaction was started with 50 µl ABTS solution (40 mM). The increase in absorption was followed at 420 nm for 120 s at 30° C. in a Tecan Infinite M200 PRO instrument. The kinetic parameters were calculated using Sigma Plot software (Systat Software INC., San Jose, CA, USA) and an extinction coefficient of $\varepsilon_{420}$=36 mM$^{-1}$ cm$^{-1}$ (see Childs and Bardsley. "The steady-state kinetics of peroxidase with 2, 2'-azino-di-(3-ethyl-benzthiazoline-6-sulphonic acid) as chromogen." Biochemical Journal 145.1 (1975): 93-103).

Thermal Stability

The thermal stability of the enzyme variants was assessed at 60° C. in 50 mM BisTris/HCl pH 7, 7% glycerol, 500 mM NaCl. The enzymatic activity with ABTS was measured after 0, 30, 60, 90 and 120 min for HRP wild-type (SEQ ID NO: 2) and HRP N13D/N57S/N255D/N268D; after 0, 90, 180, 300, 420 and 588 min for variants HRP N13D/N57S/N175S/N255D/N268D, HRP N13D/N57S/P146Q/N175S/N255D/N268D, HRP N13D/N57S/N175S/N255D/N268D/N275K and HRP N13D/N57S/P146Q/N175S/N255D/N268D/N275K and after 0, 90, 180, 300 and 420 min for plant HRP. The enzyme concentration of all variants including plant HRP was 2.86 µM during the heat treatment. Afterwards the samples were cooled on ice for 5 min before centrifugation at 16162 g for 15 min at 4° C. Subsequently the residual activity was measured with 7 mM ABTS with a Tecan Infinite M200 PRO instrument. The reaction mixture contained 5 µL of protein, a saturating hydrogen peroxide concentration of 1 mM and 7 mM ABTS in 50 mM phosphate-citrate buffer pH 5 with a total volume of 200 µl. The increase in absorption was followed at 420 nm for 120 s at 30° C. The residual enzyme activity was plotted against incubation time and the half-life at 60° C. was calculated using the rate of inactivation in the following Equation:

$$t_{1/2}=\ln(2)/k_{in}$$

wherein $t_{1/2}$ is the half-life and $k_{in}$ is the slope of the logarithmic residual activity.

EXAMPLE 7. THERMAL STABILITY OF HRP MUTANTS

Several mutants of HRP were expressed and purified and thermostability was measured as described in Example 6. It was found that a number of mutations increased thermostability. The most preferred mutant HRP N13D/N57S/P146Q/N175S/N255D/N268D/N275K (SEQ ID NO: 4) displayed a more than 13-fold enhanced thermostability over wild-type HRP (SEQ ID NO: 2) and a 1.7-fold enhanced thermostability even over the plant-derived (i.e. glycosylated) enzyme. Importantly, for the combination of the mutations P146Q and N275K (HRP N13D/N57S/P146Q/N175S/N255D/N268D/N275K) a significantly greater thermostability was observed than for either mutation P146Q (HRP N13D/N57S/P146Q/N175S/N255D/N268D) or N275K (HRP N13D/N57S/N175S/N255D/N268D/N275K) alone.

TABLE 15

Thermal stability of plant HRP and recombinantly produced HRP variants.

| Variant | Half life at 60° C. [min] |
|---|---|
| plant HRP | 217 ± 3 |
| HRP wild-type (SEQ ID NO: 2) | 28 ± 1 |
| HRP N13D/N57S/N255D/N268D (disclosed in Humer and Spadiut 2019, supra) | 46 ± 1 |
| HRP N13D/N57S/N175S/N255D/N268D/N275K | 242 ± 2 |
| HRP N13D/N57S/P146Q/N175S/N255D/N268D | 267 ± 1 |
| HRP N13D/N57S/N175S/N255D/N268D | 396 ± 17 |
| HRP N13D/N57S/P146Q/N175S/N255D/N268D/N275K (SEQ ID NO: 4) | 376 ± 5 |

EXAMPLE 8. KINETIC PARAMETERS OF HRP MUTANTS

Several mutants of HRP were expressed and purified and the kinetic parameters for the substrates ABTS, TMB and hydrogen peroxide were determined as described in Example 6. HRP N13D/N57S/P146Q/N175S/N255D/N268D/N275K (SEQ ID NO: 4) was found to be significantly more active than HRP N13D/N57S/N175S/N255D/N268D with the substrates TMB and hydrogen peroxide. The mutations P146Q and N275K were found to have a strong beneficial effect on enzymatic activity.

TABLE 16

Kinetic parameters for the substrate TMB.

| Variant | Km [mM] | Vmax [U/mg] | kcat [s$^{-1}$] | kcat/Km [mM$^{-1}$ s$^{-1}$] |
|---|---|---|---|---|
| HRP N13D/N57S/N175S/N255D/N268D | 0.064 ± 0.014 | 5628 ± 335 | 3236 ± 193 | 50856 ± 11539 |
| HRP N13D/N57S/P146Q/N175S/N255D/N268D/N275K (SEQ ID NO: 4) | 0.071 ± 0.017 | 7551 ± 509 | 4342 ± 292 | 61191 ± 15140 |

TABLE 17

Kinetic parameters for the substrate $H_2O_2$.

| Variant | Km [mM] | Vmax [U/mg] | kcat [s$^{-1}$] | kcat/Km [mM$^{-1}$ s$^{-1}$] |
|---|---|---|---|---|
| HRP N13D/N57S/N175S/N255D/N268D | 0.174 ± 0.004 | 2003 ± 14 | 1152 ± 8.3 | 6626 ± 160 |
| HRP N13D/N57S/P146Q/N175S/N255D/N268D/N275K (SEQ ID NO: 4) | 0.171 ± 0.009 | 2337 ± 38 | 1344 ± 22 | 7873 ± 430 |

TABLE 18

Kinetic parameters for the substrate ABTS.

| Variant | Km [mM] | Vmax [U/mg] | kcat [s$^{-1}$] | kcat/Km [mM$^{-1}$ s$^{-1}$] |
|---|---|---|---|---|
| HRP N13D/N57S/N175S/N255D/N268D | 0.845 ± 0.27 | 1224 ± 115 | 786 ± 74 | 930 ± 308 |
| HRP N13D/N57S/P146Q/N175S/N255D/N268D/N275K (SEQ ID NO: 4) | 0.765 ± 0.21 | 1214 ± 98 | 716 ± 58 | 936 ± 272 |

EXAMPLE 9. COMPARISON TO PLANT-DERIVED AND WILD-TYPE HRP

The kinetic parameters and thermal stability of HRP N13D/N57S/P146Q/N175S/N255D/N268D/N275K (SEQ ID NO: 4) was compared to those of wild-type HRP (SEQ ID NO: 2) as well as to the plant-derived HRP (pHRP). Kinetic parameters and thermal stability were determined as described in Example 6.

The measurement of the thermal stability is displayed in FIG. 13. As already described in Example 7 herein above, the most preferred mutant HRP N13D/N57S/P146Q/N175S/N255D/N268D/N275K (mHRP, SEQ ID NO: 4) displayed a more than 13-fold enhanced thermostability over wild-type HRP (rHRP, SEQ ID NO: 2) and a 1.7-fold enhanced thermostability even over the plant-derived (i.e. glycosylated) pHRP (see Table 15). Moreover, it was found that even with this strongly improved thermal stability, similar catalytic efficiencies to both wild-type HRP (rHRP, SEQ ID NO: 2) and plant-derived HRP were observed (see Tables 19 and 20 below).

TABLE 19

Kinetic parameters for the substrate ABTS.

| Variant | Km [mM] | Vmax [U/mg] | kcat [s$^{-1}$] | kcat/Km [mM$^{-1}$ s$^{-1}$] |
|---|---|---|---|---|
| pHRP | 0.70 ± 0.14 | 1285 ± 70 | 734 ± 41 | 1043 ± 215 |
| wild-type HRP (rHRP, SEQ ID NO: 2) | 0.49 ± 0.06 | 1411 ± 43 | 823 ± 25 | 1677 ± 205 |
| HRP N13D/N57S/P146Q/N175S/N255D/N268D/N275K (mHRP, SEQ ID NO: 4) | 0.86 ± 0.23 | 1203 ± 96 | 702 ± 56 | 817 ± 228 |

TABLE 20

Kinetic parameters for the substrate TMB.

| Variant | Km [mM] | Vmax [U/mg] | kcat [s$^{-1}$] | kcat/Km [mM$^{-1}$ s$^{-1}$] |
|---|---|---|---|---|
| pHRP | 0.101 ± 0.020 | 7446 ± 528 | 4343 ± 308 | 42830 ± 8864 |
| wild-type HRP (rHRP, SEQ ID NO: 2) | 0.105 ± 0.014 | 7146 ± 355 | 4169 ± 207 | 39582 ± 5661 |
| HRP N13D/N57S/P146Q/N175S/N255D/N268D/N275K (mHRP, SEQ ID NO: 4) | 0.109 ± 0.012 | 7360 ± 294 | 4293 ± 171 | 39518 ± 4498 |

EXAMPLE 10. SITE-SATURATION MUTAGENESIS OF POSITIONS 146 AND 275

In order to test the effect of all possible amino acid exchanges at positions P146 and N275, site-saturation mutagenesis of these positions was performed. As starting point for the site-saturation mutagenesis, the preferred mutant HRP N13D/N57S/P146Q/N175S/N255D/N268D/N275K (SEQ ID NO: 3) was selected. The effects of amino acid exchanges in the 146 and 275 positions were studied individually.

Library Generation

The following plasmids were constructed with standard molecular cloning techniques. Whole plasmid PCR of HRP N13D/N57S/P146Q/N175S/N255D/N268D/N275K (SEQ ID NO: 3) in pSF-T7 was used to introduce mutations in the hrp gene by site-saturation mutagenesis at position 146 and 275. The 6.3 kb fragment was amplified with the respective oligonucleotides to generate site-saturation libraries (Table 21). All oligonucleotides were purchased from Microsynth (Balgach, Switzerland). The oligonucleotides were phosphorylated according to following protocol: 300 µmol primer DNA, 1×T4 PNK buffer (NEB), 1 mM ATP, 5% PEG, 10 Units T4 polynucleotide kinase (PNK, NEB). The reaction was incubated at 37° C. for 45 min prior to heat inactivation at 65° C. for 20 min. Each PCR reaction contained 1×Q5 Reaction Buffer, 200 µM dNTP Mix, 200 nM of both forward and reverse phosphorylated primer, 100 ng template vector DNA and 1 U Q5 High-Fidelity DNA Polymerase. The PCR products were purified with the Monarch PCR & DNA Cleanup Kit from New England Biolabs (NEB, Ipswich, MA, USA) and the template plasmid DNA was removed by FastDigest DpnI (Thermo Scientific™, Waltham, MA, USA) digestion. 2 FDU (FastDigest unit) of DpnI was added to the cleaned PCR products and incubated for 4 h at 37° C. After heat inactivation at 80° C. for 20 min, the plasmids were blunt end ligated: 50 ng plasmid DNA, 1×T4 DNA ligase buffer (NEB), 400 cohesive end units T4 DNA ligase (NEB), 16° C. overnight. After heat inactivation for 20 min at 65° C. the plasmids were transformed into BL21 (DE3).

TABLE 21

Primers used for whole plasmid PCR.

| Name | Sequence (5' -> 3' Direction) |
| --- | --- |
| DHU_P146deg3_fwd (SEQ ID NO: 5) | TTTCACGCTG*NNK*CAACTGAAAGATAGC |
| DHU_P146deg3_rev (SEQ ID NO: 6) | AACGGAGCCGGCAGATTAGCGTTT |
| DHU_N275deg3_fwd (SEQ ID NO: 7) | GACGTTTTTC*NNK*GCATTCGTCGAAGC |
| DHU_N275deg3_rev (SEQ ID NO: 8) | TGGGTCGAATCGGCAAATGAACG |

Screening

Positive transformants were picked from the selection plates and grown in 96-well plates with 200 µl SB medium (32 g L$^{-1}$ tryptone; 20 g L$^{-1}$ yeast extract; 5 g L-1 NaCl; 5 mM NaOH; 50 mg L$^{-1}$ kanamycin) for 16 h at 37° C., 250 rpm in a plastic box to prevent desiccation. Subsequently, 90 µl 75% glycerol was added to the master plates before they were stored at −80° C. The slave plates containing 190 µl SB medium were inoculated with 10 µl of the master plates. Here, the medium contained 2 mM CaCl$_2$; 6 µM hemin and 0.1 mM IPTG in a final volume of 200 µl. The cells were grown for 16 h at 25° C., 250 rpm in a plastic box and cell density was determined by measuring the absorption at 595 nm with a Tecan Infinite M200 PRO (Tecan, Männedorf, Switzerland) plate reader. Then the plates were centrifuged at 5000 g for 6 min at 4° C. with a Thermo-Fisher Lynx Sorvall centrifuge and the cells were resuspended thoroughly in 200 µl/well B-PER Bacterial Protein Extraction Reagent (Thermo Scientific, Waltham, MA, USA) with 5 U ml$^{-1}$ DNaseI and ½-Protease Inhibitor Cocktail Tablet (cOmplete Tablets, EDTA-free; Roche Diagnostics GmbH, Mannhein, Germany) and 200 mM MgCl$_2$. Cell lysis was performed for 15 min at RT before centrifugation at 5000 g, 4° C. for 20 min. Afterwards total protein content was measured with the Bradford method. 90 µl of each well were transferred to a new plate which was incubated at 80° C. for 20 min (position 146) or at 80° C. for 15 min (position 275), afterwards both the heated and the control plate were centrifuged again at 5000 g, 4° C. for 20 min. Subsequently, enzyme activity was measured with 395 µM TMB (position 146) or 406 µM TMB (position 275), 1 mM H$_2$O$_2$ and 10 µl cell lysate in 50 mM phosphate-citrate buffer pH 5 with a total volume of 200 µl. The measurements were performed at 30° C. and increase in absorbance at 652 nm ($\varepsilon=3.9\times10^4$ M$^{-1}$cm$^{-1}$ for the blue TMB radical) was monitored for 120 s with a Tecan Infinite M200 PRO plate reader. Initial and residual activities were normalized using the total protein concentration and thermal stability was displayed as the ratio of residual to initial activity. The procedure was the same as described above. 180 colonies were screened for each position, which corresponds to an expected library completeness of more than 99%. Each plate contained 6 colonies of HRP N13D/N57S/P146Q/N175S/N255D/N268D/N275K (corresponding to SEQ ID NO: 3) as positive control.

Results

Results of the selected mutants are given in Table 22 (position P146) and Table 23 (position N275) below. Since the present Example uses a 96-well plate-based screening assay, variability (standard deviation) is higher than with other assays reported herein. Therefore, results for each mutant should only be compared within each plate measured.

As can been seen from Tables 22 and 23, multiple different amino acid exchanges in positions 146 and 275 were found to lead to excellent thermal stability. Several amino acid exchanges in each position gave advantageous results. In the case of position 146, 146A, 146R, 146V, 146E and especially 146Q were found to be particularly advantageous (all within the standard deviation of the most preferred mutant 146Q). In the case of position 275, the best results were observed for 275R, 275D, 275S, 275Q, 275A, 27SF and especially 275K (all within the standard deviation of the most preferred mutant 275K).

TABLE 22

Selected mutants resulting from site saturation mutagenesis at position 146. Two separate plates were measured (results should be compared within each plate). Certain mutants contained the same amino acid exchange. For the controls (SEQ ID NO: 3) the average and standard deviation from six replicates are given.

| Amino acid exchange | U/mg total protein | Residual activity |
| --- | --- | --- |
| PLATE 1: | | |
| 146Q (control) | 0.056 ± 0.008 | 49% ± 14% |
| 146A | 0.054 | 50% |
| 146E | 0.048 | 53% |
| 146R | 0.052 | 60% |

TABLE 22-continued

Selected mutants resulting from site saturation mutagenesis at position 146. Two separate plates were measured (results should be compared within each plate). Certain mutants contained the same amino acid exchange. For the controls (SEQ ID NO: 3) the average and standard deviation from six replicates are given.

| Amino acid exchange | U/mg total protein | Residual activity |
| --- | --- | --- |
| 146R | 0.053 | 59% |
| 146Q | 0.057 | 60% |
| PLATE 2: | | |
| 146Q (control) | 0.058 ± 0.004 | 74% ± 6% |
| 146V | 0.049 | 75% |
| 146Q | 0.059 | 77% |
| 146Q | 0.057 | 77% |
| 146Q | 0.056 | 82% |

TABLE 23

Selected mutants resulting from site saturation mutagenesis at position 275. Two separate plates were measured (results should be compared within each plate). Certain mutants contained the same amino acid exchange. For the controls (SEQ ID NO: 3) the average and standard deviation from six replicates are given.

| Amino acid exchange | U/mg total protein | Residual activity |
| --- | --- | --- |
| PLATE 1: | | |
| 275K (control) | 0.062 ± 0.006 | 96% ± 31% |
| K275A | 0.041 | 98% |
| PLATE 2: | | |
| 275K (control) | 0.073 ± 0.017 | 92% ± 27% |
| 275R | 0.063 | 90% |
| 275E | 0.1 | 100% |
| 275R | 0.071 | 100% |
| 275D | 0.08 | 100% |
| 275A | 0.064 | 98% |

EXAMPLE 11. DISTRIBUTION OF HEME COFACTOR ADDITION OVER DIFFERENT TIME PERIODS

Methods

Process runs were carried out as described in Example 5 with the differences indicated below. Strains and growth conditions as well as homogenization and inclusion body wash were performed as described in Example 1. A refolding reactor was used as described in Example 3.

For solubilization, an aliquot of the frozen IBs was thawed, weighed in order to calculate the wet Inclusion Body (wIB) weight and resuspended in the appropriate solubilization buffer (Solubilization buffer 2: 50 mM glycine; pH 10; 6 M Urea) to reach a wIB concentration of 100 g/L (3.5 g IBs=35 ml solubilization mix which results in 30 ml solubilization mix after centrifugation). After resuspension, DTT was added to reach a final concentration in the solubilization mix of 7.11 mM DTT and the solubilization mix was incubated (4° C.; 0.5 h; slight agitation), followed by centrifugation (20379 g; 20 min; 4° C.). The supernatant was immediately used for refolding, the pellet discarded. The final refolding volume for the vessel was 1.2 L (resulting in the use of 30 mL solubilizate and a dilution of 1:40).

The refolding buffer contained 20 mM glycine pH 10 (adjusted with HCl), 2 M urea, 7% glycerol, 2 mM $CaCl_2$), 1.27 mM GSSG.

Three different ways of Hemin addition were compared: (A) 20 h of refolding followed by batch addition of Hemin to a final concentration of 20 μM and incubation for another 5 h before measurement; (B) 8 h of refolding followed by addition of a 10 h Hemin feed (2.4 mL of 1 mM Hemin/h; final concentration 20 μM Hemin) and incubation for another 1 h before measurement; and (C) 8 h of refolding followed by addition of a 1 h Hemin feed (24 mL of 1 mM Hemin/h; final concentration 20 μM Hemin) and incubation for another 10 h. In experiment (C), a sample was taken and measured directly after the end of the feed and a further measurement was done after the incubation for another 10 h.

Protein concentrations and enzyme activities were determined as described in Example 2.

Results

The results obtained are shown in FIG. 14. A clear benefit was found of distributing heme cofactor addition over a time period of 1 h. Even when measured directly after the end of the 1 h hemin feed (i.e. after 9 h total refolding time) the specific activity was found to be 1.4-fold higher than that of the batch addition experiment (which had a total refolding time of 25 h). When a sample from the 1 h feed experiment was measured after additional incubation for 10 h (i.e. after a total refolding time of 19 h) the specific activity was even 1.7-fold higher than that from the batch addition. Distributing the hemin addition over a longer time period of 10 h (experiment (B); total refolding time of 19 h) even led to a 2-fold increase in specific activity over batch addition.

EXAMPLE 12. KINETIC PARAMETERS AND THERMAL STABILITY OF FURTHER HRP MUTANTS

The beneficial effect of mutations at positions P146 and N275 was investigated in the light of wild-type HRP (SEQ ID NO: 2), HRP N175S and HRP N13D/N57S/N175S/N255D/N268D. Furthermore, the beneficial effects of single mutants and combinations thereof was examined. In this context, the role of mutations at positions P146 and N275 on the biochemical properties was determined by the measurement of specific enzyme activity and thermal stability at 60° C.

Materials and Methods

The following mutants of wild-type HRP (SEQ ID NO: 2) were created and verified by Sanger-Sequencing: HRP P146Q, HRP N175S, HRP N275K, HRP P146Q/N275K, HRP P146Q/N175S, HRP N175S/N275K, HRP P146Q/N175S/N275K. Purification was carried out as described in Example 6. Kinetic parameters and thermal stability were also determined as described in Example 6.

Specific Enzyme Activity (ABTS)

The specific activity in Units/mg protein of all HRP variants was tested with the substrate ABTS in a Tecan plate reader (Table 24). HRP P146Q showed a 1.4-fold higher specific activity in relation to HRP wild-type. Interestingly, HRP N175S showed a lower specific activity; however, HRP N13D/N57S/P146Q/N175S/N255D/N268D/N275K (SEQ ID NO: 4) was able to counteract this activity reduction and restored it to HRP wild-type values.

TABLE 24

Specific activity of selected HRP variants with ABTS as substrate compared to HRP wild-type and HRP N13D/N57S/P146Q/N175S/N255D/N268D/N275K.

| HRP variants | Specific activity [U/mg] |
| --- | --- |
| HRP wild-type (SEQ ID NO: 2) | 962 ± 108 |
| HRP N13D/N57S/P146Q/N175S/N255D/N268D/N275K (SEQ ID NO: 4) | 875 ± 81 |
| HRP P146Q | 1391 ± 115 |
| HRP N175S | 693 ± 77 |
| HRP N275K | 956 ± 58 |
| HRP P146Q/N275K | 974 ± 75 |
| HRP P146Q/N175S | 637 ± 47 |
| HRP N175S/N275K | 601 ± 94 |
| HRP P146Q/N175S/N275K | 637 ± 44 |

Specific Enzyme Activity ($H_2O_2$)

Furthermore, the specific activity in Units/mg protein was determined with the substrate hydrogen peroxide. Here, the trend was the same as observed for the data for ABTS, where the variant P146Q led to an increase in specific activity and introduction of N175S led to lower values. This was also the case for the double mutants P146Q/N175S and N175S/N275K as well as the triple mutant P146Q/N175S/N275K. When N175S was missing or when the additional mutations of SEQ ID NO: 4 were present, the specific activity was comparable or even better than SEQ ID NO: 2.

TABLE 25

Specific activity of selected HRP variants with $H_2O_2$ as substrate compared to HRP wild-type and HRP N13D/N57S/P146Q/N175S/N255D/N268D/N275K.

| HRP variants | Specific activity [U/mg] |
| --- | --- |
| HRP wild-type (SEQ ID NO: 2) | 1151 ± 113 |
| HRP N13D/N57S/P146Q/N175S/N255D/N268D/N275K (SEQ ID NO: 4) | 983 ± 104 |
| HRP P146Q | 1522 ± 133 |
| HRP N175S | 734 ± 54 |
| HRP N275K | 1258 ± 90 |
| HRP P146Q/N275K | 1027 ± 31 |
| HRP P146Q/N175S | 756 ± 25 |
| HRP N175S/N275K | 711 ± 35 |
| HRP P146Q/N175S/N275K | 718 ± 28 |

Specific Enzyme Activity (TMB)

Concerning the substrate TMB the differences in specific activity between the HRP variants were less pronounced. However, P146Q again showed a significant increase in specific enzyme activity, whereas N175S showed the lowest U/mg relative to the wild-type.

TABLE 26

Specific activity of selected HRP variants with TMB as substrate compared to HRP wild-type and HRP N13D/N57S/P146Q/N175S/N255D/N268D/N275K.

| HRP variants | Specific activity [U/mg] |
| --- | --- |
| HRP wild-type (SEQ ID NO: 2) | 6316 ± 434 |
| HRP N13D/N57S/P146Q/N175S/N255D/N268D/N275K (SEQ ID NO: 4) | 5836 ± 552 |
| HRP P146Q | 7781 ± 411 |
| HRP N175S | 5312 ± 152 |
| HRP N275K | 5974 ± 495 |
| HRP P146Q/N275K | 5699 ± 294 |
| HRP P146Q/N175S | 5329 ± 122 |
| HRP N175S/N275K | 5465 ± 520 |
| HRP P146Q/N175S/N275K | 5227 ± 90 |

Thermal Stability

The enzyme stability at 60° C. was investigated for all HRP mutants and surprisingly N175S was not solely responsible for the increased stability at high temperatures. HRP N13D/N57S/N255D/N268D increased the enzyme half life 1.5-fold, whereas HRP N175S enhanced stability by 7.7-fold, once they were combined the stability was raised 13-fold relative to HRP wild-type, suggesting a synergistic effect (Table 27). Due to the fact that HRP N13D/N57S/N175S/N255D/N268D and HRP N13D/N57S/P146Q/N175S/N255D/N268D/N275K (SEQ ID NO: 4) showed comparable stability it may be assumed that the quadruple mutant in combination with N175S was responsible for this enhancement.

For P146Q and N275K the stability of the single mutants and the double mutant P146Q/N275K was slightly reduced relative to HRP wild-type. However, the triple mutant P146Q/N175S/N275K showed the same stability as N175S alone, whereas the double mutants P146Q/N175S and N175S/N275K were less stable. This indicates an unfavorable effect on stability when only one of the mutants is combined with N175S, which is alleviated in combination, suggesting a synergistic effect between P146Q, N275K, and N175S.

The same effect can also be seen for HRP N13D/N57S/P146Q/N175S/N255D/N268D and HRP N13D/N57S/N175S/N255D/N268D/N275K when compared to HRP N13D/N57S/P146Q/N175S/N255D/N268D/N275K (SEQ ID NO: 4).

TABLE 27

Thermal stability of several HRP variants depicted as half life at 60° C. Grey shaded data are taken from Example 7 for comparison.

| HRP variants | $t_{1/2}$ at 60° C. [min] |
| --- | --- |
| HRP wild-type (SEQ ID NO: 2) | 30 ± 3 |
| HRP N13D/N57S/P146Q/N175S/N255D/N268D/N275K (SEQ ID NO: 4) | 378 ± 11 |
| HRP P146Q | 25 ± 0.5 |
| HRP N275K | 23 ± 1 |
| HRP P146Q/N275K | 25 ± 1 |
| HRP P146Q/N175S | 178 ± 1 |
| HRP N175S/N275K | 166 ± 1 |
| HRP P146Q/N175S/N275K | 236 ± 1 |
| HRP N175S | 232 ± 3 |
| HRP N13D/N57S/N255D/N268D | 46 ± 0.5 |
| HRP N13D/N57S/P146Q/N175S/N255D/N268D | 267 ± 1.4 |
| HRP N13D/N57S/N175S/N255D/N268D/N275K | 242 ± 2 |
| HRP N13D/N57S/N175S/N255D/N268D | 396 ± 17 |

CONCLUSION

It was found that the substitution P146Q on its own led to a strong increase in HRP enzyme activity for all substrates tested. For instance, for the substrate ABTS the increase amounted to a 1.4-fold increase relative to the wild-type enzyme (SEQ ID NO: 2) and a 2-fold higher specific activity when compared to HRP N175S.

The substitution N175S was found to strongly increase thermal stability of HRP. This effect was observed for N175S on its own and even more strongly in combination with the mutated N-glycosylation site amino acids N13D/N57S/N255D/N268D, where a synergistic effect was observed. The combination of the single mutation P146Q or the single mutation N275K with N175S led to a slight stability reduction; however, when both P146Q and N275K were combined with N175S the reduction was alleviated, suggesting a synergistic effect between P146Q, N275K, and N175S.

N175S was found to reduce enzyme activity with several substrates. This effect was, however, counteracted by N13D/N57S/P146Q/N175S/N255D/N268D/N275K (SEQ ID NO: 4). Thus, this mutant provides a combination of high thermal stability and optimal kinetic performance.

The invention claimed is:

1. Method for producing a heme peroxidase from inclusion bodies (IBs) comprising the steps of:
   providing the heme peroxidase in the form of IBs;
   solubilizing said IBs;
   transferring said solubilized IBs into a refolding buffer to obtain a refolding mix;
   adding a heme cofactor to said refolding mix,
   wherein the addition of the heme cofactor to the refolding mix is distributed over a time period of at least 1 hour.

2. Method according to claim 1, wherein the heme cofactor is added to the refolding mix as a continuous feed.

3. Method according to claim 1, wherein the refolding mix is incubated for at least 1 hour prior to the addition of the heme cofactor.

4. Method according to claim 1, wherein the heme peroxidase is a Class II or a Class III heme peroxidase.

5. Method according to claim 1, wherein the heme peroxidase comprises the amino acid sequence as set forth in SEQ ID NO: 3.

6. Method according to claim 1, wherein the heme cofactor is hemin.

7. Method according to claim 1, wherein the heme peroxidase in the form of IBs is provided by the steps of:
   culturing host cells expressing a gene encoding the heme peroxidase; and
   obtaining IBs from said host cells.

8. Method according to claim 1, wherein said solubilizing comprises incubating the IBs in a solubilization buffer.

9. Method according to claim 8, wherein the solubilization buffer has reducing conditions corresponding to a dithiothreitol (DTT) concentration between 1 and 50 mmol/L.

10. Method according to claim 1, further comprising the step of purifying the refolded heme peroxidase after the heme cofactor has been added to the refolding mix.

11. Method for producing a heme peroxidase product comprising producing a heme peroxidase according to the method of claim 1.

12. Method according to claim 11, further comprising a conjugation reaction to obtain a heme peroxidase conjugate.

13. Method according to claim 11, further comprising the step of purifying, of freezing, and/or of lyophilizing the heme peroxidase or the heme peroxidase conjugate.

14. Method according to any one of claim 11, further comprising the step of immobilizing the heme peroxidase or heme peroxidase conjugate on a solid carrier.

15. Method according to any one of claim 11, further comprising the step of packaging the heme peroxidase or the heme peroxidase conjugate in a kit.

16. Method according to claim 1, wherein the heme peroxidase is horseradish peroxidase (HRP).

17. Method according to claim 1, wherein the heme peroxidase consists of the amino acid sequence as set forth in SEQ ID NO: 4.

18. Method according to claim 7, wherein the host cells are prokaryotic cells.

19. Method according to claim 7, wherein the host cells are *Escherichia coli* cells.

20. Method according to claim 8, wherein the solubilization buffer has a pH between 8 and 12.5.

\* \* \* \* \*